United States Patent
Moriya et al.

(10) Patent No.: US 9,838,700 B2
(45) Date of Patent: Dec. 5, 2017

(54) ENCODING APPARATUS, DECODING APPARATUS, AND METHOD AND PROGRAM FOR THE SAME

(71) Applicants: NIPPON TELEGRAPH AND TELEPHONE CORPORATION, Chiyoda-ku (JP); The University of Tokyo, Bunkyo-ku (JP)

(72) Inventors: Takehiro Moriya, Atsugi (JP); Yutaka Kamamoto, Atsugi (JP); Noboru Harada, Atsugi (JP); Hirokazu Kameoka, Atsugi (JP); Ryosuke Sugiura, Bunkyo-ku (JP)

(73) Assignees: NIPPON TELEGRAPH AND TELEPHONE CORPORATION, Chiyoda-ku (JP); The University of Tokyo, Bunkyo-ku (JP)

( * ) Notice: Subject to any disclaimer, the term of this patent is extended or adjusted under 35 U.S.C. 154(b) by 0 days.

(21) Appl. No.: 15/528,977

(22) PCT Filed: Nov. 24, 2015

(86) PCT No.: PCT/JP2015/082839
§ 371 (c)(1),
(2) Date: May 23, 2017

(87) PCT Pub. No.: WO2016/084764
PCT Pub. Date: Jun. 2, 2016

(65) Prior Publication Data
US 2017/0272766 A1 Sep. 21, 2017

(30) Foreign Application Priority Data

Nov. 27, 2014 (JP) .................................. 2014-239644
Jan. 30, 2015 (JP) .................................. 2015-017692

(51) Int. Cl.
*H03M 7/00* (2006.01)
*H04N 19/196* (2014.01)
(Continued)

(52) U.S. Cl.
CPC ........... *H04N 19/198* (2014.11); *H04N 19/12* (2014.11); *H04N 19/18* (2014.11)

(58) Field of Classification Search
CPC ...... H04N 19/198; H04N 19/12; H04N 19/18; H03M 5/00; H03M 7/00
(Continued)

(56) References Cited

U.S. PATENT DOCUMENTS 7,994,945 B2 * 8/2011 Ragot ..................... H03M 7/00
341/50
2015/0187366 A1 7/2015 Moriya et al.

FOREIGN PATENT DOCUMENTS

WO WO 2014/054556 A1 4/2014

OTHER PUBLICATIONS

International Search Report dated Jan. 19, 2016 in PCT/JP2015/082839 filed Nov. 24, 2015.
(Continued)

*Primary Examiner* — Jean B Jeanglaude
(74) *Attorney, Agent, or Firm* — Oblon, McClelland, Maier & Neustadt, L.L.P.

(57) ABSTRACT

There are provided an encoding or decoding technique capable of performing more efficient encoding or decoding than before. An encoding apparatus for encoding a time-series signal in a frequency domain is provided with: a spectral envelope estimating portion 2A estimating a spectral envelope, regarding absolute values of a frequency domain sample sequence corresponding to the time-series signal raised to the power of $\eta$ as a power spectrum, on the assumption that $\eta$ is a predetermined positive number other
(Continued)

than 2; and an encoding portion 2B performing such encoding that changes bit allocation or that bit allocation substantially changes, for each coefficient of the frequency domain sample sequence corresponding to the time-series signal, based on the estimated spectral envelope.

7 Claims, 17 Drawing Sheets

(51) Int. Cl.
  *H04N 19/18* (2014.01)
  *H04N 19/12* (2014.01)
(58) Field of Classification Search
  USPC .................................................... 341/50, 51
  See application file for complete search history.

(56) References Cited

OTHER PUBLICATIONS

Ryosuke Sugiura, et al., "Optimal representation of spectral envelope for Golomb-Rice coding" Report of the 2015 Spring Meeting, the Acoustical Society of Japan, Mar. 2015, pp. 233-236.
Ryosuke Sugiura, et al., "Golomb-Rice Coding Optimized via LPC for Frequency Domain Audio Coder" GlobalSIP 2014: Perception Inspired Multimedia Signal Processing Techniques, 2014, pp. 1024-1028.
Max Neuendorf, et al., "MPEG Unified Speech and Audio Coding—The ISO/MPEG Standard for High-Efficiency Audio Coding of all Content Types" Audio Engineering Society $132^{nd}$ Convention, Apr. 2012, 22 Pages.

\* cited by examiner

ENCODING APPARATUS, DECODING APPARATUS, AND METHOD AND PROGRAM FOR THE SAME

TECHNICAL FIELD

The present invention relates to a technique for encoding or decoding a time-series signal such as a sound signal.

BACKGROUND ART

As a method for encoding a sound signal with a low-bit rate (for example, about 10 to 20 kbit/s), adaptive coding for an orthogonal transform coefficient in a frequency domain, such as DFT (Discrete Fourier Transform) and MDCT (Modified Discrete Cosine Transform), is known. For example, MEPG USAC (Unified Speech and Audio Coding), which is a standard technique, has a TCX (transform coded excitation) encoding mode, and, in this mode, MDCT coefficients are normalized for each frame and variable-length encoded after being quantized (see, for example, Non-Patent Literature 1).

FIG. 1 shows a configuration example of a conventional TCX-based encoding apparatus. The encoding apparatus in FIG. 1 is provided with a frequency domain transforming portion 11, a linear prediction analyzing portion 12, an amplitude spectral envelope sequence generating portion 13, an envelope normalizing portion 14 and an encoding portion 15. Each portion in FIG. 1 will be described below.

<Frequency Domain Transforming Portion 11>

A time domain sound signal is inputted to the frequency domain transforming portion 11. The sound signal is, for example, a voice signal or an acoustic signal.

The frequency domain transforming portion 11 transforms the inputted time domain sound signal to an MDCT coefficient sequence $X(0), X(1), \ldots, X(N-1)$ at a point N in a frequency domain for each frame with a predetermined time length. Here, N is a positive integer.

The transformed MDCT coefficient sequence $X(0), X(1), \ldots, X(N-1)$ is outputted to the envelope normalizing portion 14.

<Linear Prediction Analyzing Portion 12>

A time domain sound signal is inputted to the linear prediction analyzing portion 12.

The linear prediction analyzing portion 12 generates linear prediction coefficients $\alpha_1, \alpha_2, \ldots, \alpha_p$ by performing linear prediction analysis for a sound signal inputted in frames. Further, the linear prediction analyzing portion 12 encodes the generated linear prediction coefficients $\alpha_1, \alpha_2, \ldots, \alpha_p$ to generate linear prediction coefficient codes. An example of the linear prediction coefficient code is LSP codes, which are codes corresponding to a sequence of quantized values of an LSP (Line Spectrum Pairs) parameter sequence corresponding to the linear prediction coefficients $\alpha_1, \alpha_2, \ldots, \alpha_p$. Here, p is a positive integer equal to or larger than 2.

Further, the linear prediction analyzing portion 12 generates quantized linear prediction coefficients $\hat{\alpha}_1, \hat{\alpha}_2, \ldots, \hat{\alpha}_p$ which are linear prediction coefficients corresponding to the generated linear prediction coefficient codes.

The generated quantized linear prediction coefficients $\hat{\alpha}_1, \hat{\alpha}_2, \ldots, \hat{\alpha}_p$ are outputted to the amplitude spectral envelope sequence generating portion 13. Further, the generated linear prediction coefficient codes are outputted to a decoding apparatus.

For the linear prediction analysis, for example, a method is used in which linear prediction coefficients are obtained by determining autocorrelation for the sound signal inputted in frames and performing a Levinson-Durbin algorithm using the determined autocorrelation. Otherwise, a method may be used in which linear prediction coefficients are obtained by inputting an MDCT coefficient sequence determined by the frequency domain transforming portion 11 to the linear prediction analyzing portion 12 and performing the Levinson-Durbin algorithm for what is obtained by performing inverse Fourier transform of a sequence of square values of coefficients of the MDCT coefficient sequence.

<Amplitude Spectral Envelope Sequence Generating Portion 13>

The quantized linear prediction coefficients $\hat{\alpha}_1, \hat{\alpha}_2, \ldots, \hat{\alpha}_p$ generated by the linear prediction analyzing portion 12 are inputted to the amplitude spectral envelope sequence generating portion 13.

The amplitude spectral envelope sequence generating portion 13 generates a smoothed amplitude spectral envelope sequence $\hat{W}\gamma(0), \hat{W}\gamma(1), \ldots, \hat{W}\gamma(N-1)$ defined by the following formula (1) using the quantized linear prediction coefficients $\hat{\alpha}_1, \hat{\alpha}_2, \ldots, \hat{\alpha}_p$. In the formula (1), exp(●) indicates an exponential function with a Napier's constant as a base on the assumption that "●" is a real number, and j indicates an imaginary unit. Further, γ is a positive constant equal to or smaller than 1 and is a coefficient which reduces amplitude unevenness of an amplitude spectral envelope sequence $\hat{W}(0), \hat{W}(1), \ldots, \hat{W}(N-1)$ defined by the following formula (2), in other words, a coefficient which smoothes the amplitude spectral envelope sequence.

[Formula 1]

$$\hat{W}_\gamma(k) = \frac{1}{\sqrt{2\pi}} \frac{1}{\left|1 + \sum_{n=1}^{p} \hat{\alpha}_n \gamma^n \exp(-j2\pi kn/N)\right|} \quad (1)$$

$$\hat{W}(k) = \frac{1}{\sqrt{2\pi}} \frac{1}{\left|1 + \sum_{n=1}^{p} \hat{\alpha}_n \exp(-j2\pi kn/N)\right|} \quad (2)$$

The generated smoothed amplitude spectral envelope sequence $\hat{W}\gamma(0), \hat{W}\gamma(1), \ldots, \hat{W}\gamma(N-1)$ is outputted to the envelope normalizing portion 14.

<Envelope Normalizing Portion 14>

The MDCT coefficient sequence $X(0), X(1), \ldots, X(N-1)$ generated by the frequency domain transforming portion 11 and the smoothed amplitude spectral envelope sequence $\hat{W}\gamma(0), \hat{W}\gamma(1), \ldots, \hat{W}\gamma(N-1)$ outputted by the amplitude spectral envelope sequence generating portion 13 are inputted to the envelope normalizing portion 14.

The envelope normalizing portion 14 generates a normalized MDCT coefficient sequence $X_N(0), X_N(1), \ldots, X_N(N-1)$ by normalizing each coefficient $X(k)$ of the MDCT coefficient sequence by a corresponding value $\hat{W}\gamma(k)$ of the smoothed amplitude spectral envelope sequence. That is, $X_N(k)=X(k)/\hat{W}\gamma(k)$ [k=0, 1, . . . , N-1] is satisfied.

The generated normalized MDCT coefficient sequence $X_N(0), X_N(1), \ldots, X_N(N-1)$ is outputted to the encoding portion 15.

Here, in order to realize such quantization that auditory distortion is reduced, the envelope normalizing portion 14 normalizes the MDCT coefficient sequence $X(0), X(1), \ldots, X(N-1)$ in frames, using the smoothed amplitude spectral envelope sequence $\hat{W}\gamma(0), \hat{W}\gamma(1), \ldots, \hat{W}\gamma(N-1)$, which is a sequence of a smoothed amplitude spectral envelope.

<Encoding Portion 15>

The normalized MDCT coefficient sequence $X_N(0), X_N(1), \ldots, X_N(N-1)$ generated by the envelope normalizing portion 14 is inputted to the encoding portion 15.

The encoding portion 15 generates codes corresponding to the normalized MDCT coefficient sequence $X_N(0), X_N(1), \ldots, X_N(N-1)$.

The generated codes corresponding to normalized MDCT coefficient sequence $X_N(0), X_N(1), \ldots, X_N(N-1)$ are outputted to the decoding apparatus.

The encoding portion 15 divides coefficients of the normalized MDCT coefficient sequence $X_N(0), X_N(1), \ldots, X_N(N-1)$ by a gain (global gain) g, and causes codes obtained by encoding a quantized normalized coefficient sequence $X_Q(0), X_Q(1), \ldots, X_Q(N-1)$, which is a sequence of integer values obtained by quantizing results of the division, to be integer signal codes. In a technique of Non-Patent Literature 1, the encoding portion 15 decides such a gain g that the number of bits of the integer signal codes is equal to or smaller than the number of allocated bits B, which is the number of bits allocated in advance, and is as large as possible. Then, the encoding portion 15 generates a gain code corresponding to the decided gain g and an integer signal code corresponding to the decided gain g.

The generated gain code and integer signal codes are outputted to the decoding apparatus as codes corresponding to the normalized MDCT coefficient sequence $X_N(0), X_N(1), \ldots, X_N(N-1)$.

[Specific Example of Encoding Process Performed by Encoding Portion 15]

A specific example of the encoding process performed by the encoding portion 15 will be described.

FIG. 2 shows configuration example of the specific example of the encoding portion 15. As shown in FIG. 2, the encoding portion 15 is provided with a gain acquiring portion 151, a quantizing portion 152, a Rice parameter deciding portion 153, a Golomb-Rice encoding portion 154, a gain encoding portion 155, a judging portion 156 and a gain updating portion 157.

Each portion in FIG. 2 will be described below.

<Gain Acquiring Portion 151>

The gain acquiring portion 151 decides such a global gain g that the number of bits of integer signal codes is equal to or smaller than the number of allocated bits B, which is the number of bits allocated in advance, and is as large as possible from an inputted normalized MDCT coefficient sequence $X_N(0), X_N(1), \ldots, X_N(N-1)$ and outputs the global gain g. The global gain g obtained by the gain acquiring portion 151 becomes an initial value of a global gain used by the quantizing portion 152.

<Quantizing Portion 152>

The quantizing portion 152 obtains and outputs a quantized normalized coefficient sequence $X_Q(0), X_Q(1), \ldots, X_Q(N-1)$ as a sequence of an integer part of a result of dividing each coefficient of the inputted normalized MDCT coefficient sequence $X_N(0), X_N(1), \ldots, X_N(N-1)$ by the global gain g obtained by the gain acquiring portion 151 or the gain updating portion 157.

Here, a global gain g used when the quantizing portion 152 is executed for the first time is the global gain g obtained by the gain acquiring portion 151, that is, the initial value of the global gain. Further, a global gain g used when the quantizing portion 152 is executed at and after the second time is the global gain g obtained by the gain updating portion 157, that is, an updated value of the global gain.

<Rice Parameter Deciding Portion 153>

The Rice parameter deciding portion 153 obtains and outputs Rice parameters r by the following formula (3) from the quantized normalized coefficient sequence $X_Q(0), X_Q(1), \ldots, X_Q(N-1)$ obtained by the quantizing portion 152.

[Formula 2]

$$r = \max\left(\left[\log_2\left((\ln 2)\frac{1}{N}\sum_{k=0}^{N-1}|X_Q(k)|\right)\right], 0\right) \quad (3)$$

It is assumed that "●" indicates an arbitrary number, and [●] indicates a rounding operation for "●".

<Golomb-Rice Encoding Portion 154>

The Golomb-Rice encoding portion 154 performs Golomb-Rice encoding of the quantized normalized coefficient sequence $X_Q(0), X_Q(1), \ldots, X_Q(N-1)$ obtained by the quantizing portion 152, using the Rice parameters r obtained by the Rice parameter deciding portion 153, to obtain integer signal codes, and outputs the integer signal codes and the number of consumed bits C, which is the number of bits of the integer signal codes.

<Judging Portion 156>

When the number of times of updating the gain is a predetermined number of times, the judging portion 156 outputs the integer signal codes as well as outputting an instruction signal to encode the global gain g obtained by the gain updating portion 157 to the gain encoding portion 155, and, when the number of times of updating the gain is smaller than the predetermined number of times, the judging portion 156 outputs the number of consumed bits C measured by the Golomb-Rice encoding portion 154 to the gain updating portion 157.

<Gain Updating Portion 157>

When the number of consumed bits C measured by the Golomb-Rice encoding portion 154 is larger than the number of allocated bits B, the gain updating portion 157 updates the value of the global gain g to a larger value and outputs the value. When the number of consumed bits C is smaller than the number of allocated bits B, the gain updating portion 157 updates the value of the global gain g to a smaller value and outputs the updated value of the global gain g.

<Gain Encoding Portion 155>

The gain encoding portion 155 encodes the global gain g obtained by the gain updating portion 157 in accordance with the instruction signal outputted by the judging portion 156 to obtain and output a gain code.

The integer signal codes outputted by the judging portion 156 and the gain code outputted by the gain encoding portion 155 are outputted to the decoding apparatus as codes corresponding to the normalized MDCT coefficient sequence.

As described above, in the conventional TCX-based encoding, an MDCT coefficient sequence is normalized with the use of a smoothed amplitude spectral envelope sequence obtained by smoothing an amplitude spectral envelope, and, after that, the normalized MDCT coefficient sequence is encoded. This encoding method is adopted in the MPEG-4 USAC described above.

PRIOR ART LITERATURE

Non-Patent Literature

Non-patent literature 1: M. Neuendorf, et al., "MPEG Unified Speech and Audio Coding—The ISO/MPEG Standard for High-Efficiency Audio Coding of all Content Types," AES 132$^{nd}$ Convention, Budapest, Hungary, 2012.

SUMMARY OF THE INVENTION

Problems to be Solved by the Invention

Encoding efficiency of an encoding portion 15 is better when envelope unevenness of an inputted coefficient sequence is as small as possible. In a conventional encoding apparatus, however, since an envelope normalizing portion 14 normalizes an MDCT sequence $X(0), X(1), \ldots, X(N-1)$ not by an amplitude spectral envelope sequence but by a smoothed amplitude spectral envelope sequence in order to reduce auditory distortion, a normalized MDCT coefficient sequence $X_N(0), X_N(1), \ldots, X_N(N-1)$ inputted to the encoding portion 15 has envelope unevenness though the envelope unevenness is not so large as that of the MDCT coefficient sequence $X(0), X(1), \ldots, X(N-1)$. That is, in the conventional encoding apparatus, the encoding efficiency of the encoding portion 15 is bad due to envelope unevenness of the smoothed amplitude spectral envelope sequence.

An object of the present invention is to provide an encoding apparatus and a decoding apparatus capable of performing more efficient encoding or decoding than before, and a method and a program for the encoding apparatus and the decoding apparatus.

Means to Solve the Problems

An encoding apparatus according to an aspect of the present invention is an encoding apparatus for encoding a time-series signal in a frequency domain, the encoding apparatus comprising: a spectral envelope estimating portion estimating a spectral envelope, regarding absolute values of a frequency domain sample sequence corresponding to the time-series signal raised to the power of $\eta$ as a power spectrum, on the assumption that $\eta$ is a predetermined positive number other than 2; and an encoding portion performing such encoding that changes bit allocation or that bit allocation substantially changes, for each coefficient of the frequency domain sample sequence corresponding to the time-series signal, based on the estimated spectral envelope.

A decoding apparatus according to an aspect of the present invention is a decoding apparatus for obtaining a frequency domain sample sequence corresponding to a time-series signal by decoding in a frequency domain, the decoding apparatus comprising: a linear prediction coefficient decoding portion decoding inputted linear prediction coefficient codes to obtain coefficients transformable linear prediction coefficients; an unsmoothed spectral envelope sequence generating portion obtaining an unsmoothed spectral envelope sequence which is a sequence obtained by raising a sequence of an amplitude spectral envelope corresponding to the coefficients transformable to the linear prediction coefficients to the power of $1/\eta$, on the assumption that $\eta$ is a predetermined positive number other than 2; and a decoding portion obtaining a frequency domain sample sequence corresponding to the time-series signal by decoding inputted integer signal codes in accordance with such bit allocation that changes or substantially changes based on the unsmoothed spectral envelope sequence.

Effects of the Invention

It is possible to perform more efficient encoding or decoding than before.

DETAILED DESCRIPTION OF THE EMBODIMENTS

Technical Background

Normalization of an MDCT sequence $X(0), X(1), \ldots, X(N-1)$ by a smoothed amplitude spectral envelope whitens the MDCT sequence $X(0), X(1), \ldots, X(N-1)$ less than normalization by an amplitude spectral envelope sequence. Specifically, unevenness of a normalized MDCT coefficient sequence $X_N(0)=X(0)/\hat{}W\gamma(0), X_N(1)=X(1)/\hat{}W\gamma(1), \ldots, X_N(N-1)=X(N-1)/\hat{}W\gamma(N-1)$, which is obtained by normalizing an MDCT coefficient sequence $X(0), X(1), \ldots, X(N-1)$ by a smoothed amplitude spectral envelope sequence $\hat{}W\gamma(0), \hat{}W\gamma(1), \ldots, \hat{}W\gamma(N-1)$, is larger than unevenness of a normalized sequence $X(0)/\hat{}W(0), X(1)/\hat{}W(1), \ldots, X(N-1)/\hat{}W(N-1)$, which is obtained by normalizing the MDCT coefficient sequence $X(0), X(1), \ldots, X(N-1)$ by an amplitude spectral envelope sequence $\hat{}W(0), \hat{}W(1), \ldots, \hat{}W(N-1)$, by $\hat{}W(0)/\hat{}W\gamma(0), \hat{}W(1)/\hat{}W\gamma(1), \ldots, \hat{}W(N-1)/\hat{}W\gamma(N-1)$. Therefore, when it is assumed that the normalized sequence $X(0)/\hat{}W(0), X(1)/\hat{}W$ (1), . . . , X(N−1)/^W(N−1), which is obtained by normalizing the MDCT coefficient sequence X(0), X(1), . . . , X(N−1) by the amplitude spectral envelope sequence ^W(0), ^W(1), . . . , ^W(N−1), is such that envelope unevenness has been smoothed to an extent suitable for encoding by an encoding portion 15, a normalized MDCT coefficient sequence $X_N(0), X_N(1), \ldots, X_N(N-1)$ to be inputted to the encoding portion 15 has envelope unevenness indicated by a sequence of ^W(0)/^Wγ(0), ^W(1)/^Wγ(1), . . . , ^W(N−1)/^Wγ(N−1) (hereinafter referred to as a normalized amplitude spectral envelope sequence $\hat{W}_N(0), \hat{W}_N(1), \ldots, \hat{W}_N(N-1)$) that is left.

Figure 1:
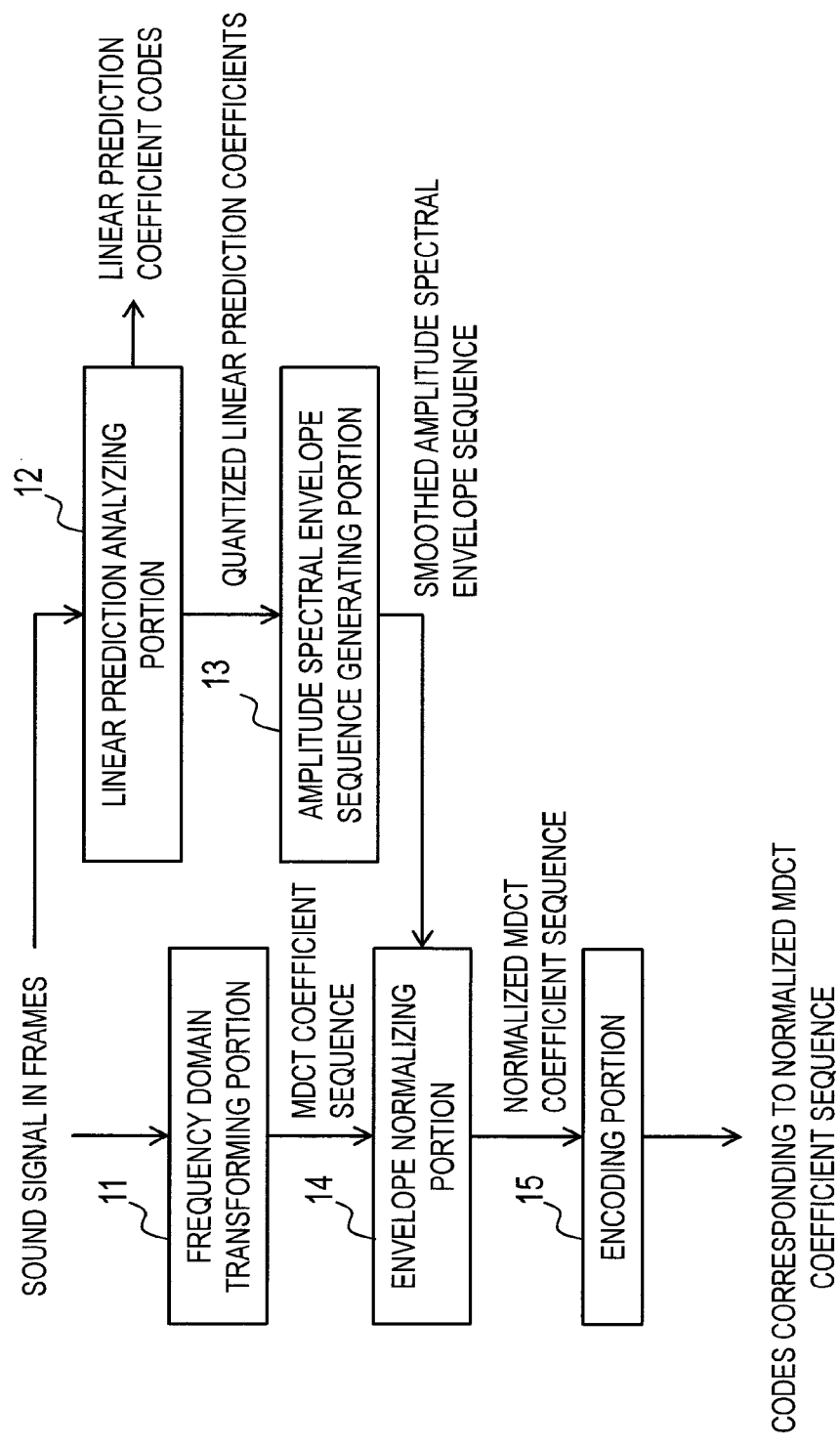
FIG. 1 is a block diagram for illustrating an example of a conventional encoding apparatus.
Figure 2:
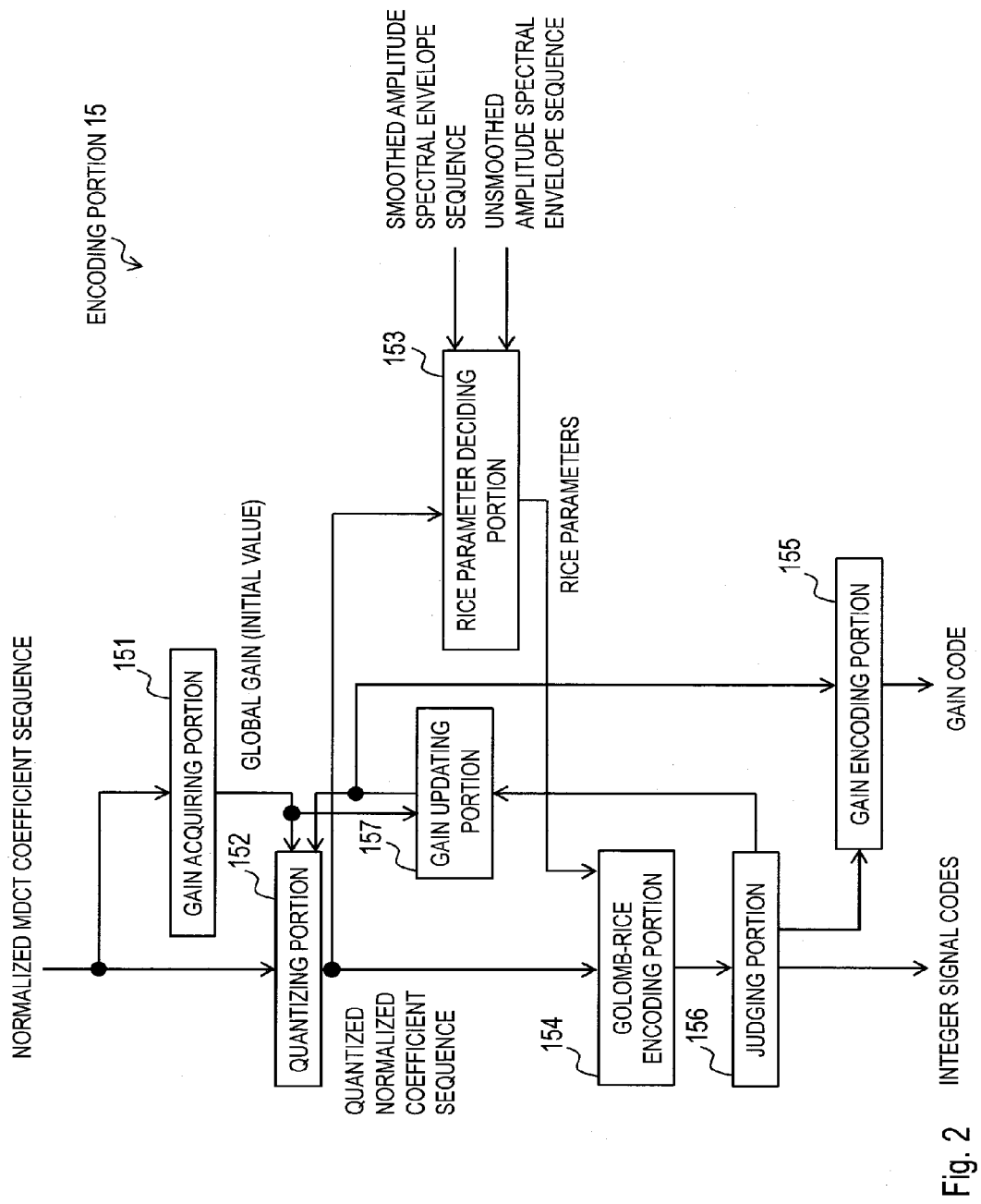
FIG. 2 is a block diagram for illustrating an example of a conventional encoding portion.
Figure 3:
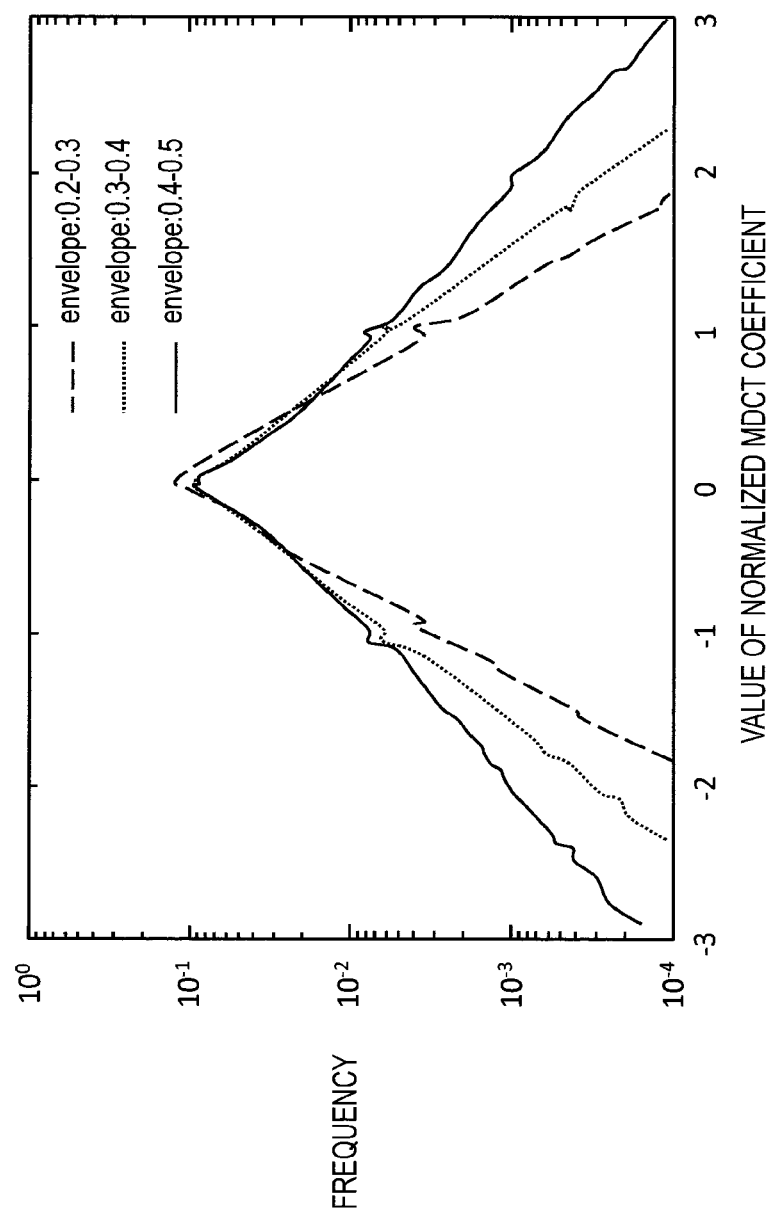
FIG. 3 is a histogram for illustrating a technical background.

FIG. 3 shows an appearance frequency of a value of each coefficient comprised in the normalized MDCT coefficient sequence when the envelope unevenness ^W(0)/^Wγ(0), ^W(1)/^Wγ(1), . . . , ^W(N−1)/^Wγ(N−1) of the normalized MDCT sequence takes each value. A curve of envelope: 0.2-0.3 indicates a frequency of a value of a normalized MDCT coefficient $X_N(k)$ corresponding to such a sample k that envelope unevenness ^W(k)/^Wγ(k) of the normalized MDCT sequence is equal to or larger than 0.2 and below 0.3. A curve of envelope: 0.3-0.4 indicates a frequency of a value of the normalized MDCT coefficient $X_N(k)$ corresponding to such a sample k that the envelope unevenness ^W(k)/^Wγ(k) of the normalized MDCT sequence is equal to or larger than 0.3 and below 0.4. A curve of envelope: 0.4-0.5 indicates a frequency of a value of the normalized MDCT coefficient $X_N(k)$ corresponding to such a sample k that the envelope unevenness ^W(k)/^Wγ(k) of the normalized MDCT sequence is equal to or larger than 0.4 and below 0.5.

It is seen from FIG. 3 that, though an average of values of coefficients comprised in the normalized MDCT coefficient sequence is almost zero, variance of the values is relevant to envelope values. That is, the larger the envelope unevenness of the normalized MDCT sequence is, the longer the foot of a curve indicating a frequency is. Therefore, it is seen that the envelope unevenness of the normalized MDCT sequence being large is relevant to variance of the values of the normalized MDCT coefficients being large. In order to realize more efficient compression, encoding utilizing this relevance is performed. Specifically, for each coefficient of a frequency domain sample sequence targeted by encoding, such encoding that changes bit assignment or that bit assignment actually changes, based on a spectral envelope, is performed.

For this purpose, for example, (i) in a case of performing Golomb-Rice encoding of a quantized normalized coefficient sequence $X_Q(0), X_Q(1), \ldots, X_Q(N-1)$, Rice parameters decided based on a spectral envelope are used. Further, for example, (ii) in a case of performing arithmetic encoding of the quantized normalized coefficient sequence $X_Q(0), X_Q(1), \ldots, X_Q(N-1)$, variance parameters decided based on the spectral envelope are used.

First, a technical background in the case of (i) will be described.

In a conventional encoding apparatus, Rice parameters used for Golomb-Rice encoding are determined, for example, from a formula (4) below which comprises an average of coefficients comprised in a quantized normalized coefficient sequence, and Golomb-Rice encoding is performed for all coefficients comprised in the quantized normalized coefficient sequence $X_Q(0), X_Q(1), \ldots, X_Q(N-1)$, using the same Rice parameters determined from the formula (4).

[Formula 3]

$$r = \max\left(\left[\log_2\left((\ln 2)\frac{1}{N}\sum_{i=0}^{N-1}|X_Q(i)|\right)\right], 0\right) \quad (4)$$

It is assumed that "●" indicates an arbitrary number, and [●] indicates a rounding operation for "●".

In comparison, in a second embodiment of the present invention, a Rice parameter for each of coefficients of the quantized normalized coefficient sequence $X_Q(0), X_Q(1), \ldots, X_Q(N-1)$ is calculated from each of values of the normalized amplitude spectral envelope sequence $\hat{W}_N(0), \hat{W}_N(1), \ldots \hat{W}_N(N-1)$ corresponding to the coefficients, respectively, and a global gain g by the following formula (5).

[Formula 4]

$$r(k) = \max\left(\left[\log_2\left(\frac{(\ln 2)\sigma}{g}\hat{W}_N(k)\right)\right], 0\right) \quad (5)$$

In the above formula, σ is a square root of predictive residual energy $\sigma^2$. That is, σ is a positive number. That is, the Rice parameter for each of the coefficients of the quantized normalized coefficient sequence $X_Q(0), X_Q(1), \ldots, X_Q(N-1)$ is an output value in a case of inputting a value of the normalized amplitude spectral envelope corresponding to each of the coefficients to a predetermined monotone non-decreasing function. By doing so, it becomes possible to obtain a Rice parameter suitable for each coefficient without newly adding information to indicate a Rice parameter for each coefficient, and it is possible to increase efficiency of Golomb-Rice encoding.

A spectral envelope determined in a method different from the conventional method may be used. Specifically, in a first embodiment of the present invention, a Levinson-Durbin algorithm is performed for what is obtained by performing inverse Fourier transform for a sequence of absolute values of an MDCT coefficients; $\hat{\beta}_1, \hat{\beta}_2, \ldots, \hat{\beta}_p$ obtained by quantizing linear prediction coefficients obtained thereby are used instead of quantized linear prediction coefficients $\hat{\alpha}_1, \hat{\alpha}_2, \ldots, \hat{\alpha}_p$; and an unsmoothed amplitude spectral envelope sequence ^H(0), ^H(1), . . . , ^H(N−1) and a smoothed amplitude spectral envelope sequence ^Hγ(0), ^Hγ(1), . . . , ^Hγ(N−1) are determined from the following formulas (6) and (7), respectively.

[Formula 5]

$$\hat{H}_\gamma(k) = \frac{1}{2\pi}\frac{1}{\left|1+\sum_{n=1}^{p}\hat{\beta}_n\gamma^n\exp(-j2\pi kn/N)\right|^2} \quad (6)$$

$$\hat{H}(k) = \frac{1}{2\pi}\frac{1}{\left|1+\sum_{n=1}^{p}\hat{\beta}_n\exp(-j2\pi kn/N)\right|^2} \quad (7)$$

By dividing each coefficient of the determined unsmoothed amplitude spectral envelope sequence ^H(0), ^H(1), . . . , ^H(N−1) by a corresponding coefficient of the smoothed amplitude spectral envelope sequence ^Hγ(0), ^Hγ(1), . . . , ^Hγ(N−1), a normalized amplitude spectral envelope sequence $\hat{H}_N(0) = \hat{H}(0)/\hat{H}\gamma(0)$, $\hat{H}_N(1) = \hat{H}(1)/\hat{H}\gamma(1), \ldots, \hat{H}_N(N-1) = \hat{H}(N-1)/\hat{H}\gamma(N-1)$ is obtained. Rice parameters are calculated from the normalized amplitude spectral envelope sequence and the global gain g by the following formula (8).

[Formula 6]

$$r(k) = \max\left(\left\lfloor \log_2\left(\frac{(\ln 2)\sigma^2}{g}\hat{H}_N(k)\right)\right\rfloor, 0\right) \quad (8)$$

In the formula (8) also, the Rice parameter for each of the coefficients of the quantized normalized coefficient sequence $X_Q(0), X_Q(1), \ldots, X_Q(N-1)$ is the output value in the case of inputting a value of the normalized amplitude spectral envelope corresponding to each of the coefficients to a predetermined monotone non-decreasing function.

The above technique is based on a minimization problem based on a code length at the time of performing Golomb-Rice encoding of the quantized normalized coefficient sequence $X_Q(0), X_Q(1), \ldots, X_Q(N-1)$. Derivation of the above technique will be described below.

A code length when Golomb-Rice encoding is performed for each quantized normalized coefficient $X_Q(k)$ by a Rice parameter $r(k)$ is represented by the following formula (9) when influence of a rounding error is ignored.

[Formula 7]

$$L = \sum_{k=0}^{N-1}\left(1 + r(k) + \frac{|X_Q(k)|}{2^{r(k)}}\right) \quad (9)$$

It is assumed that positive and negative signs are separately encoded. Consideration will be made on determining a Rice parameter sequence $r(0), r(1), \ldots, r(N-1)$ based on linear prediction coefficients which have been already quantized and encoded, in order to reduce the code length. The above formula (9) can be rewritten as below by performing formula transformation.

[Formula 8]

$$\begin{aligned}L &= \sum_{k=0}^{N-1}\left(1 + \log_2 2^{r(k)} + \frac{|X_Q(k)|}{2^{r(k)}}\right) \quad (10)\\ &= (\log_2 e)\sum_{k=0}^{N-1}\left(\frac{|X_Q(k)|}{(\log_2 e)2^{r(k)}} - \ln\frac{|X_Q(k)|}{(\log_2 e)2^{r(k)}} - 1\right) + \\ &\quad N(1 + \log_2 \ln 2 + \log_2 e) + \sum_{k=0}^{N-1}|X_Q(k)|\\ &= (\log_2 e)\sum_{k=0}^{N-1} D_{IS}((\log_2 e)2^{r(k)} \mid |X_Q(k)|) + C\end{aligned}$$

It is assumed that ln indicates a logarithm with a Napier's constant as a base, C indicates a constant for the Rice parameters, and $D_{IS}(X|Y)$ indicates an Itakura Saito distance of X from Y

[Formula 9]

$$D_{IS}(X \mid Y) = \frac{Y}{X} - \ln\frac{Y}{X} - 1$$

That is, a minimization problem of a code length L for the Rice parameter sequence comes down to a minimization problem of a sum total of Itakura Saito distances between $(\log_2 e)2^{r(k)}$ and $X_Q(k)$. Here, though it is possible to make an optimization problem for determining linear prediction coefficients to minimize a code length if one of correspondence relationships between the Rice parameter sequence $r(0), r(1), \ldots, r(N-1)$ and linear prediction coefficients $\beta_1, \beta_2, \ldots, \beta_p$ and between the Rice parameter sequence $r(0), r(1), \ldots, r(N-1)$ and the predictive residual energy $\sigma^2$ is decided, association will be made as shown below here in order to use a conventional faster method.

[Formula 10]

$$r(k) = \log_2\left(\frac{1}{(\log_2 e)g\hat{H}_\gamma(k)} \cdot \frac{\sigma^2/(2\pi)}{\left|1 + \sum_{n=1}^{p}\beta_n\exp(-j2\pi kn/N)\right|^2}\right) \quad (11)$$

When influence of quantization is ignored, each quantized normalized coefficient sequence $X_Q(0), X_Q(1), \ldots, X_Q(N-1)$ can be represented as $X_Q(k)=X(k)/(g\hat{H}\gamma(k))$ with the use of the MDCT sequence $X(0), X(1), \ldots, X(N-1)$, the smoothed amplitude spectral envelope sequence $\hat{H}\gamma(0), \hat{H}\gamma(1), \ldots, \hat{H}\gamma(N-1)$ and the global gain g. Therefore, terms depending on the Rice parameters of the formula (10) can be represented as Itakura Saito distances between the absolute values of an MDCT coefficient sequence and an all-pole spectral envelope by the formula (11).

[Formula 11]

$$(\log_2 e)\sum_{k=0}^{N-1} D_{IS}((\log_2 e)2^{r(k)} \mid |X_Q(k)|) =$$

$$(\log_2 e)\sum_{k=0}^{N-1} D_{IS}\left(\frac{1}{g\hat{H}_\gamma(k)} \cdot \sigma^2 \left/ \left|1 + \sum_{n=1}^{p}\beta_n\exp(-j2\pi kn/N)\right|^2 \right. \left| \frac{|X(k)|}{g\hat{H}_\gamma(k)}\right.\right) =$$

$$(\log_2 e)\sum_{k=0}^{N-1} D_{IS}\left(\frac{\sigma^2}{g\hat{H}_\gamma(k)}\frac{1}{\left|1 + \sum_{n=1}^{p}\beta_n\exp(-j2\pi kn/N)\right|^2} \left| |X(k)|\right.\right)$$

Conventional linear prediction analysis, that is, analysis in which the Levinson-Durbin algorithm is applied to what is obtained by performing inverse Fourier transform for a power spectrum is known as an operation of determining a linear prediction coefficient minimizing an Itakura Saito distance between the power spectrum and an all-pole spectral envelope. Therefore, as for the code length minimization problem described above, an optimal solution can be determined by applying the Levinson-Durbin algorithm to an amplitude spectrum, that is, what is obtained by performing inverse Fourier transform for absolute values of an MDCT coefficient sequence, similarly to the conventional method.

Next, a technical background in the case of (ii) will be described.

Since there are various probability distributions to which encoding targets belong, there is a possibility that, when optimal bit assignment on the assumption of an encoding target belonging to certain probability distribution (for example, Laplace distribution) is performed for an encoding target belonging to probability distribution departing from the assumption, compression efficiency decreases.

Therefore, as probability distribution to which an encoding target belongs, generalized Gaussian distribution represented by the following formula, which is distribution capable of expressing various probability distributions, will be used.

[Formula 12]

$$f_{GG}(X | \phi, \eta) = \frac{A(\eta)}{\phi} \exp\left(-\left|B(\eta)\frac{X}{\phi}\right|^\eta\right),$$

$$A(\eta) = \frac{\eta B(\eta)}{2\Gamma(1/\eta)}, B(\eta) = \sqrt{\frac{\Gamma(3/\eta)}{\Gamma(1/\eta)}}, \Gamma(x) = \int_0^\infty e^{-t}t^{x-1}dt$$

Figure 12:
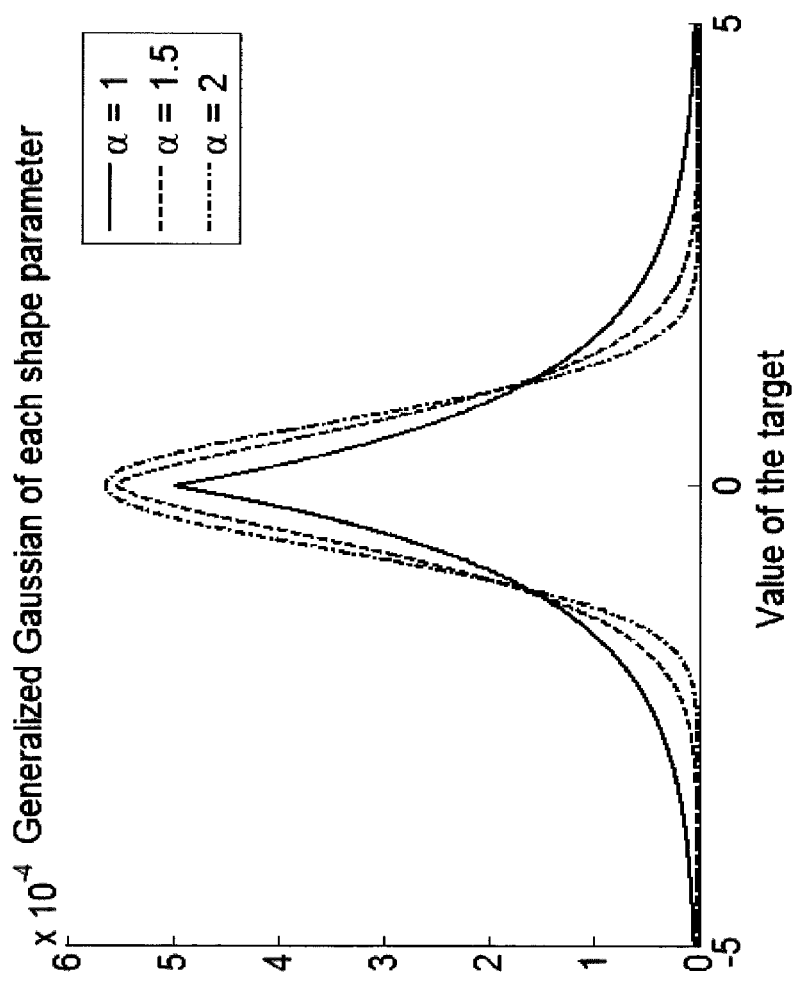
FIG. 12 is a diagram for illustrating a technical background of the present invention.

By changing a shape parameter (>0), the generalized Gaussian distribution can express various distributions, for example, Laplace distribution at the time of η=1 and Gaussian distribution at the time of η=2 as shown in FIG. 12. Here, η is a predetermined number larger than 0, and η may be a predetermined number larger than 0 other than 2. Specifically, η may be a predetermined positive number smaller than 2. The value of η may be decided in advance or may be selected or variable for each frame, which is a predetermined time section. Further, φ in the above formula is a value corresponding to variance of distribution. Information about unevenness of a spectral envelope is incorporated with this value as a variance parameter. That is, variance parameters φ(0), φ(1), . . . , φ(N−1) are generated from a spectral envelope; for the quantized normalized coefficient $X_Q(k)$ at each frequency k, such an arithmetic code that becomes optimal when being in accordance with $f_{GG}(X|\phi(k),\eta)$ is configured; and encoding is performed with the arithmetic code based on the configuration.

It is assumed below that one shape parameter η has been decided.

In a third embodiment of the present invention, distribution information to be used in addition to the information of the predictive residual energy $\sigma^2$ and the global gain g is further adopted, and a variance parameter for each coefficient of the quantized normalized coefficient sequence $X_Q(0), X_Q(1), \ldots, X_Q(N-1)$ is calculated, for example, by the following formula (A1).

[Formula 13]

$$\phi(k) = \eta^{1/\eta} B(\eta) \hat{H}_N(k) \frac{\sigma^{2/\eta}}{g} \quad (A1)$$

In the above formula, σ is a square root of $\sigma^2$.

Specifically, the Levinson-Durbin algorithm is performed for what is obtained by performing inverse Fourier transform for a sequence of values obtained by raising absolute values of MDCT coefficients to the power of η; and, using $\hat{\beta}_1, \hat{\beta}_2, \ldots, \hat{\beta}_p$, which are obtained by quantizing linear prediction coefficients obtained thereby, instead of the quantized linear prediction coefficients $\hat{\alpha}_1, \hat{\alpha}_2, \ldots, \hat{\alpha}_p$, the unsmoothed amplitude spectral envelope sequence ^H(0), ^H(1), . . . , ^H(N−1) and the smoothed amplitude spectral envelope sequence ^Hγ(0), ^Hγ(1), . . . , ^Hγ(N−1) are determined from the following formulas (A2) and (A3), respectively.

[Formula 14]

$$\hat{H}(k) = \left(\frac{1}{2\pi} \frac{1}{\left|1 + \sum_{n=1}^p \hat{\beta}_n \exp(-j2\pi kn/N)\right|^2}\right)^{1/\eta} \quad (A2)$$

$$\hat{H}_\gamma(k) = \left(\frac{1}{2\pi} \frac{1}{\left|1 + \sum_{n=1}^p \hat{\beta}_n \gamma^n \exp(-j2\pi kn/N)\right|^2}\right)^{1/\eta} \quad (A3)$$

By dividing each of coefficients of the determined unsmoothed amplitude spectral envelope sequence ^H(0), ^H(1), . . . , ^H(N−1) by a corresponding each of coefficients of the smoothed amplitude spectral envelope sequence ^Hγ(0), ^Hγ(1), . . . , ^Hγ(N−1), a normalized amplitude spectral envelope sequence ^H_N(0)=^H(0)/^Hγ(0), ^H_N(1)=^H(1)/^Hγ(1), . . . , ^H_N(N−1)=^H(N−1)/^Hγ(N−1) is obtained. From the normalized amplitude spectral envelope sequence and the global gain g, variance parameters are calculated with the above formula (A1).

Here, $\sigma^{2/\eta}/g$ in the formula (A1) is a value closely related with entropy, and fluctuation of the value for each frame is small when a bit rate is fixed. Therefore, it is possible to use a predetermined fixed value as $\sigma^{2/\eta}/g$. In the case of using a fixed value as described above, it is not necessary to newly add information for the method of the present invention.

The above technique is based on a minimization problem based on a code length at the time of performing arithmetic encoding of the quantized normalized coefficient sequence $X_Q(0), X_Q(1), \ldots, X_Q(N-1)$. Derivation of the above technique will be described below.

When it is assumed that quantization has been performed sufficiently in detail, a code length at the time of encoding each quantized normalized coefficient $X_Q(k)$ with an arithmetic code using generalized Gaussian distribution of the shape parameter η by a corresponding variance parameter φ(k) is in proportion to a length represented by the following formula (A4).

[Formula 15]

$$L = \sum_{k=0}^{N-1} -\log_2 f_{GG}(X_Q(k) | \phi(k), \eta) \quad (A4)$$

Consideration will be made on determining the variance parameter sequence φ(0), φ(1), . . . , φ(N−1) based on linear prediction coefficients which have been already quantized and encoded, in order to reduce the code length. The above formula (A4) can be rewritten as below by performing formula transformation.

[Formula 16]

$$L = (\log_2 e) \sum_{k=0}^{N-1} \left[\left|\frac{B(\eta)X_Q(k)}{\phi(k)}\right|^\eta + \ln \phi(k) - \ln A(\eta)\right] \quad (A5)$$

$$= (\log_2 e) \sum_{k=0}^{N-1} \left[\frac{1}{\eta}\left(\frac{|X_Q(k)|^\eta}{\phi^\eta(k)/(\eta B^\eta(\eta))} - \ln\frac{|X_Q(k)|^\eta}{\phi^\eta(k)/(\eta B^\eta(\eta))} - 1\right) + \right.$$

$$\left. \frac{1}{\eta}\ln \eta B^\eta(\eta) + \ln|X_Q(k)| + \frac{1}{\eta} - \ln A(\eta)\right]$$

$$= \frac{1}{\eta \ln 2} \sum_{k=0}^{N-1} D_{IS}\left(\frac{\phi^\eta(k)}{\eta B^\eta(\eta)} \middle| |X_Q(k)|^\eta\right) + C$$

It is assumed that ln indicates a logarithm with a Napier's constant as a base, C indicates a constant for the variance parameters, and $D_{IS}(X|Y)$ indicates an Itakura Saito distance of X from Y

[Formula 17]

$$D_{IS}(X \mid Y) = \frac{Y}{X} - \ln\frac{Y}{X} - 1$$

That is, a minimization problem of a code length L for the variance parameter sequence comes down to a minimization problem of a sum total of Itakura Saito distances between $\phi^{\eta}(k)/(\eta B^{\eta}(\eta))$ and $|X_Q(k)|^{\eta}$. Here, though it is possible to make an optimization problem for determining linear prediction coefficients to minimize a code length if one of correspondence relationships between the variance parameter sequence $\phi(0), \phi(1), \ldots, \phi(N-1)$ and the linear prediction coefficients $\beta_1, \beta_2, \ldots, \beta_p$ and between the variance parameter sequence $\phi(0), \phi(1), \ldots, \phi(N-1)$ and the predictive residual energy $\sigma^2$ is decided, association will be made as shown below in order to use the conventional faster method.

[Formula 18]

$$\phi(k) = \frac{1}{g\hat{H}_\gamma(k)} \cdot \left( \frac{\eta B^\eta(\eta)\sigma^2/(2\pi)}{\left|1 + \sum_{n=1}^{p} \beta_n \exp(-j2\pi kn/N)\right|^2} \right)^{1/\eta} \quad (A6)$$

When influence of quantization is ignored, each quantized normalized coefficient sequence $X_Q(0), X_Q(1), \ldots, X_Q(N-1)$ can be represented as $X_Q(k)=X(k)/(g\hat{H}\gamma(k))$ with the use of the MDCT sequence $X(0), X(1), \ldots, X(N-1)$, the smoothed amplitude spectral envelope sequence $\hat{H}\gamma(0), \hat{H}\gamma(1), \ldots, \hat{H}\gamma(N-1)$ and the global gain g. Therefore, terms depending on the variance parameters of the formula (A5) are represented as Itakura Saito distances between absolute values of an MDCT coefficient sequence and an all-pole spectral envelope by the formula (A6).

[Formula 19]

$$\frac{1}{\eta \ln 2}\sum_{k=0}^{N-1} D_{IS}\left( \frac{\phi^\eta(k)}{\eta B^\eta(\eta)} \,\bigg|\, |X_Q(k)|^\eta \right) =$$

$$\frac{1}{\eta \ln 2}\sum_{k=0}^{N-1} D_{IS}\left( \left(\frac{1}{g\hat{H}_\gamma(k)}\right)^\eta \cdot \frac{\sigma^2/(2\pi)}{\left|1+\sum_{n=1}^{p}\beta_n\exp(-j2\pi kn/N)\right|^2} \,\bigg|\, \frac{|X(k)|^\eta}{(g\hat{H}_\gamma(k))^\eta} \right) =$$

$$\frac{1}{\eta \ln 2}\sum_{k=0}^{N-1} D_{IS}\left( \frac{\sigma^2}{2\pi}\frac{1}{\left|1+\sum_{n=1}^{p}\beta_n\exp(-j2\pi kn/N)\right|^2} \,\bigg|\, |X(k)|^\eta \right)$$

Conventional linear prediction analysis, that is, analysis in which the Levinson-Durbin algorithm is applied to what is obtained by performing inverse Fourier transform for a power spectrum is known as an operation of determining a linear prediction coefficient minimizing an Itakura Saito distance between the power spectrum and an all-pole spectral envelope. Therefore, as for the code length minimization problem described above, an optimal solution can be determined by applying the Levinson-Durbin algorithm to an amplitude spectrum raised to the power of $\eta$, that is, what is obtained by performing inverse Fourier transform for absolute values of an MDCT coefficient sequence raised to the power of $\eta$, similarly to the conventional method.

First Embodiment (Encoding of First Embodiment)

Figure 4:
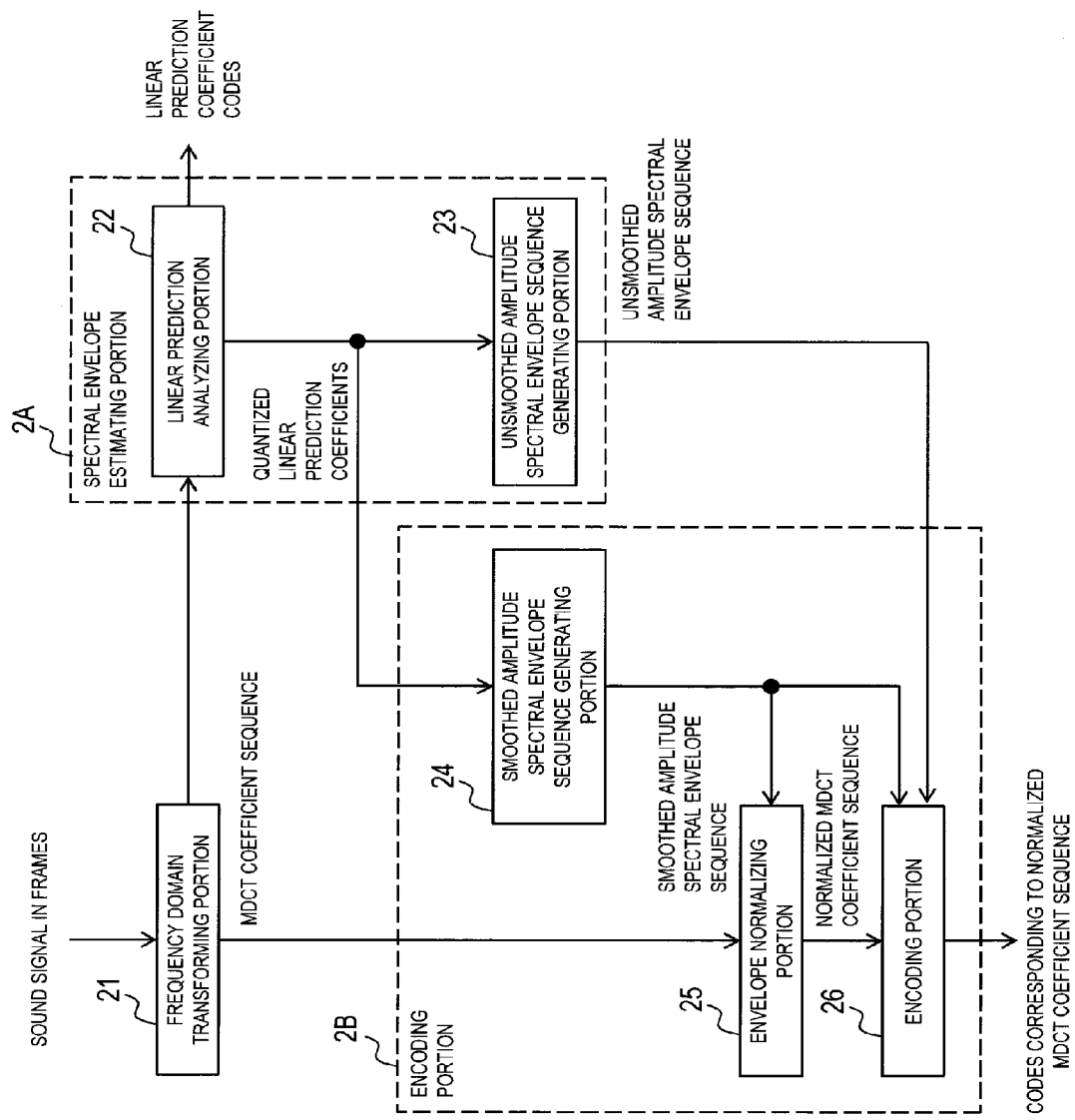
FIG. 4 is a block diagram for illustrating an example of an encoding apparatus of the present invention.
Figure 5:
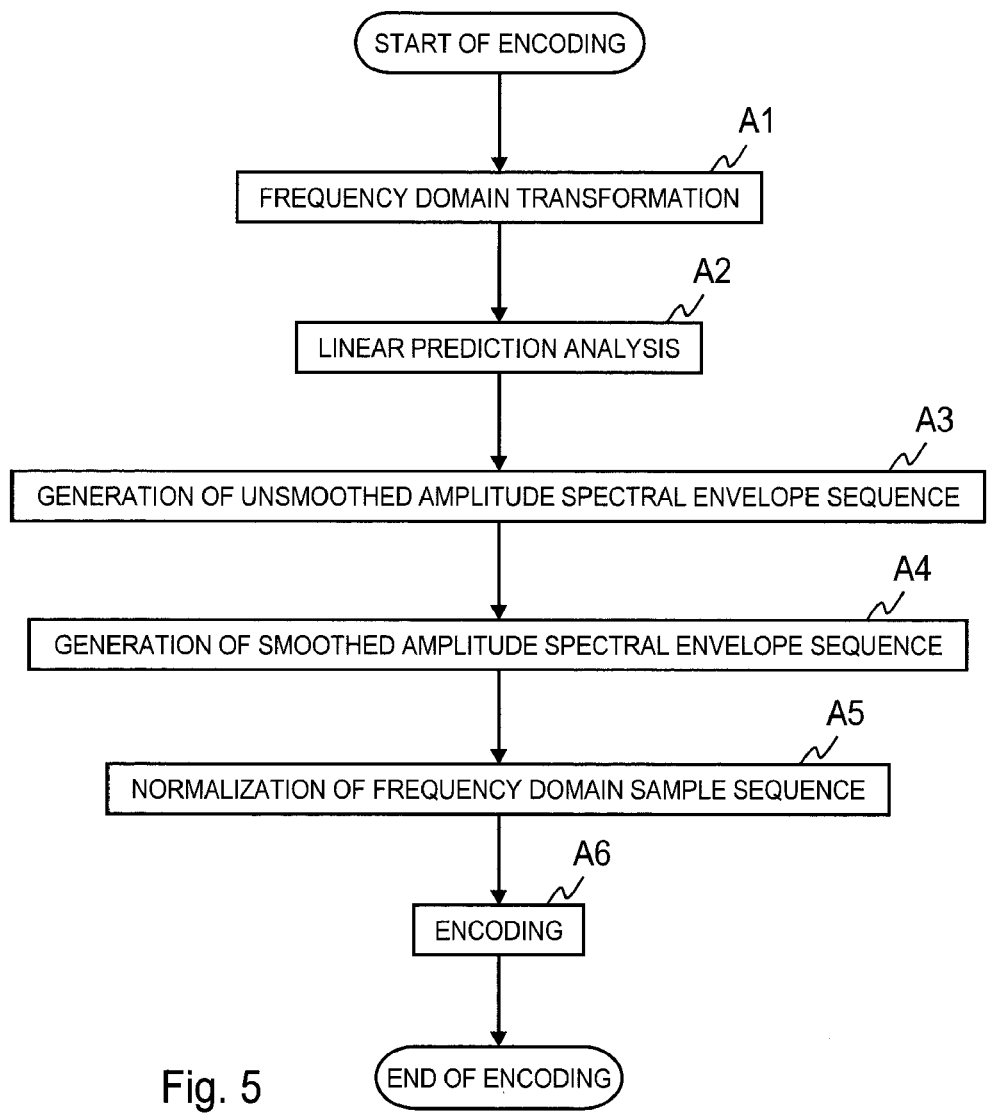
FIG. 5 is a flowchart for illustrating an example of an encoding method of the present invention.

FIG. 4 shows a configuration example of an encoding apparatus of the first embodiment. As shown in FIG. 4, the encoding apparatus of the first embodiment is, for example, provided with a frequency domain transforming portion 21, a linear prediction analyzing portion 22, an unsmoothed amplitude spectral envelope sequence generating portion 23, a smoothed amplitude spectral envelope sequence generating portion 24, an envelope normalizing portion 25 and an encoding portion 26. FIG. 5 shows an example of each process of an encoding method of the first embodiment realized by this encoding apparatus.

Each portion in FIG. 4 will be described below.

<Frequency Domain Transforming Portion 21>

A time domain sound signal is inputted to the frequency domain transforming portion 21. An example of the sound signal is a voice digital signal or an acoustic digital signal.

The frequency domain transforming portion 21 transforms the inputted time domain sound signal to an MDCT coefficient sequence $X(0), X(1), \ldots, X(N-1)$ at a point N in a frequency domain for each frame with a predetermined time length (step A1). Here, N is a positive integer.

The obtained MDCT coefficient sequence $X(0), X(1), \ldots, X(N-1)$ is outputted to the linear prediction analyzing portion 22 and the envelope normalizing portion 25.

It is assumed that processes after that are performed for each frame unless otherwise stated.

In this way, the frequency domain transforming portion 21 determines a frequency domain sample sequence, which is, for example, an MDCT coefficient sequence, corresponding to a sound signal.

<Linear Prediction Analyzing Portion 22>

The MDCT coefficient sequence $X(0), X(1), \ldots, X(N-1)$ obtained by the frequency domain transforming portion 21 is inputted to the linear prediction analyzing portion 22.

The linear prediction analyzing portion 22 generates linear prediction coefficients $\beta_1, \beta_2, \ldots, \beta_p$ by performing linear prediction analysis of $\tilde{X}(0), \tilde{X}(1), \ldots, \tilde{X}(N-1)$ defined by the following formula (12) using the MDCT coefficient sequence $X(0), X(1), \ldots, X(N-1)$, and encodes the generated linear prediction coefficients $\beta_1, \beta_2, \ldots, \beta_p$ to generate linear prediction coefficient codes and quantized linear prediction coefficients $\hat{\beta}_1, \hat{\beta}_2, \ldots, \hat{\beta}_p$, which are quantized linear prediction coefficients corresponding to the linear prediction coefficient codes (step A2).

[Formula 20]

$$\tilde{X}(k) = \sum_{k=0}^{N-1} |X(n)|\exp\left(-j\frac{2\pi kn}{N}\right), k = 0, 1, \ldots, N-1 \quad (12)$$

The generated quantized linear prediction coefficients $\hat{\beta}_1, \hat{\beta}_2, \ldots, \hat{\beta}_p$ are outputted to the unsmoothed spectral envelope sequence generating portion 23 and the smoothed amplitude spectral envelope sequence generating portion 24.

Further, the generated linear prediction coefficient codes are transmitted to a decoding apparatus.

Specifically, by performing operation corresponding to inverse Fourier transform regarding absolute values of the MDCT coefficient sequence X(0), X(1), . . . , X(N−1) as a power spectrum, that is, the operation of the formula (12) first, the linear prediction analyzing portion 22 determines a pseudo correlation function signal sequence ˜X(0), ˜X(1), . . . , ˜X(N−1), which is a time domain signal sequence corresponding to the MDCT coefficient sequence X(0), X(1), . . . , X(N−1). Then, the linear prediction analyzing portion 22 performs linear prediction analysis using the determined pseudo correlation function signal sequence ˜X(0), ˜X(1), . . . , ˜X(N−1) to generate linear prediction coefficients $\beta_1, \beta_2, \ldots, \beta_p$. Then, by encoding the generated linear prediction coefficients $\beta_1, \beta_2, \ldots, \beta_p$, the linear prediction analyzing portion 22 obtains linear prediction coefficient codes and quantized linear prediction coefficients $\hat{\beta}_1, \hat{\beta}_2, \ldots, \hat{\beta}_p$ corresponding the linear prediction coefficient codes.

The linear prediction coefficients $\beta_1, \beta_2, \ldots, \beta_p$ are linear prediction coefficients corresponding to a time domain signal when the absolute values of the MDCT coefficient sequence X(0), X(1), . . . , X(N−1) are regarded as a power spectrum.

Generation of the linear prediction coefficient codes by the linear prediction analyzing portion 22 is performed, for example, by a conventional encoding technique. As examples of the conventional encoding technique, for example, an encoding technique in which a code corresponding to a linear prediction coefficient itself is caused to be a linear prediction coefficient code, an encoding technique in which a linear prediction coefficient is transformed to an LSP parameter, and a code corresponding to the LSP parameter is caused to be a linear prediction coefficient code, an encoding technique in which a linear prediction coefficient is transformed to a PARCOR coefficient, and a code corresponding to the PARCOR coefficient is caused to be a linear prediction coefficient code, and the like are given. For example, the encoding technique in which a code corresponding to a linear prediction coefficient itself is caused to be a linear prediction coefficient code is a technique in which a plurality of quantized linear prediction coefficient candidates are specified in advance; each candidates is stored being associated with a linear prediction coefficient code in advance; any of the candidates is decided as a quantized linear prediction coefficient corresponding to a generated linear prediction coefficient; and, thereby, the quantized linear prediction coefficient and the linear prediction coefficient code are obtained.

<Unsmoothed Amplitude Spectral Envelope Sequence Generating Portion 23>

The quantized linear prediction coefficients $\hat{\beta}_1, \hat{\beta}_2, \ldots, \hat{\beta}_p$ generated by the linear prediction analyzing portion 22 are inputted to the unsmoothed amplitude spectral envelope sequence generating portion 23.

The unsmoothed amplitude spectral envelope sequence generating portion 23 generates an unsmoothed amplitude spectral envelope sequence ˆH(0), ˆH(1), . . . , ˆH(N−1), which is an amplitude spectral envelope sequence corresponding to the quantized linear prediction coefficients $\hat{\beta}_1, \hat{\beta}_2, \ldots, \hat{\beta}_p$ (step A3).

The generated unsmoothed amplitude spectral envelope sequence ˆH(0), ˆH(1), . . . , ˆH(N−1) is outputted to the encoding portion 26.

The unsmoothed amplitude spectral envelope sequence generating portion 23 generates an unsmoothed amplitude spectral envelope sequence ˆH(0), ˆH(1), . . . , ˆH(N−1) defined by the following formula (13) as the unsmoothed amplitude spectral envelope sequence ˆH(0), ˆH(1), . . . , ˆH(N−1) using the quantized linear prediction coefficients $\hat{\beta}_1, \hat{\beta}_2, \ldots, \hat{\beta}_p$.

[Formula 21]

$$\hat{H}(k) = \frac{1}{2\pi} \frac{1}{\left|1 + \sum_{n=1}^{p} \hat{\beta}_n \exp(-j2\pi kn/N)\right|^2} \tag{13}$$

In this way, the unsmoothed amplitude spectral envelope sequence generating portion 23 obtains an unsmoothed amplitude spectral envelope sequence, which is a sequence of an amplitude spectral envelope corresponding to a sound signal.

<Smoothed Amplitude Spectral Envelope Sequence Generating Portion 24>

The quantized linear prediction coefficients $\hat{\beta}_1, \hat{\beta}_2, \ldots, \hat{\beta}_p$ generated by the linear prediction analyzing portion 22 are inputted to the smoothed amplitude spectral envelope sequence generating portion 24.

The smoothed amplitude spectral envelope sequence generating portion 24 generates a smoothed amplitude spectral envelope sequence ˆHγ(0), ˆHγ(1), . . . , ˆHγ(N−1), which is a sequence obtained by reducing amplitude unevenness of an amplitude spectral envelope sequence corresponding to the quantized linear prediction coefficients $\hat{\beta}_1, \hat{\beta}_2, \ldots, \hat{\beta}_p$ (step A4).

The generated smoothed amplitude spectral envelope sequence ˆHγ(0), ˆHγ(1), . . . , ˆHγ(N−1) is outputted to the envelope normalizing portion 25 and the encoding portion 26.

The smoothed amplitude spectral envelope sequence generating portion 24 generates a smoothed amplitude spectral envelope sequence ˆHγ(0), ˆHγ(1), . . . , ˆHγ(N−1) defined by the following formula (14) as the smoothed amplitude spectral envelope sequence ˆHγ(0), ˆHγ(1), . . . , ˆHγ(N−1) using the quantized linear prediction coefficients $\hat{\beta}_1, \hat{\beta}_2, \ldots, \hat{\beta}_p$ and a correction coefficient γ.

[Formula 22]

$$\hat{H}_\gamma(k) = \frac{1}{2\pi} \frac{1}{\left|1 + \sum_{n=1}^{p} \hat{\beta}_n \gamma^n \exp(-j2\pi kn/N)\right|^2}, k = 0, 1, \ldots, N-1 \tag{14}$$

Here, the correction coefficient γ is a predetermined constant smaller than 1 and is a coefficient which reduces amplitude unevenness of the unsmoothed amplitude spectral envelope sequence ˆH(0), ˆH(1), . . . , ˆH(N−1), in other words, a coefficient which smoothes the unsmoothed amplitude spectral envelope sequence ˆH(0), ˆH(1), . . . , ˆH(N−1).

In this way, the smoothed amplitude spectral envelope sequence generating portion 24 obtains a smoothed amplitude spectral envelope sequence, which is a sequence obtained by smoothing amplitude unevenness of an unsmoothed amplitude spectral envelope sequence.

<Envelope Normalizing Portion 25>

The MDCT coefficient sequence X(0), X(1), . . . , X(N−1) obtained by the frequency domain transforming portion 21 and the smoothed amplitude spectral envelope sequence ^Hγ(0), ^Hγ(1), ..., ^Hγ(N−1) generated by the smoothed amplitude spectral envelope sequence generating portion 24 are inputted to the envelope normalizing portion 25.

The envelope normalizing portion 25 generates a normalized MDCT coefficient sequence $X_N(0), X_N(1), \ldots, X_N(N-1)$ by normalizing each coefficient of the MDCT coefficient sequence $X(0), X(1), \ldots, X(N-1)$ by a corresponding value of the smoothed amplitude spectral envelope sequence ^Hγ(0), ^Hγ(1), ..., ^Hγ(N−1) (step A5).

The generated normalized MDCT coefficient sequence is outputted to the encoding portion 26.

The envelope normalizing portion 25 generates each coefficient $X_N(k)$ of the normalized MDCT coefficient sequence $X_N(0), X_N(1), \ldots, X_N(N-1)$ by dividing each coefficient $X(k)$ of the MDCT coefficient sequence $X(0), X(1), \ldots, X(N-1)$ by the smoothed amplitude spectral envelope sequence ^Hγ(0), ^Hγ(1), ..., ^Hγ(N−1), for example, on the assumption of $k=0, 1, \ldots, N-1$. That is, $X_N(k)=X(k)/\hat{H}\gamma(k)$ is satisfied on the assumption of $k=0, 1, \ldots, N-1$.

In this way, the envelope normalizing portion 25 normalizes each sample of a frequency domain sample sequence, which is, for example, an MDCT coefficient sequence, by a corresponding sample of a smoothed amplitude spectral envelope sequence and obtains a normalized frequency domain sample sequence which is, for example, a normalized MDCT coefficient sequence.

<Encoding Portion 26>

The normalized MDCT coefficient sequence $X_N(0), X_N(1), \ldots, X_N(N-1)$ generated by the envelope normalizing portion 25, the unsmoothed amplitude spectral envelope sequence ^H(0), ^H(1), ..., ^H(N−1) generated by the unsmoothed amplitude spectral envelope sequence generating portion 23 and the smoothed amplitude spectral envelope sequence ^Hγ(0), ^Hγ(1), ..., ^Hγ(N−1) generated by the smoothed amplitude spectral envelope sequence generating portion 24 are inputted to the encoding portion 26.

Figure 8:
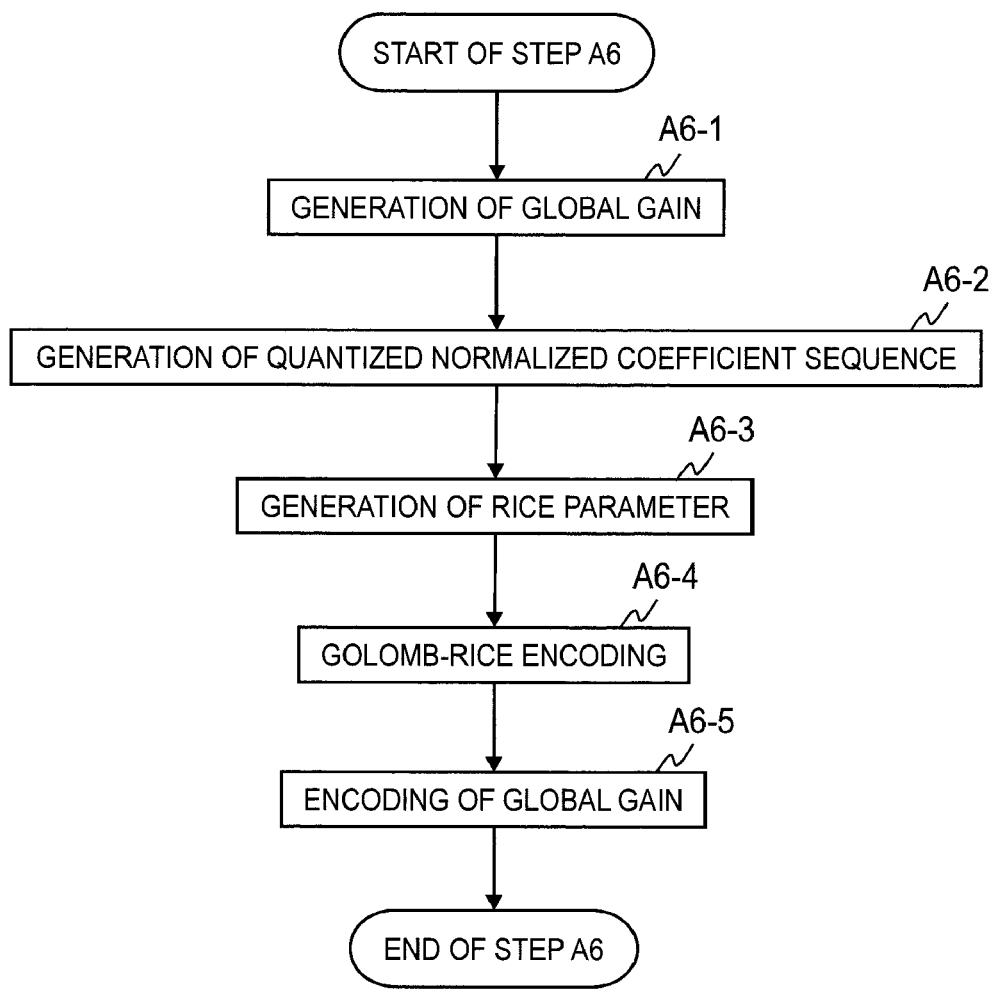
FIG. 8 is a flowchart for illustrating an example of a process of the encoding portion of the present invention.

The encoding portion 26 performs encoding by performing processes of steps A6-1 to A6-5 illustrated in FIG. 8 (step A6). That is, the encoding portion 26 determines a global gain g corresponding to the normalized MDCT coefficient sequence $X_N(0), X_N(1), \ldots, X_N(N-1)$ (step A6-1), determines a quantized normalized coefficient sequence $X_Q(0), X_Q(1), \ldots, X_Q(N-1)$, which is a sequence of integer values obtained by quantizing a result of dividing each coefficient of the normalized MDCT coefficient sequence $X_N(0), X_N(1), \ldots, X_N(N-1)$ by the global gain g (step A6-2), determines Rice parameters $r(0), r(1), \ldots, r(N-1)$ corresponding to coefficients of the quantized normalized coefficient sequence $X_Q(0), X_Q(1), \ldots, X_Q(N-1)$, respectively, from the global gain g, the unsmoothed amplitude spectral envelope sequence ^H(0), ^H(1), ..., ^H(N−1), and the smoothed amplitude spectral envelope sequence ^Hγ(0), ^Hγ(1), ..., ^Hγ(N−1) by the above formula (8) (step A6-3), performs Golomb-Rice encoding of the quantized normalized coefficient sequence $X_Q(0), X_Q(1), \ldots, X_Q(N-1)$ using the Rice parameters $r(0), r(1), \ldots, r(N-1)$ to obtain integer signal codes (step A6-4) and obtains a gain code corresponding to the global gain g (step A6-5).

Here, the normalized amplitude spectral envelope sequence ^H_N(0), ^H_N(1), ..., ^H_N(N−1) in the above formula (8) is what is obtained by dividing each value of the unsmoothed amplitude spectral envelope sequence ^H(0), ^H(1), ..., ^H(N−1) by a corresponding value of the smoothed amplitude spectral envelope sequence ^Hγ(0), ^Hγ(1), ..., ^Hγ(N−1), that is, what is determined by the following formula (15).

[Formula 23]

$$\hat{H}_N(k) = \frac{\hat{H}(k)}{\hat{H}_\gamma(k)}, k = 0, 1, \ldots, N-1 \qquad (15)$$

The generated integer signal codes and the gain code are outputted to the decoding apparatus as codes corresponding to the normalized MDCT coefficient sequence.

The encoding portion 26 realizes a function of deciding such a global gain g that the number of bits of the integer signal codes is equal to or smaller than the number of allocated bits B, which is the number of bits allocated in advance, and is as large as possible and generating a gain code corresponding to the decided global gain g and integer signal codes corresponding to the decided global gain by the above steps A6-1 to A6-5.

Among steps A6-1 to A6-5 performed by the encoding portion 26, it is step A6-3 that a characteristic process is comprised. As for the encoding process itself which is for obtaining codes corresponding to the normalized MDCT coefficient sequence by encoding each of the global gain g and the quantized normalized coefficient sequence $X_Q(0), X_Q(1), \ldots, X_Q(N-1)$, various publicly-known techniques comprising the technique described in Non-patent literature 1 exist. Two specific examples of the encoding process performed by the encoding portion 26 will be described below.

[Specific Example 1 of Encoding Process Performed by Encoding Portion 26]

As a specific example 1 of the encoding process performed by the encoding portion 26, an example which does not include a loop process will be described.

Figure 6:
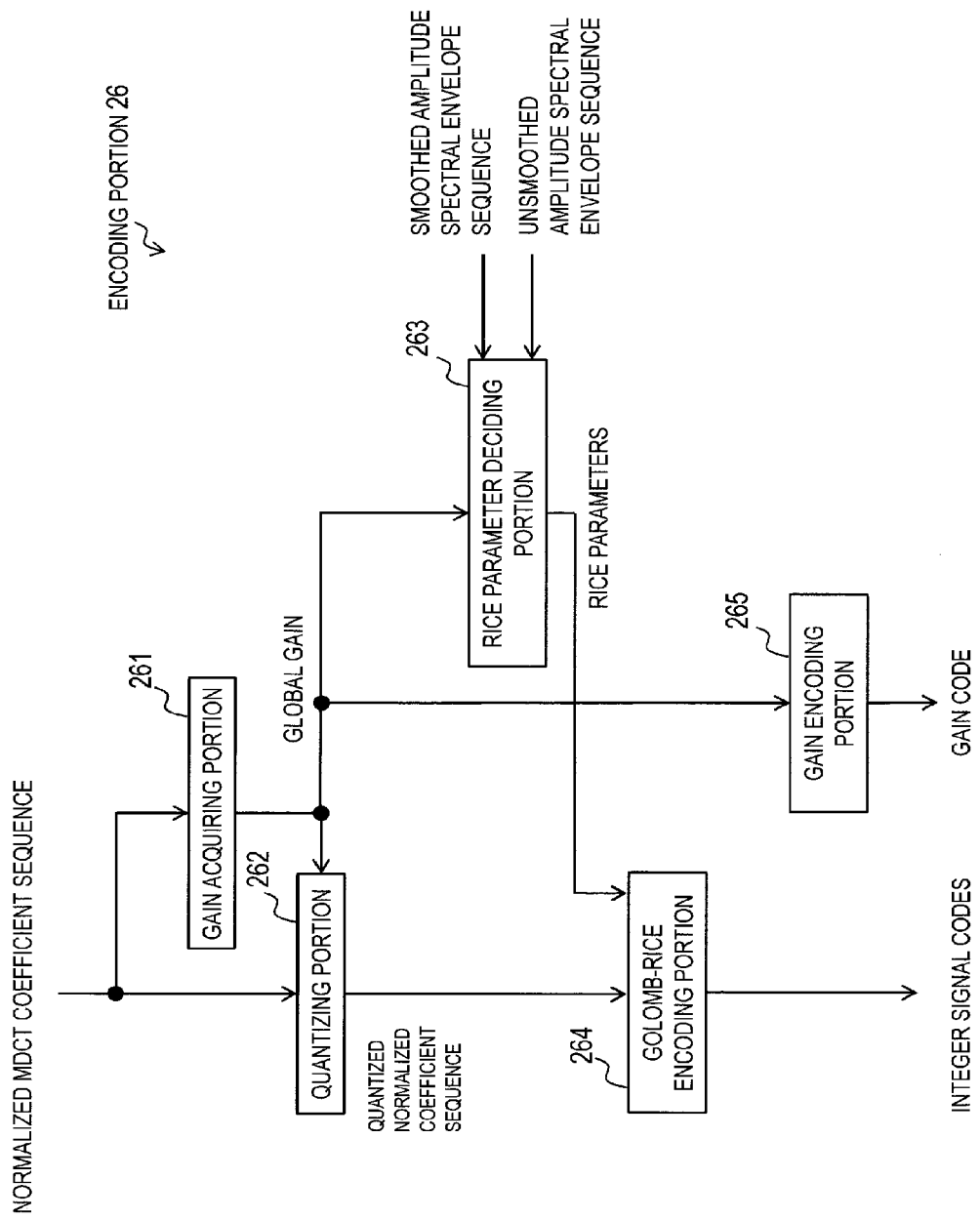
FIG. 6 is a block diagram for illustrating an example of an encoding portion of the present invention.

FIG. 6 shows a configuration example of the encoding portion 26 of the specific example 1. As shown in FIG. 6, the encoding portion 26 of the specific example 1 is, for example, provided with a gain acquiring portion 261, a quantizing portion 262, a Rice parameter deciding portion 263, a Golomb-Rice encoding portion 264 and a gain encoding portion 265. Each portion in FIG. 6 will be described below.

<Gain Acquiring Portion 261>

The gain acquiring portion 261 decides such a global gain g that the number of bits of integer signal codes is equal to or smaller than the number of allocated bits B, which is the number of bits allocated in advance, and is as large as possible from an inputted normalized MDCT coefficient sequence $X_N(0), X_N(1), \ldots, X_N(N-1)$ and outputs the global gain g (step S261). For example, the gain acquiring portion 261 acquires and outputs a multiplication value of a square root of the total of energy of the inputted normalized MDCT coefficient sequence $X_N(0), X_N(1), \ldots, X_N(N-1)$ and a constant which is in negative correlation with the number of allocated bits B as the global gain g. Otherwise, the gain acquiring portion 261 may tabulate a relationship among the total of the energy of the inputted normalized MDCT coefficient sequence $X_N(0), X_N(1), \ldots, X_N(N-1)$, the number of allocated bits B and the global gain g in advance, and obtain and output a global gain g by referring to the table.

In this way, the gain acquiring portion 261 obtains a gain for performing division of all samples of a normalized frequency domain sample sequence which is, for example, a normalized MDCT coefficient sequence.

<Quantizing Portion 262>

The quantizing portion 262 obtains and outputs a quantized normalized coefficient sequence $X_Q(0), X_Q(1), \ldots, X_Q(N-1)$ as a sequence of the integer part of a result of dividing each coefficient of the inputted normalized MDCT coefficient sequence $X_N(0), X_N(1), \ldots, X_N(N-1)$ by the global gain g obtained by the gain acquiring portion 261 (step S262).

In this way, the quantizing portion 262 determines a quantized normalized coefficient sequence by dividing each sample of a normalized frequency domain sample sequence which is, for example, a normalized MDCT coefficient sequence by a gain and quantizing the result.

<Rice Parameter Deciding Portion 263>

The Rice parameter deciding portion 263 obtains and outputs each Rice parameter of a Rice parameter sequence $r(0), r(1), \ldots, r(N-1)$ from the global gain g obtained by the gain acquiring portion 261, an inputted unsmoothed amplitude spectral envelope sequence $\hat{H}(0), \hat{H}(1), \ldots, \hat{H}(N-1)$ and an inputted smoothed amplitude spectral envelope sequence $\hat{H}\gamma(0), \hat{H}\gamma(1), \ldots, \hat{H}\gamma(N-1)$ by the above formula (8) (step S263).

In this way, the Rice parameter deciding portion 263 determines a Rice parameter for performing Golomb-Rice encoding of a quantized normalized coefficient sequence, for each coefficient of the quantized normalized coefficient sequence, based on a smoothed amplitude spectral envelope sequence, an unsmoothed amplitude spectral envelope and a gain.

A Rice parameter decision device on the encoding side is a device which is at least provided with the Rice parameter deciding portion 263. The Rice parameter decision device on the encoding side may be provided with other portions such as the unsmoothed amplitude spectral envelope sequence generating portion 23, the smoothed amplitude spectral envelope sequence generating portion 24, the envelope normalizing portion 25, the gain acquiring portion 261 and the quantizing portion 262.

<Golomb-Rice Encoding Portion 264>

The Golomb-Rice encoding portion 264 performs Golomb-Rice encoding of the quantized normalized coefficient sequence $X_Q(0), X_Q(1), \ldots, X_Q(N-1)$ obtained by the quantizing portion 262, using each Rice parameter of the Rice parameter sequence $r(0), r(1), \ldots, r(N-1)$ obtained by the Rice parameter deciding portion 263 as a Rice parameter corresponding to each coefficient of the quantized normalized coefficient sequence $X_Q(0), X_Q(1), \ldots, X_Q(N-1)$, to obtain and output integer signal codes (step S264).

<Gain Encoding Portion 265>

The gain encoding portion 265 encodes the global gain g obtained by the gain acquiring portion 261 to obtain and output a gain code (step S265).

The generated integer signal codes and gain code are outputted to the decoding apparatus as codes corresponding to the normalized MDCT coefficient sequence.

That is, steps S261 to S265 of the present specific example correspond to the above steps A6-1 to A6-5, respectively.

[Specific Example 2 of Encoding Process Performed by Encoding Portion 26]

As a specific example 2 of the encoding process performed by the encoding portion 26, an example which comprises a loop process will be described.

Figure 7:
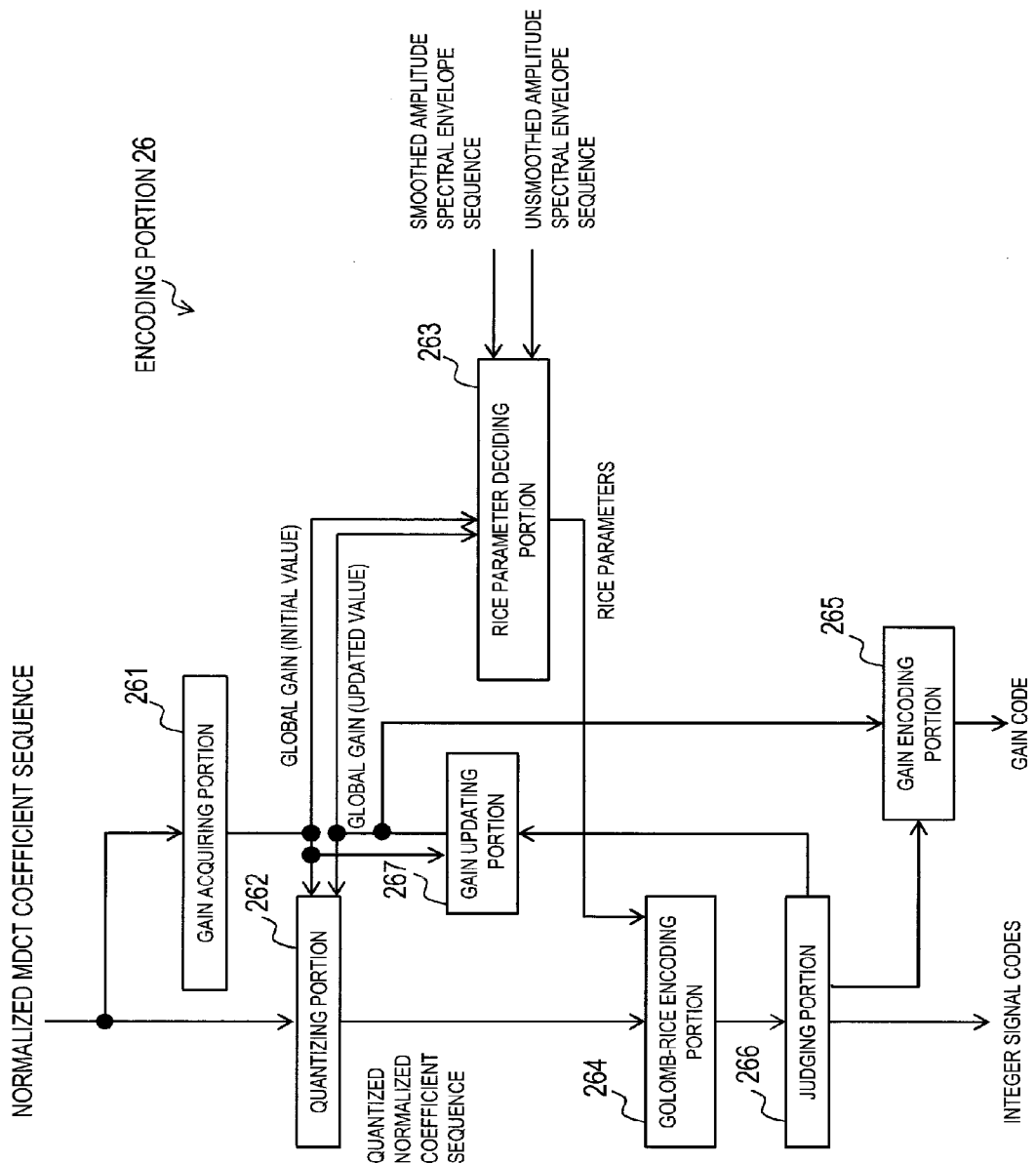
FIG. 7 is a block diagram for illustrating an example of the encoding portion of the present invention.

FIG. 7 shows a configuration example of the encoding portion 26 of the specific example 2. As shown in FIG. 7, the encoding portion 26 of the specific example 2 is, for example, provided with a gain acquiring portion 261, a quantizing portion 262, a Rice parameter deciding portion 263, a Golomb-Rice encoding portion 264, a gain encoding portion 265, a judging portion 266 and a gain updating portion 267. Each portion in FIG. 7 will be described below.

<Gain Acquiring Portion 261>

The gain acquiring portion 261 decides such a global gain g that the number of bits of integer signal codes is equal to or smaller than the number of allocated bits B, which is the number of bits allocated in advance, and is as large as possible from an inputted normalized MDCT coefficient sequence $X_N(0), X_N(1), \ldots, X_N(N-1)$ and outputs the global gain g (step S261). For example, the gain acquiring portion 261 acquires and outputs a multiplication value of a square root of the total of energy of the normalized MDCT coefficient sequence $X_N(0), X_N(1), \ldots, X_N(N-1)$ and a constant which is in negative correlation with the number of allocated bits B as the global gain g.

The global gain g obtained by the gain acquiring portion 261 becomes an initial value of a global gain used by the quantizing portion 262 and the Rice parameter deciding portion 263.

In this way, the gain acquiring portion 261 obtains a gain for performing division of all samples of a normalized frequency domain sample sequence which is, for example, a normalized MDCT coefficient sequence.

<Quantizing Portion 262>

The quantizing portion 262 obtains and outputs a quantized normalized coefficient sequence $X_Q(0), X_Q(1), \ldots, X_Q(N-1)$ as a sequence of the integer part of a result of dividing each coefficient of the inputted normalized MDCT coefficient sequence $X_N(0), X_N(1), \ldots, X_N(N-1)$ by the global gain g obtained by the gain acquiring portion 261 or the gain updating portion 267 (step S262).

Here, a global gain g used when the process of the quantizing portion 262 is executed for the first time is the global gain g obtained by the gain acquiring portion 261, that is, the initial value of the global gain. Further, a global gain g used when the process of the quantizing portion 262 is executed at and after the second time is the global gain g obtained by the gain updating portion 267, that is, an updated value of the global gain.

In this way, the quantizing portion 262 determines a quantized normalized coefficient sequence by dividing each sample of a normalized frequency domain sample sequence which is, for example, a normalized MDCT coefficient sequence by a gain and quantizing the result.

<Rice Parameter Deciding Portion 263>

The Rice parameter deciding portion 263 obtains and outputs each Rice parameter of a Rice parameter sequence $r(0), r(1), \ldots, r(N-1)$ from the global gain g obtained by the gain acquiring portion 261 or the gain updating portion 267, an inputted unsmoothed amplitude spectral envelope sequence $\hat{H}(0), \hat{H}(1), \ldots, \hat{H}(N-1)$ and an inputted smoothed amplitude spectral envelope sequence $\hat{H}\gamma(0), \hat{H}\gamma(1), \ldots, \hat{H}\gamma(N-1)$ by the above formula (8) (step S263).

Here, a global gain g used when the process of the Rice parameter deciding portion 263 is executed for the first time is the global gain g obtained by the gain acquiring portion 261, that is, the initial value of the global gain. Further, a global gain g used when the process of the Rice parameter deciding portion 263 is executed at and after the second time is the global gain g obtained by the gain updating portion 267, that is, an updated value of the global gain.

In this way, the Rice parameter deciding portion 263 determines Rice parameters for performing Golomb-Rice encoding of a quantized normalized coefficient sequence, for coefficients of the quantized normalized coefficient sequence, respectively, based on a smoothed amplitude spectral envelope sequence, an unsmoothed amplitude spectral envelope and a gain.

The Rice parameter decision device on the encoding side is a device which is at least provided with the Rice parameter deciding portion 263. The Rice parameter decision device on the encoding side may be provided with other portions such as the unsmoothed amplitude spectral envelope sequence generating portion 23, the smoothed amplitude spectral envelope sequence generating portion 24, the envelope normalizing portion 25, the gain acquiring portion 261 and the quantizing portion 262.

<Golomb-Rice Encoding Portion 264>

The Golomb-Rice encoding portion 264 performs Golomb-Rice encoding of the quantized normalized coefficient sequence $X_Q(0), X_Q(1), \ldots, X_Q(N-1)$ obtained by the quantizing portion 262, using each Rice parameter of the Rice parameter sequence $r(0), r(1), \ldots, r(N-1)$ obtained by the Rice parameter deciding portion 263 as a Rice parameter corresponding to each coefficient of the quantized normalized coefficient sequence $X_Q(0), X_Q(1), \ldots, X_Q(N-1)$ to obtain integer signal codes, and outputs the integer signal codes and the number of consumed bits C, which is the number of bits of the integer signal codes (step S264).

<Judging Portion 266>

The judging portion 266 makes a judgment based on the number of times of updating the gain. Specifically, when the number of times of updating the gain is a predetermined number of times, the judging portion 266 outputs the integer signal codes as well as outputting an instruction signal to encode the global gain g obtained by the gain updating portion 267 to the gain encoding portion 265, and, when the number of times of updating the gain is smaller than the predetermined number of times, the judging portion 266 outputs the number of consumed bits C measured by the Golomb-Rice encoding portion 264 to the gain updating portion 267 (step S266).

<Gain Updating Portion 267>

When the number of consumed bits C measured by the Golomb-Rice encoding portion 264 is larger than the number of allocated bits B, the gain updating portion 267 updates the value of the global gain g to a larger value and outputs the value. When the number of consumed bits C is smaller than the number of allocated bits B, the gain updating portion 267 updates the value of the global gain g to a smaller value and outputs the updated value of the global gain g (step S267).

<Gain Encoding Portion 265>

The gain encoding portion 265 encodes the global gain g obtained by the gain updating portion 267 in accordance with the instruction signal outputted by the judging portion 266 to obtain and output a gain code (step S265).

The integer signal codes outputted by the judging portion 266 and the gain code outputted by the gain encoding portion 265 are outputted to the decoding apparatus as codes corresponding to the normalized MDCT coefficient sequence.

That is, in the present specific example, steps S267, 262, 263 and 264 performed last correspond to the above steps A6-1 to A6-4, respectively, and step S265 corresponds to the above step A6-5.

The specific example 2 of the encoding process performed by the encoding portion 26 is described in more detail in International Publication No. WO2014/054556 and the like.

(Decoding of First Embodiment)

Figure 9:
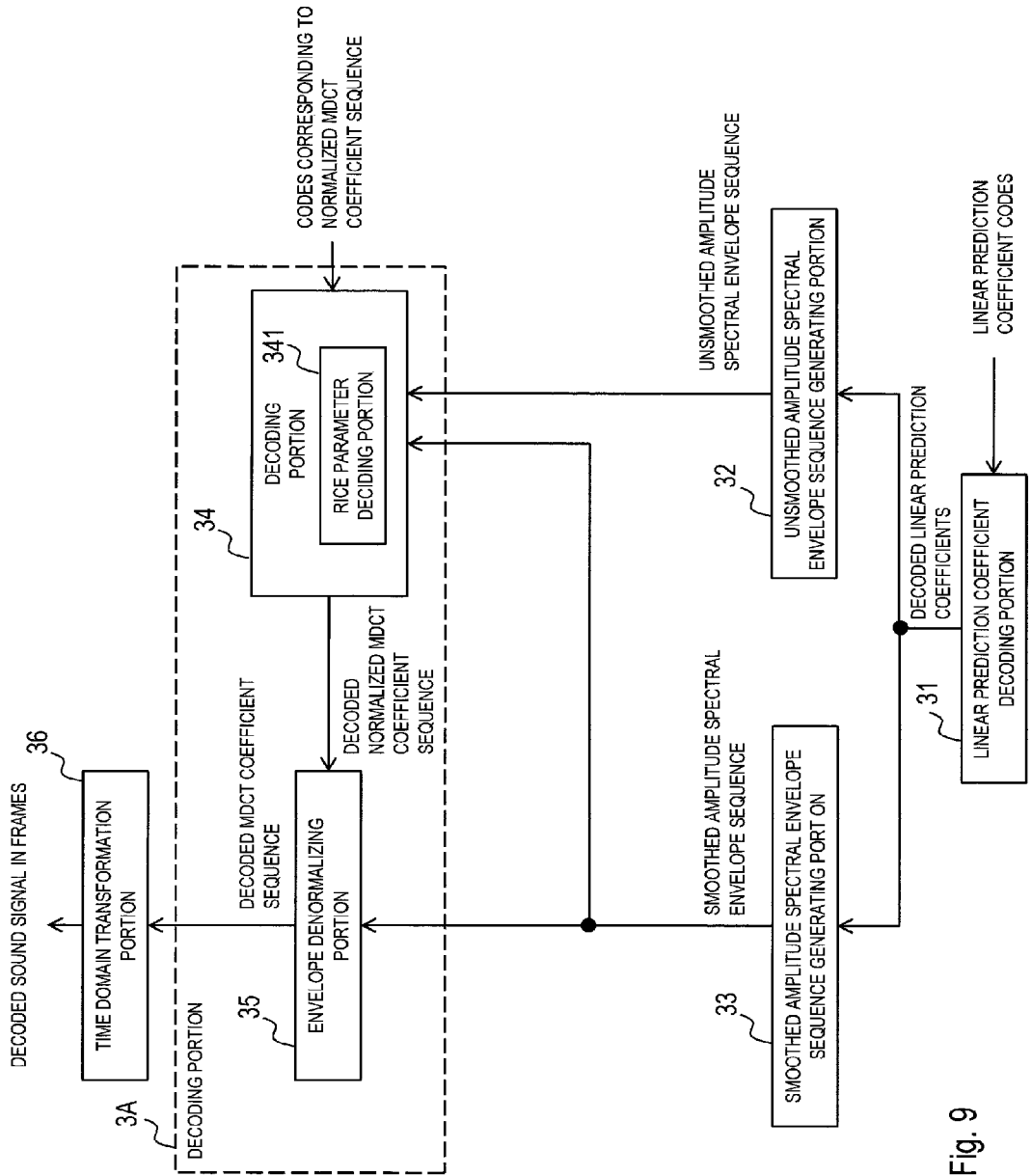
FIG. 9 is a block diagram for illustrating an example of a decoding apparatus of the present invention.
Figure 10:
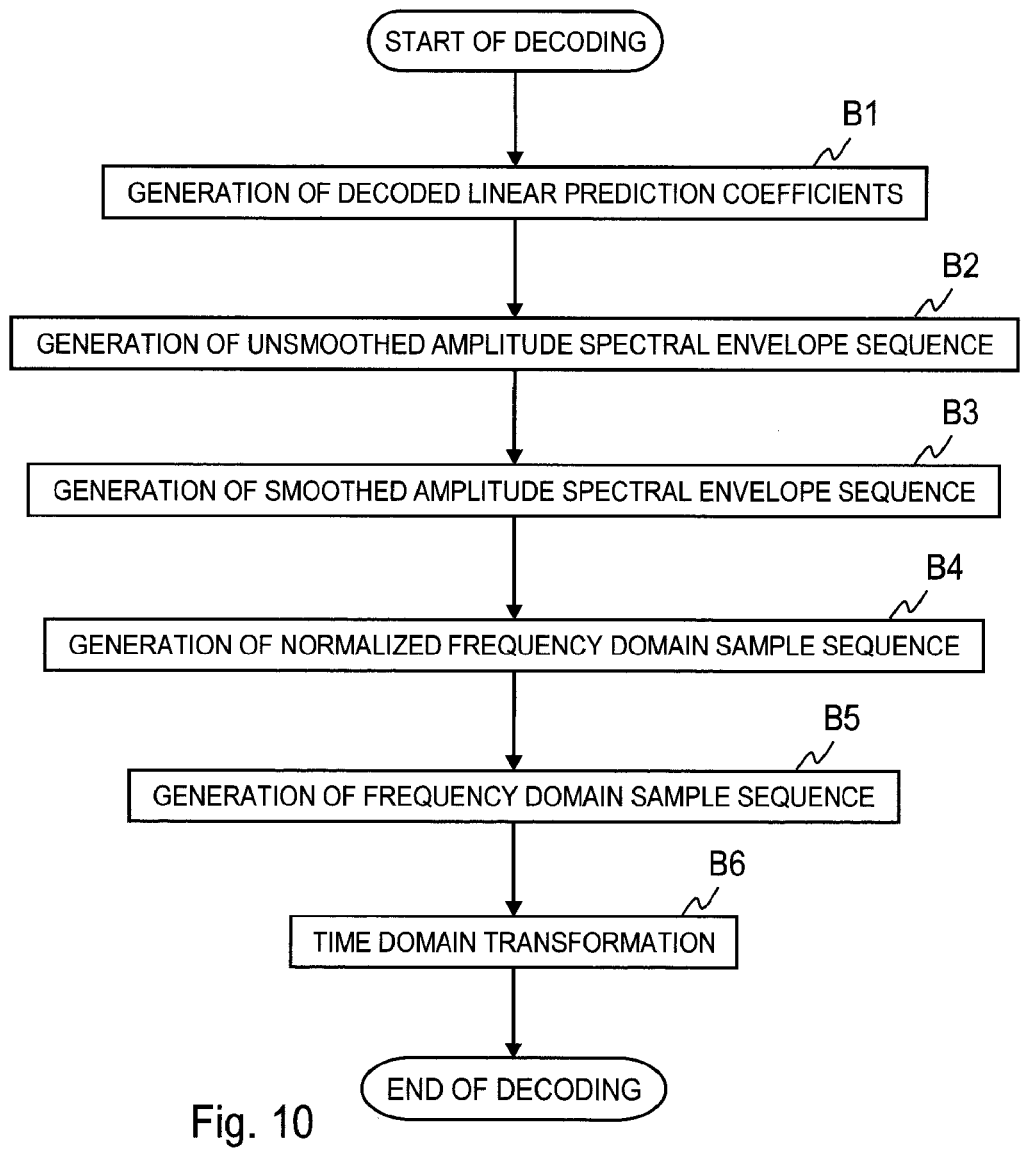
FIG. 10 is a flowchart for illustrating an example of a decoding method of the present invention.

FIG. 9 shows a configuration example of the decoding apparatus corresponding to the encoding apparatus of the first embodiment. As shown in FIG. 9, the decoding apparatus of the first embodiment is, for example, provided with a linear prediction coefficient decoding portion 31, an unsmoothed amplitude spectral envelope sequence generating portion 32, a smoothed amplitude spectral envelope sequence generating portion 33, a decoding portion 34, an envelope denormalizing portion 35, and a time domain transforming portion 36. FIG. 10 shows an example of each process of a decoding method of the first embodiment realized by this decoding apparatus.

At least codes corresponding to a normalized MDCT coefficient sequence and linear prediction coefficient codes outputted by the encoding apparatus are inputted to the decoding apparatus.

Each portion in FIG. 9 will be described below.

<Linear Prediction Coefficient Decoding Portion 31>

The linear prediction coefficient codes outputted by the encoding apparatus are inputted to the linear prediction coefficient decoding portion 31.

For each frame, the linear prediction coefficient decoding portion 31 decodes the inputted linear prediction coefficient codes, for example, by a conventional decoding technique to obtain decoded linear prediction coefficients $\hat{\beta}_1, \hat{\beta}_2, \ldots, \hat{\beta}_p$ (step B1).

The obtained decoded linear prediction coefficients $\hat{\beta}_1, \hat{\beta}_2, \ldots, \hat{\beta}_p$ are outputted to the unsmoothed amplitude spectral envelope sequence generating portion 32 and the smoothed amplitude spectral envelope sequence generating portion 33.

Here, the conventional decoding technique is, for example, a technique in which, when the linear prediction coefficient codes are codes corresponding to quantized linear prediction coefficients, the linear prediction coefficient codes are decoded to obtain decoded linear prediction coefficients which are the same as the quantized linear prediction coefficients, a technique in which, when the linear prediction coefficient codes are codes corresponding to quantized LSP parameters, the linear prediction coefficient codes are decoded to obtain decoded LSP parameters which are the same as the quantized LS parameters, or the like. Further, the linear prediction coefficients and the LSP parameters are mutually transformable, and it is well known that a transformation process can be performed between the decoded linear prediction coefficients and the decoded LSP parameters according to inputted linear prediction coefficient codes and information required for subsequent processes. From the above, it can be said that what comprises the above linear prediction coefficient code decoding process and the above transformation process performed as necessary is "decoding by the conventional decoding technique".

<Unsmoothed Amplitude Spectral Envelope Sequence Generating Portion 32>

The decoded linear prediction coefficients $\hat{\beta}_1, \hat{\beta}_2, \ldots, \hat{\beta}_p$ obtained by the linear prediction coefficient decoding portion 31 are inputted to the unsmoothed amplitude spectral envelope sequence generating portion 32.

The unsmoothed amplitude spectral envelope sequence generating portion 32 generates an unsmoothed amplitude spectral envelope sequence $\hat{H}(0), \hat{H}(1), \ldots, \hat{H}(N-1)$, which is an amplitude spectral envelope sequence corresponding to the decoded linear prediction coefficients $\hat{\beta}_1, \hat{\beta}_2, \ldots, \hat{\beta}_p$ by the above formula (13) (step B2).

The generated unsmoothed amplitude spectral envelope sequence $\hat{H}(0), \hat{H}(1), \ldots, \hat{H}(N-1)$ is outputted to the decoding portion 34.

In this way, the unsmoothed amplitude spectral envelope sequence generating portion 32 obtains an unsmoothed amplitude spectral envelope sequence, which is a sequence of an amplitude spectral envelope corresponding to linear prediction coefficients corresponding to inputted linear prediction coefficient codes.

<Smoothed Amplitude Spectral Envelope Sequence Generating Portion 33>

The decoded linear prediction coefficients $\hat{\beta}_1, \hat{\beta}_2, \ldots, \hat{\beta}_p$ obtained by the linear prediction coefficient decoding portion 31 are inputted to the smoothed amplitude spectral envelope sequence generating portion 33.

The smoothed amplitude spectral envelope sequence generating portion 33 generates a smoothed amplitude spectral envelope sequence $\hat{H}\gamma(0), \hat{H}\gamma(1), \ldots, \hat{H}\gamma(N-1)$, which is a sequence obtained by reducing amplitude unevenness of a sequence of an amplitude spectral envelope corresponding to the decoded linear prediction coefficients $\hat{\beta}_1, \hat{\beta}_2, \ldots, \hat{\beta}_p$ by the above formula (14) (step B3).

The generated smoothed amplitude spectral envelope sequence $\hat{H}\gamma(0), \hat{H}\gamma(1), \ldots, \hat{H}\gamma(N-1)$ is outputted to the decoding portion 34 and the envelope denormalizing portion 35.

In this way, the smoothed amplitude spectral envelope sequence generating portion 33 obtains a smoothed amplitude spectral envelope, which is a sequence obtained by smoothing amplitude unevenness of a sequence of an amplitude spectral envelope corresponding to linear prediction coefficients corresponding to inputted linear prediction coefficient codes.

<Decoding Portion 34>

Codes corresponding to the normalized MDCT coefficient sequence outputted by the encoding apparatus, the unsmoothed amplitude spectral envelope sequence $\hat{H}(0), \hat{H}(1), \ldots, \hat{H}(N-1)$ generated by the unsmoothed amplitude spectral envelope sequence generating portion 32 and the smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 33 are inputted to the decoding portion 34.

The decoding portion 34 is provided with a Rice parameter deciding portion 341.

Figure 11:
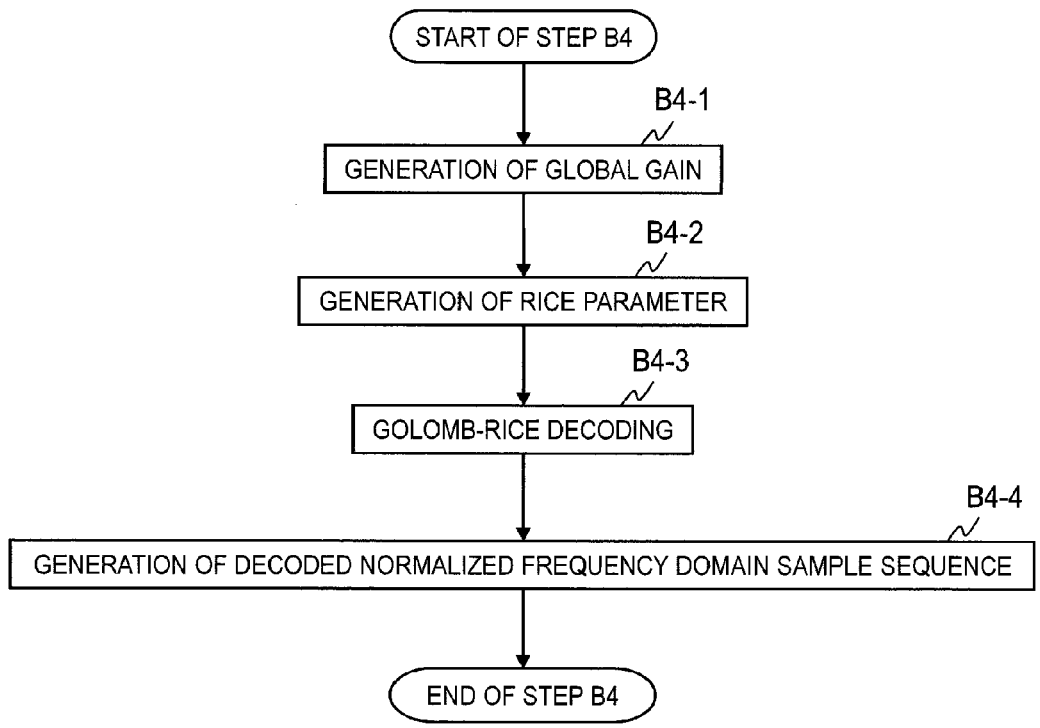
FIG. 11 is a flowchart for illustrating an example of a process of a decoding portion of the present invention.

The decoding portion 34 performs decoding by performing processes of steps B4-1 to B4-4 illustrated in FIG. 11 (step B4). That is, for each frame, the decoding portion 34 decodes a gain code comprised in the codes corresponding to the inputted normalized MDCT coefficient sequence to obtain a global gain g (step B4-1). The Rice parameter deciding portion 341 of the decoding portion 34 determines each Rice parameter of a Rice parameter sequence r(0), r(1), . . . , r(N-1) from the global gain g, the unsmoothed amplitude spectral envelope sequence $\hat{H}(0), \hat{H}(1), \ldots, \hat{H}(N-1)$ and the smoothed amplitude spectral envelope sequence $\hat{H}\gamma(0), \hat{H}\gamma(1), \ldots, \hat{H}\gamma(N-1)$ by the above formula (8) (step B4-2). The decoding portion 34 obtains a decoded normalized coefficient sequence $\hat{X}_Q(0), \hat{X}_Q(1), \ldots, \hat{X}_Q(N-1)$ by performing Golomb-Rice decoding of integer signal codes comprised in the codes corresponding to the normalized MDCT coefficient sequence using each Rice parameter of the Rice parameter sequence r(0), r(1), . . . , r(N-1) (step B4-3) and generates a decoded normalized MDCT coefficient sequence $\hat{X}_N(0), \hat{X}_N(1), \ldots, \hat{X}_N(N-1)$ by multiplying each coefficient of the decoded normalized coefficient sequence $\hat{X}_Q(0), \hat{X}_Q(1), \ldots, \hat{X}_Q(N-1)$ by the global gain g (step B4-4).

The decoded normalized MDCT coefficient sequence $\hat{X}_N(0), \hat{X}_N(1), \ldots, \hat{X}_N(N-1)$ which has been generated is outputted to the envelope denormalizing portion 35.

In this way, the Rice parameter deciding portion 341 determines a Rice parameter for obtaining a decoded normalized coefficient sequence by Golomb-Rice decoding, for each coefficient of the above decoded quantized normalized coefficient sequence, based on a smoothed amplitude spectral envelope sequence, an unsmoothed amplitude spectral envelope sequence and a gain.

Further, the decoding portion 34 obtains a decoded normalized frequency domain sample sequence which is, for example, a decoded normalized MDCT coefficient sequence, by multiplying each coefficient of a decoded normalized coefficient sequence obtained by performing Golomb-Rice decoding of inputted integer signal codes by a gain obtained by decoding an inputted gain code.

A Rice parameter decision device on the decoding side is a device which is at least provided with the Rice parameter deciding portion 341. The Rice parameter decision device on the decoding side may be provided with other portions such as the unsmoothed amplitude spectral envelope sequence generating portion 32.

<Envelope Denormalizing Portion 35>

The smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 33 and the decoded normalized MDCT coefficient sequence $\hat{X}_N(0), \hat{X}_N(1), \ldots, \hat{X}_N(N-1)$ generated by the decoding portion 34 are inputted to the envelope denormalizing portion 35.

The envelope denormalizing portion 35 generates a decoded MDCT coefficient sequence $\hat{X}(0), \hat{X}(1), \ldots, \hat{X}(N-1)$ by denormalizing the decoded normalized MDCT coefficient sequence $\hat{X}_N(0), \hat{X}_N(1), \ldots, \hat{X}_N(N-1)$ using the smoothed amplitude spectral envelope sequence $\hat{H}\gamma(0), \hat{H}\gamma(1), \ldots, \hat{H}\gamma(N-1)$ (step B5).

The generated decoded MDCT coefficient sequence $\hat{X}(0), \hat{X}(1), \ldots, \hat{X}(N-1)$ is outputted to the time domain transforming portion 36.

For example, the envelope denormalizing portion 35 generates the decoded MDCT coefficient sequence $\hat{X}(0), \hat{X}(1), \ldots, \hat{X}(N-1)$ by multiplying each coefficient $\hat{X}_N(k)$ of the decoded normalized MDCT coefficient sequence $\hat{X}_N(0), \hat{X}_N(1), \ldots, \hat{X}_N(N-1)$ by each envelope value $\hat{H}\gamma(k)$ of the smoothed amplitude spectral envelope sequence $\hat{H}\gamma(0), \hat{H}\gamma(1), \ldots, \hat{H}\gamma(N-1)$ on the assumption of k=0, 1, . . . , N-1. That is, $\hat{X}(k)=\hat{X}_N(k) \times \hat{H}\gamma(k)$ is satisfied on the assumption of k=0, 1, . . . , N-1.

In this way, the envelope denormalizing portion 35 obtains a decoded frequency domain sample sequence which is obtained by multiplying each coefficient of a normalized frequency domain sample sequence which is, for example, a decoded normalized MDCT coefficient sequence, by a corresponding coefficient of a smoothed amplitude spectral envelope sequence.

<Time Domain Transforming Portion 36>

The decoded MDCT coefficient sequence $\hat{X}(0), \hat{X}(1), \ldots, \hat{X}(N-1)$ generated by the envelope denormalizing portion 35 is inputted to the time domain transforming portion 36.

For each frame, the time domain transforming portion 36 transforms the decoded MDCT coefficient sequence $\hat{X}(0), \hat{X}(1), \ldots, \hat{X}(N-1)$ obtained by the envelope denormalizing portion 35 to a time domain and obtains a sound signal (a decoded sound signal) for each frame (step B6).

In this way, the time domain transforming portion 36 obtains a decoded sound signal corresponding to a decoded frequency domain sample sequence which is, for example, a decoded MDCT coefficient sequence.

Second Embodiment (Encoding of Second Embodiment)

FIG. 4 shows a configuration example of an encoding apparatus of the second embodiment. As shown in FIG. 4, the encoding apparatus of the second embodiment is, for example, provided with a frequency domain transforming portion 21, a linear prediction analyzing portion 22, an unsmoothed amplitude spectral envelope sequence generating portion 23, a smoothed amplitude spectral envelope sequence generating portion 24, an envelope normalizing portion 25 and an encoding portion 26. FIG. 5 shows an example of each process of an encoding method of the second embodiment realized by this encoding apparatus.

Each portion in FIG. 4 will be described below.

<Frequency Domain Transforming Portion 21>

A time domain sound signal is inputted to the frequency domain transforming portion 21. An example of the sound signal is a voice digital signal or an acoustic digital signal.

The frequency domain transforming portion 21 transforms the inputted time domain sound signal to an MDCT coefficient sequence X(0), X(1), ..., X(N−1) at a point N in a frequency domain for each frame with a predetermined time length (step A1). Here, N is a positive integer.

The obtained MDCT coefficient sequence X(0), X(1), ..., X(N−1) is outputted to the linear prediction analyzing portion 22 and the envelope normalizing portion 25.

It is assumed that processes after that are performed for each frame unless otherwise stated.

In this way, the frequency domain transforming portion 21 determines a frequency domain sample sequence, which is, for example, an MDCT coefficient sequence, corresponding to a sound signal.

<Linear Prediction Analyzing Portion 22>

The MDCT coefficient sequence X(0), X(1), ..., X(N−1) obtained by the frequency domain transforming portion 21 is inputted to the linear prediction analyzing portion 22.

The linear prediction analyzing portion 22 generates linear prediction coefficients $\alpha_1, \alpha_2, \ldots, \alpha_p$ by performing linear prediction analysis of $\tilde{X}(0), \tilde{X}(1), \ldots, \tilde{X}(N-1)$ defined by the following formula (16) using the MDCT coefficient sequence X(0), X(1), ..., X(N−1), and encodes the generated linear prediction coefficients $\alpha_1, \alpha_2, \ldots, \alpha_p$ to generate linear prediction coefficient codes and quantized linear prediction coefficients $\hat{\alpha}_1, \hat{\alpha}_2, \ldots, \hat{\alpha}_p$, which are quantized linear prediction coefficients corresponding to the linear prediction coefficient codes (step A2).

[Formula 24]

$$\tilde{X}(k) = \sum_{n=0}^{N-1} |X(n)|^2 \exp\left(-j\frac{2\pi kn}{N}\right), k = 0, 1, \ldots, N-1 \quad (16)$$

The generated quantized linear prediction coefficients $\hat{\alpha}_1, \hat{\alpha}_2, \ldots, \hat{\alpha}_p$ are outputted to the unsmoothed spectral envelope sequence generating portion 23 and the smoothed amplitude spectral envelope sequence generating portion 24.

Further, the generated linear prediction coefficient codes are transmitted to a decoding apparatus.

Specifically, the linear prediction analyzing portion 22 determines a pseudo correlation function signal sequence $\tilde{X}(0), \tilde{X}(1), \ldots, \tilde{X}(N-1)$, which is a time domain signal sequence corresponding to the MDCT coefficient sequence X(0), X(1), ..., X(N−1) by performing the operation of the formula (16). Then, the linear prediction analyzing portion 22 performs linear prediction analysis using the determined pseudo correlation function signal sequence $\tilde{X}(0), \tilde{X}(1), \ldots, \tilde{X}(N-1)$ to generate linear prediction coefficients $\alpha_1, \alpha_2, \ldots, \alpha_p$. Then, by encoding the generated linear prediction coefficients $\alpha_1, \alpha_2, \ldots, \alpha_p$, the linear prediction analyzing portion 22 obtains linear prediction coefficient codes and quantized linear prediction coefficients $\hat{\alpha}_1, \hat{\alpha}_2, \ldots, \hat{\alpha}_p$ corresponding the linear prediction coefficient codes.

Generation of the linear prediction coefficient codes by the linear prediction analyzing portion 22 is performed, for example, by a conventional encoding technique. As examples of the conventional encoding technique, for example, an encoding technique in which a code corresponding to a linear prediction coefficient itself is caused to be a linear prediction coefficient code, an encoding technique in which a linear prediction coefficient is transformed to an LSP parameter, and a code corresponding to the LSP parameter is caused to be a linear prediction coefficient code, an encoding technique in which a linear prediction coefficient is transformed to a PARCOR coefficient, and a code corresponding to the PARCOR coefficient is caused to be a linear prediction coefficient code, and the like are given. For example, the encoding technique in which a code corresponding to a linear prediction coefficient itself is caused to be a linear prediction coefficient code is a technique in which a plurality of quantized linear prediction coefficient candidates are specified in advance; each candidates is stored being associated with a linear prediction coefficient code in advance; any of the candidates is decided as a quantized linear prediction coefficient corresponding to a generated linear prediction coefficient; and, thereby, the quantized linear prediction coefficient and the linear prediction coefficient code are obtained.

<Unsmoothed Amplitude Spectral Envelope Sequence Generating Portion 23>

The quantized linear prediction coefficients $\hat{\alpha}_1, \hat{\alpha}_2, \ldots, \hat{\alpha}_p$ generated by the linear prediction analyzing portion 22 are inputted to the unsmoothed amplitude spectral envelope sequence generating portion 23.

The unsmoothed amplitude spectral envelope sequence generating portion 23 generates an unsmoothed amplitude spectral envelope sequence $\hat{W}(0), \hat{W}(1), \ldots, \hat{W}(N-1)$, which is an amplitude spectral envelope sequence corresponding to the quantized linear prediction coefficients $\hat{\alpha}_1, \hat{\alpha}_2, \ldots, \hat{\alpha}_p$ (step A3).

The generated unsmoothed amplitude spectral envelope sequence $\hat{W}(0), \hat{W}(1), \ldots, \hat{W}(N-1)$ is outputted to the encoding portion 26.

The unsmoothed amplitude spectral envelope sequence generating portion 23 generates an unsmoothed amplitude spectral envelope sequence $\hat{W}(0), \hat{W}(1), \ldots, \hat{W}(N-1)$ defined by the following formula (17) as the unsmoothed amplitude spectral envelope sequence $\hat{W}(0), \hat{W}(1), \ldots, \hat{W}(N-1)$ using the quantized linear prediction coefficients $\hat{\alpha}_1, \hat{\alpha}_2, \ldots, \hat{\alpha}_p$.

[Formula 25]

$$\hat{W}(k) = \frac{1}{\sqrt{2\pi}} \frac{1}{\left|1 + \sum_{n=1}^{p} \hat{\alpha}_n \exp(-j2\pi kn/N)\right|} \quad (17)$$

In this way, the unsmoothed amplitude spectral envelope sequence generating portion 23 obtains an unsmoothed amplitude spectral envelope sequence, which is a sequence of an amplitude spectral envelope corresponding to a sound signal.

<Smoothed Amplitude Spectral Envelope Sequence Generating Portion 24>

The quantized linear prediction coefficients $\hat{\alpha}_1, \hat{\alpha}_2, \ldots, \hat{\alpha}_p$ generated by the linear prediction analyzing portion 22 is inputted to the smoothed amplitude spectral envelope sequence generating portion 24.

The smoothed amplitude spectral envelope sequence generating portion 24 generates a smoothed amplitude spectral envelope sequence $\hat{W}\gamma(0), \hat{W}\gamma(1), \ldots, \hat{W}\gamma(N-1)$, which is a sequence obtained by reducing amplitude unevenness of an amplitude spectral envelope sequence corresponding to the quantized linear prediction coefficients $\hat{\alpha}_1, \hat{\alpha}_2, \ldots, \hat{\alpha}_p$ (step A4).

The generated smoothed amplitude spectral envelope sequence $\hat{W}\gamma(0), \hat{W}\gamma(1), \ldots, \hat{W}\gamma(N-1)$ is outputted to the envelope normalizing portion 25 and the encoding portion 26.

The smoothed amplitude spectral envelope sequence generating portion 24 generates a smoothed amplitude spectral envelope sequence $\hat{W}\gamma(0), \hat{W}\gamma(1), \ldots, \hat{W}\gamma(N-1)$ defined by the following formula (18) as the smoothed amplitude spectral envelope sequence $\hat{W}\gamma(0), \hat{W}\gamma(1), \ldots, \hat{W}\gamma(N-1)$ using the quantized linear prediction coefficients $\hat{\alpha}_1, \hat{\alpha}_2, \ldots, \hat{\alpha}_p$ and a correction coefficient $\gamma$.

[Formula 26]

$$\hat{W}_\gamma(k) = \frac{1}{\sqrt{2\pi}} \frac{1}{\left|1 + \sum_{n=1}^{p} \hat{\alpha}_n \gamma^n \exp(-j2\pi kn/N)\right|}, k = 0, 1, \ldots, N-1 \quad (18)$$

Here, the correction coefficient $\gamma$ is a predetermined constant smaller than 1 and is a coefficient which reduces amplitude unevenness of the unsmoothed amplitude spectral envelope sequence $\hat{W}(0), \hat{W}(1), \ldots, \hat{W}(N-1)$, in other words, a coefficient which smoothes the unsmoothed amplitude spectral envelope sequence $\hat{W}(0), \hat{W}(1), \ldots, \hat{W}(N-1)$.

In this way, the smoothed amplitude spectral envelope sequence generating portion 24 obtains a smoothed amplitude spectral envelope sequence, which is a sequence obtained by smoothing amplitude unevenness of an unsmoothed amplitude spectral envelope sequence.

<Envelope Normalizing Portion 25>

The MDCT coefficient sequence $X(0), X(1), \ldots, X(N-1)$ obtained by the frequency domain transforming portion 21 and the smoothed amplitude spectral envelope sequence $\hat{W}\gamma(0), \hat{W}\gamma(1), \ldots, \hat{W}\gamma(N-1)$ generated by the smoothed amplitude spectral envelope sequence generating portion 24 are inputted to the envelope normalizing portion 25.

The envelope normalizing portion 25 generates a normalized MDCT coefficient sequence $X_N(0), X_N(1), \ldots, X_N(N-1)$ by normalizing each coefficient of the MDCT coefficient sequence $X(0), X(1), \ldots, X(N-1)$ by a corresponding value of the smoothed amplitude spectral envelope sequence $\hat{W}\gamma(0), \hat{W}\gamma(1), \ldots, \hat{W}\gamma(N-1)$ (step A5).

The generated normalized MDCT coefficient sequence is outputted to the encoding portion 26.

The envelope normalizing portion 25 generates each coefficient $X_N(k)$ of the normalized MDCT coefficient sequence $X_N(0), X_N(1), \ldots, X_N(N-1)$ by dividing each coefficient $X(k)$ of the MDCT coefficient sequence $X(0), X(1), \ldots, X(N-1)$ by the smoothed amplitude spectral envelope sequence $\hat{W}\gamma(0), \hat{W}\gamma(1), \ldots, \hat{W}\gamma(N-1)$, for example, on the assumption of $k=0, 1, \ldots, N-1$. That is, $X_N(k) = X(k)/\hat{W}\gamma(k)$ is satisfied on the assumption of $k=0, 1, \ldots, N-1$.

In this way, the envelope normalizing portion 25 normalizes each sample of a frequency domain sample sequence, which is, for example, an MDCT coefficient sequence, by a corresponding sample of a smoothed amplitude spectral envelope sequence and obtains a normalized frequency domain sample sequence which is, for example, a normalized MDCT coefficient sequence.

<Encoding Portion 26>

The normalized MDCT coefficient sequence $X_N(0), X_N(1), \ldots, X_N(N-1)$ generated by the envelope normalizing portion 25, the unsmoothed amplitude spectral envelope sequence $\hat{W}(0), \hat{W}(1), \ldots, \hat{W}(N-1)$ generated by the unsmoothed amplitude spectral envelope sequence generating portion 23 and the smoothed amplitude spectral envelope sequence $\hat{W}\gamma(0), \hat{W}\gamma(1), \ldots, \hat{W}\gamma(N-1)$ generated by the smoothed amplitude spectral envelope sequence generating portion 24 are inputted to the encoding portion 26.

The encoding portion 26 performs encoding by performing processes of steps A6-1 to A6-5 illustrated in FIG. 8 (step A6). That is, the encoding portion 26 determines a global gain g corresponding to the normalized MDCT coefficient sequence $X_N(0), X_N(1), \ldots, X_N(N-1)$ (step A6-1), determines a quantized normalized coefficient sequence $X_Q(0), X_Q(1), \ldots, X_Q(N-1)$, which is a sequence of integer values obtained by quantizing a result of dividing each coefficient of the normalized MDCT coefficient sequence $X_N(0), X_N(1), \ldots, X_N(N-1)$ by the global gain g (step A6-2), determines Rice parameters $r(0), r(1), \ldots, r(N-1)$ corresponding to coefficients of the quantized normalized coefficient sequence $X_Q(0), X_Q(1), \ldots, X_Q(N-1)$, respectively, from the global gain g, the unsmoothed amplitude spectral envelope sequence $\hat{W}(0), \hat{W}(1), \ldots, \hat{W}(N-1)$, and the smoothed amplitude spectral envelope sequence $\hat{W}\gamma(0), \hat{W}\gamma(1), \ldots, \hat{W}\gamma(N-1)$ by the above formula (5) (step A6-3), performs Golomb-Rice encoding of the quantized normalized coefficient sequence $X_Q(0), X_Q(1), \ldots, X_Q(N-1)$ using the Rice parameters $r(0), r(1), \ldots, r(N-1)$ to obtain an integer signal codes (step A6-4) and obtains a gain code corresponding to the global gain g (step A6-5). Here, the normalized amplitude spectral envelope sequence $\hat{W}_N(0), \hat{W}_N(1), \ldots, \hat{W}_N$ in the above formula (5) is what is obtained by dividing each value of the unsmoothed amplitude spectral envelope sequence $\hat{W}(0), \hat{W}(1), \ldots, \hat{W}(N-1)$ by a corresponding value of the smoothed amplitude spectral envelope sequence $\hat{W}\gamma(0), \hat{W}\gamma(1), \ldots, \hat{W}\gamma(N-1)$, that is, what is determined by the following formula (19).

[Formula 27]

$$\hat{W}_N(k) = \frac{\hat{W}(k)}{\hat{W}_\gamma(k)}, k = 0, 1, \ldots, N-1 \quad (19)$$

The generated integer signal codes and the gain code are outputted to the decoding apparatus as codes corresponding to the normalized MDCT coefficient sequence.

The encoding portion 26 realizes a function of deciding such a global gain g that the number of bits of the integer signal codes is equal to or smaller than the number of allocated bits B, which is the number of bits allocated in advance, and is as large as possible and generating a gain code corresponding to the decided global gain g and integer signal codes corresponding to the decided global gain by the above steps A6-1 to A6-5.

Among steps A6-1 to A6-5 performed by the encoding portion 26, it is step A6-3 that a characteristic process is comprised. As for the encoding process itself which is for obtaining codes corresponding to the normalized MDCT coefficient sequence by encoding each of the global gain g and the quantized normalized coefficient sequence $X_Q(0)$, $X_Q(1), \ldots, X_Q(N-1)$, various publicly-known techniques comprising the technique described in Non-patent literature 1 exist.

A specific example of the encoding process performed by the encoding portion 26 is as described in the description of the encoding portion 26 of the first embodiment.

In this way, the Rice parameter deciding portion 263 determines a Rice parameter for performing Golomb-Rice encoding of a quantized normalized coefficient sequence, for each coefficient of the quantized normalized coefficient sequence, based on a smoothed amplitude spectral envelope sequence, an unsmoothed amplitude spectral envelope and a gain.

A Rice parameter decision device on the encoding side is a device which is at least provided with the Rice parameter deciding portion 263. The Rice parameter decision device on the encoding side may be provided with other portions such as the unsmoothed amplitude spectral envelope sequence generating portion 23, the smoothed amplitude spectral envelope sequence generating portion 24, the envelope normalizing portion 25, the gain acquiring portion 261 and the quantizing portion 262.

(Decoding of Second Embodiment)

FIG. 9 shows a configuration example of the decoding apparatus corresponding to the encoding apparatus of the second embodiment. As shown in FIG. 9, the decoding apparatus of the second embodiment is, for example, provided with a linear prediction coefficient decoding portion 31, an unsmoothed amplitude spectral envelope sequence generating portion 32, a smoothed amplitude spectral envelope sequence generating portion 33, a decoding portion 34, an envelope denormalizing portion 35, and a time domain transforming portion 36. FIG. 10 shows an example of each process of a decoding method of the second embodiment realized by this decoding apparatus.

At least codes corresponding to a normalized MDCT coefficient sequence and linear prediction coefficient codes outputted by the encoding apparatus are inputted to the decoding apparatus.

Each portion in FIG. 9 will be described below.

<Linear Prediction Coefficient Decoding Portion 31>

The linear prediction coefficient codes outputted by the encoding apparatus are inputted to the linear prediction coefficient decoding portion 31.

For each frame, the linear prediction coefficient decoding portion 31 decodes the inputted linear prediction coefficient codes, for example, by a conventional decoding technique to obtain decoded linear prediction coefficients $\hat{\alpha}_1, \hat{\alpha}_2, \ldots, \hat{\alpha}_p$ (step B1).

The obtained decoded linear prediction coefficients $\hat{\alpha}_1, \hat{\alpha}_2, \ldots, \hat{\alpha}_p$ are outputted to the unsmoothed amplitude spectral envelope sequence generating portion 32 and the smoothed amplitude spectral envelope sequence generating portion 33.

Here, the conventional decoding technique is, for example, a technique in which, when the linear prediction coefficient codes are codes corresponding to quantized linear prediction coefficients, the linear prediction coefficient codes are decoded to obtain decoded linear prediction coefficients which are the same as the quantized linear prediction coefficients, a technique in which, when the linear prediction coefficient codes are codes corresponding to quantized LSP parameters, the linear prediction coefficient codes are decoded to obtain decoded LSP parameters which are the same as the quantized LS parameters, or the like. Further, the linear prediction coefficients and the LSP parameters are mutually transformable, and it is well known that a transformation process can be performed between the decoded linear prediction coefficients and the decoded LSP parameters according to inputted linear prediction coefficient codes and information required for subsequent processes. From the above, it can be said that what comprises the above linear prediction coefficient code decoding process and the above transformation process performed as necessary is "decoding by the conventional decoding technique".

<Unsmoothed Amplitude Spectral Envelope Sequence Generating Portion 32>

The decoded linear prediction coefficients $\hat{\alpha}_1, \hat{\alpha}_2, \ldots, \hat{\alpha}_p$ obtained by the linear prediction coefficient decoding portion 31 are inputted to the unsmoothed amplitude spectral envelope sequence generating portion 32.

The unsmoothed amplitude spectral envelope sequence generating portion 32 generates an unsmoothed amplitude spectral envelope sequence $\hat{W}(0), \hat{W}(1), \ldots, \hat{W}(N-1)$, which is an amplitude spectral envelope sequence corresponding to the decoded linear prediction coefficients $\hat{\alpha}_1, \hat{\alpha}_2, \ldots, \hat{\alpha}_p$ by the above formula (17) (step B2).

The generated unsmoothed amplitude spectral envelope sequence $\hat{W}(0), \hat{W}(1), \ldots, \hat{W}(N-1)$ is outputted to the decoding portion 34.

In this way, the unsmoothed amplitude spectral envelope sequence generating portion 32 obtains an unsmoothed amplitude spectral envelope sequence, which is a sequence of an amplitude spectral envelope corresponding to linear prediction coefficients corresponding to inputted linear prediction coefficient codes.

<Smoothed Amplitude Spectral Envelope Sequence Generating Portion 33>

The decoded linear prediction coefficients $\hat{\alpha}_1, \hat{\alpha}_2, \ldots, \hat{\alpha}_p$ obtained by the linear prediction coefficient decoding portion 31 are inputted to the smoothed amplitude spectral envelope sequence generating portion 33.

The smoothed amplitude spectral envelope sequence generating portion 33 generates a smoothed amplitude spectral envelope sequence $\hat{W}\gamma(0), \hat{W}\gamma(1), \ldots, \hat{W}\gamma(N-1)$, which is a sequence obtained by reducing amplitude unevenness of a sequence of an amplitude spectral envelope corresponding to the decoded linear prediction coefficients $\hat{\alpha}_1, \hat{\alpha}_2, \ldots, \hat{\alpha}_p$ by the above formula (18) (step B3).

The generated smoothed amplitude spectral envelope sequence $\hat{W}\gamma(0), \hat{W}\gamma(1), \ldots, \hat{W}\gamma(N-1)$ is outputted to the decoding portion 34 and the envelope denormalizing portion 35.

In this way, the smoothed amplitude spectral envelope sequence generating portion 33 obtains a smoothed amplitude spectral envelope, which is a sequence obtained by smoothing amplitude unevenness of a sequence of an amplitude spectral envelope corresponding to linear prediction coefficients corresponding to inputted linear prediction coefficient codes.

<Decoding Portion 34>

Codes corresponding to the normalized MDCT coefficient sequence outputted by the encoding apparatus, the unsmoothed amplitude spectral envelope sequence ^W(0), ^W(1), . . . , ^W(N−1) generated by the unsmoothed amplitude spectral envelope sequence generating portion 32 and the smoothed amplitude spectral envelope sequence ^Wγ(0), ^Wγ(1), . . . , ^Wγ(N−1) generated by the smoothed amplitude spectral envelope sequence generating portion 33 are inputted to the decoding portion 34.

The decoding portion 34 is provided with a Rice parameter deciding portion 341.

The decoding portion 34 performs decoding by performing processes of steps B4-1 to B4-4 illustrated in FIG. 11 (step B4). That is, for each frame, the decoding portion 34 decodes a gain code comprised in the codes corresponding to the inputted normalized MDCT coefficient sequence to obtain a global gain g (step B4-1). The Rice parameter deciding portion 341 of the decoding portion 34 determines each Rice parameter of a Rice parameter sequence r(0), r(1), . . . , r(N−1) from the global gain g, the unsmoothed amplitude spectral envelope sequence ^W(0), ^W(1), . . . , ^W(N−1) and the smoothed amplitude spectral envelope sequence ^Wγ(0), ^Wγ(1), . . . , ^Wγ(N−1) by the above formula (5) (step B4-2). The decoding portion 34 obtains a decoded normalized coefficient sequence ^$X_Q$(0), ^$X_Q$(1), . . . , ^$X_Q$(N−1) by performing Golomb-Rice decoding of integer signal codes comprised in the codes corresponding to the normalized MDCT coefficient sequence using each Rice parameter of the Rice parameter sequence r(0), r(1), . . . , r(N−1) (step B4-3) and generates a decoded normalized MDCT coefficient sequence ^$X_N$(0), ^$X_N$(1), . . . , ^$X_N$(N−1) by multiplying each coefficient of the decoded normalized coefficient sequence ^$X_Q$(0), ^$X_Q$(1), . . . , ^$X_Q$(N−1) by the global gain g (step B4-4).

The decoded normalized MDCT coefficient sequence ^$X_N$(0), ^$X_N$(1), . . . , ^$X_N$(N−1) which has been generated is outputted to the envelope denormalizing portion 35.

In this way, the Rice parameter deciding portion 341 determines a Rice parameter for obtaining a decoded normalized coefficient sequence by Golomb-Rice decoding, for each coefficient of the above decoded quantized normalized coefficient sequence, based on a smoothed amplitude spectral envelope sequence, an unsmoothed amplitude spectral envelope and a gain.

Further, the decoding portion 34 obtains a decoded normalized frequency domain sample sequence which is, for example, a decoded normalized MDCT coefficient sequence, by multiplying each coefficient of a decoded normalized coefficient sequence obtained by performing Golomb-Rice decoding of inputted integer signal codes by a gain obtained by decoding an inputted gain code.

A Rice parameter decision device on the decoding side is a device which is at least provided with the Rice parameter deciding portion 341. The Rice parameter decision device on the decoding side may be provided with other portions such as the unsmoothed amplitude spectral envelope sequence generating portion 32.

<Envelope Denormalizing Portion 35>

The smoothed amplitude spectral envelope sequence ^Wγ(0), ^Wγ(1), . . . , ^Wγ(N−1) generated by the smoothed amplitude spectral envelope sequence generating portion 33 and the decoded normalized MDCT coefficient sequence ^$X_N$(0), ^$X_N$(1), . . . , ^$X_N$(N−1) generated by the decoding portion 34 are inputted to the envelope denormalizing portion 35.

The envelope denormalizing portion 35 generates a decoded MDCT coefficient sequence ^X(0), ^X(1), . . . , ^X(N−1) by denormalizing the decoded normalized MDCT coefficient sequence ^$X_N$(0), ^$X_N$(1), . . . , ^$X_N$(N−1) using the smoothed amplitude spectral envelope sequence ^Wγ(0), ^Wγ(1), . . . , ^Wγ(N−1) (step B5).

The generated decoded MDCT coefficient sequence ^X(0), ^X(1), . . . , ^X(N−1) is outputted to the time domain transforming portion 36.

For example, the envelope denormalizing portion 35 generates the decoded MDCT coefficient sequence ^X(0), ^X(1), . . . , ^X(N−1) by multiplying each coefficient ^$X_N$(k) of the decoded normalized MDCT coefficient sequence ^$X_N$(0), ^$X_N$(1), . . . , ^$X_N$(N−1) by each envelope value ^Wγ(k) of the smoothed amplitude spectral envelope sequence ^Wγ(0), ^Wγ(1), . . . , ^Wγ(N−1) on the assumption of k=0, 1, . . . , N−1. That is, ^X(k)=^$X_N$(k)×^Wγ(k) is satisfied on the assumption of k=0, 1, . . . , N−1.

In this way, the envelope denormalizing portion 35 obtains a decoded frequency domain sample sequence which is obtained by multiplying each coefficient of a normalized frequency domain sample sequence which is, for example, a decoded normalized MDCT coefficient sequence, by a corresponding coefficient of a smoothed amplitude spectral envelope sequence.

<Time Domain Transforming Portion 36>

The decoded MDCT coefficient sequence ^X(0), ^X(1), . . . , ^X(N−1) generated by the envelope denormalizing portion 35 is inputted to the time domain transforming portion 36.

For each frame, the time domain transforming portion 36 transforms the decoded MDCT coefficient sequence ^X(0), ^X(1), . . . , ^X(N−1) obtained by the envelope denormalizing portion 35 to a time domain and obtains a sound signal (a decoded sound signal) for each frame (step B6). In this way, the time domain transforming portion 36 obtains a decoded sound signal corresponding to a decoded frequency domain sample sequence which is, for example, a decoded MDCT coefficient sequence.

Third Embodiment (Encoding of Third Embodiment)

FIG. 4 shows a configuration example of an encoding apparatus of the third embodiment. As shown in FIG. 4, the encoding apparatus of the third embodiment is, for example, provided with a frequency domain transforming portion 21, a linear prediction analyzing portion 22, an unsmoothed amplitude spectral envelope sequence generating portion 23, a smoothed amplitude spectral envelope sequence generating portion 24, an envelope normalizing portion 25 and an encoding portion 26. FIG. 5 shows an example of each process of an encoding method of the third embodiment realized by this encoding apparatus.

Each portion in FIG. 4 will be described below.

<Frequency Domain Transforming Portion 21>

A sound signal, which is a time-series signal in a time domain, is inputted to the frequency domain transforming portion 21. An example of the sound signal is a voice digital signal or an acoustic digital signal.

The frequency domain transforming portion 21 transforms the inputted time domain sound signal to an MDCT coefficient sequence X(0), X(1), . . . , X(N−1) at a point N in a frequency domain for each frame with a predetermined time length (step A1). Here, N is a positive integer.

The obtained MDCT coefficient sequence X(0), X(1), . . . , X(N−1) is outputted to the linear prediction analyzing portion 22 and the envelope normalizing portion 25.

It is assumed that processes after that are performed for each frame unless otherwise stated.

In this way, the frequency domain transforming portion 21 determines a frequency domain sample sequence, which is, for example, an MDCT coefficient sequence, corresponding to a sound signal.

<Linear Prediction Analyzing Portion 22>

The MDCT coefficient sequence $X(0), X(1), \ldots, X(N-1)$ obtained by the frequency domain transforming portion 21 is inputted to the linear prediction analyzing portion 22.

The linear prediction analyzing portion 22 generates linear prediction coefficients $\beta_1, \beta_2, \ldots, \beta_p$ by performing linear prediction analysis of $\tilde{R}(0), \tilde{R}(1), \ldots, \tilde{R}(N-1)$ defined by the following formula (A7) using the MDCT coefficient sequence $X(0), X(1), \ldots, X(N-1)$, and encodes the generated linear prediction coefficients $\beta_1, \beta_2, \ldots, \beta_p$ to generate linear prediction coefficient codes and quantized linear prediction coefficients $\hat{\beta}_1, \hat{\beta}_2, \ldots, \hat{\beta}_p$, which are quantized linear prediction coefficients corresponding to the linear prediction coefficient codes (step A2).

[Formula 28]

$$\tilde{R}(k) = \sum_{n=0}^{N-1} |X(n)|^\eta \exp\left(-j\frac{2\pi k n}{N}\right), k = 0, 1, \ldots, N-1 \quad (A7)$$

In the above formula, is a shape parameter, which is decided in advance. For example, $\eta$ is assumed to be a predetermined integer except 2.

The generated quantized linear prediction coefficients $\hat{\beta}_1, \hat{\beta}_2, \ldots, \hat{\beta}_p$ are outputted to the unsmoothed spectral envelope sequence generating portion 23 and the smoothed amplitude spectral envelope sequence generating portion 24. During the linear prediction analysis process, predictive residual energy $\sigma^2$ is calculated. In this case, the calculated predictive residual energy $\sigma^2$ is outputted to a variance parameter deciding portion 268.

Further, the generated linear prediction coefficient codes are transmitted to a decoding apparatus.

Specifically, by performing operation corresponding to inverse Fourier transform regarding absolute values of the MDCT coefficient sequence $X(0), X(1), \ldots, X(N-1)$ raised to the power of $\eta$ as a power spectrum, that is, the operation of the formula (A7) first, the linear prediction analyzing portion 22 determines a pseudo correlation function signal sequence $\tilde{R}(0), \tilde{R}(1), \ldots, \tilde{R}(N-1)$, which is a time domain signal sequence corresponding to the absolute values of the MDCT coefficient sequence $X(0), X(1), \ldots, X(N-1)$ raised to the power of $\eta$. Then, the linear prediction analyzing portion 22 performs linear prediction analysis using the determined pseudo correlation function signal sequence $\tilde{R}(0), \tilde{R}(1), \ldots, \tilde{R}(N-1)$ to generate linear prediction coefficients $\beta_1, \beta_2, \ldots, \beta_p$. Then, by encoding the generated linear prediction coefficients $\beta_1, \beta_2, \ldots, \beta_p$, the linear prediction analyzing portion 22 obtains linear prediction coefficient codes and quantized linear prediction coefficients $\hat{\beta}_1, \hat{\beta}_2, \ldots, \hat{\beta}_p$ corresponding the linear prediction coefficient codes.

The linear prediction coefficients $\beta_1, \beta_2, \ldots, \beta_p$ are linear prediction coefficients corresponding to a time domain signal when the absolute values of the MDCT coefficient sequence $X(0), X(1), \ldots, X(N-1)$ to the power of are regarded as a power spectrum.

Generation of the linear prediction coefficient codes by the linear prediction analyzing portion 22 is performed, for example, by a conventional encoding technique. As examples of the conventional encoding technique, for example, an encoding technique in which a code corresponding to a linear prediction coefficient itself is caused to be a linear prediction coefficient code, an encoding technique in which a linear prediction coefficient is transformed to an LSP parameter, and a code corresponding to the LSP parameter is caused to be a linear prediction coefficient code, an encoding technique in which a linear prediction coefficient is transformed to a PARCOR coefficient, and a code corresponding to the PARCOR coefficient is caused to be a linear prediction code, and the like are given. For example, the encoding technique in which a code corresponding to a linear prediction coefficient itself is caused to be a linear prediction coefficient code is a technique in which a plurality of quantized linear prediction coefficient candidates are specified in advance; each candidates is stored being associated with a linear prediction coefficient code in advance; any of the candidates is decided as a quantized linear prediction coefficient corresponding to a generated linear prediction coefficient; and, thereby, the quantized linear prediction coefficient and the linear prediction coefficient code are obtained.

In this way, the linear prediction analyzing portion 22 performs linear prediction analysis using a pseudo correlation function signal sequence obtained by performing inverse Fourier transform regarding absolute values of a frequency domain sample sequence, which is, for example, an MDCT coefficient sequence, raised to the power of as a power spectrum, and generates coefficients transformable to linear prediction coefficients.

<Unsmoothed Amplitude Spectral Envelope Sequence Generating Portion 23>

The quantized linear prediction coefficients $\hat{\beta}_1, \hat{\beta}_2, \ldots, \hat{\beta}_p$ generated by the linear prediction analyzing portion 22 are inputted to the unsmoothed amplitude spectral envelope sequence generating portion 23.

The unsmoothed amplitude spectral envelope sequence generating portion 23 generates an unsmoothed amplitude spectral envelope sequence $\hat{H}(0), \hat{H}(1), \ldots, \hat{H}(N-1)$, which is an amplitude spectral envelope sequence corresponding to the quantized linear prediction coefficients $\hat{\beta}_1, \hat{\beta}_2, \ldots, \hat{\beta}_p$ (step A3).

The generated unsmoothed amplitude spectral envelope sequence $\hat{H}(0), \hat{H}(1), \ldots, \hat{H}(N-1)$ is outputted to the encoding portion 26.

The unsmoothed amplitude spectral envelope sequence generating portion 23 generates an unsmoothed amplitude spectral envelope sequence $\hat{H}(0), \hat{H}(1), \ldots, \hat{H}(N-1)$ defined by the following formula (A2) as the unsmoothed amplitude spectral envelope sequence $\hat{H}(0), \hat{H}(1), \ldots, \hat{H}(N-1)$ using the quantized linear prediction coefficients $\hat{\beta}_1, \hat{\beta}_2, \ldots, \hat{\beta}_p$.

[Formula 29]

$$\hat{H}(k) = \left(\frac{1}{2\pi} \frac{1}{\left|1 + \sum_{n=1}^{p} \hat{\beta}_n \exp(-j 2\pi k n / N)\right|^2}\right)^{1/\eta} \quad (A2)$$

In this way, the unsmoothed amplitude spectral envelope sequence generating portion 23 performs spectral envelope estimation by obtaining an unsmoothed spectral envelope sequence, which is a sequence obtained by raising a sequence of an amplitude spectral envelope corresponding to coefficients transformable to linear prediction coefficients generated by the linear prediction analyzing portion 22 to the power of 1/η. Here, when c is assumed to be an arbitrary number, a sequence obtained by raising a sequence constituted by a plurality of values to the power of c refers to a sequence constituted by values each of which is obtained by raising each of the plurality of values to the power of c. For example, a sequence obtained by raising a sequence of an amplitude spectral envelope to the power of 1/η refers to a sequence constituted by values obtained by raising each coefficient of the amplitude spectral envelope to the power of 1/η.

The process of raise to the power of 1/η by the unsmoothed amplitude spectral envelope sequence generating portion 23 is due to the process performed by the linear prediction analyzing portion 22 in which absolute values of a frequency domain sample sequence raised to the power of η are regarded as a power spectrum. That is, the process of raise to the power of 1/η by the unsmoothed amplitude spectral envelope sequence generating portion 23 is performed in order to return values raised to the power of by the process performed by the linear prediction analyzing portion 22 in which absolute values of a frequency domain sample sequence raised to the power of η are regarded as a power spectrum, to the original values.

Though Hγ(k) [k=0, 1, ..., N−1] defined by the formula (13) is used in the first and second embodiments, Hγ(k) [k=0, 1, ..., N−1] defined by the formula (A2) is used in the third embodiment.

<Smoothed Amplitude Spectral Envelope Sequence Generating Portion 24>

The quantized linear prediction coefficients $\hat{\beta}_1$, $\hat{\beta}_2$, ..., $\hat{\beta}_p$ generated by the linear prediction analyzing portion 22 are inputted to the smoothed amplitude spectral envelope sequence generating portion 24.

The smoothed amplitude spectral envelope sequence generating portion 24 generates a smoothed amplitude spectral envelope sequence ˆHγ(0), ˆHγ(1), ..., ˆHγ(N−1), which is a sequence obtained by reducing amplitude unevenness of an amplitude spectral envelope sequence corresponding to the quantized linear prediction coefficients $\hat{\beta}_1$, $\hat{\beta}_2$, ..., $\hat{\beta}_p$ (step A4).

The generated smoothed amplitude spectral envelope sequence ˆHγ(0), ˆHγ(1), ..., ˆHγ(N−1) is outputted to the envelope normalizing portion 25 and the encoding portion 26.

The smoothed amplitude spectral envelope sequence generating portion 24 generates a smoothed amplitude spectral envelope sequence ˆHγ(0), ˆHγ(1), ..., ˆHγ(N−1) defined by the following formula (A3) as the smoothed amplitude spectral envelope sequence ˆHγ(0), ˆHγ(1), ..., ˆHγ(N−1) using the quantized linear prediction coefficients $\hat{\beta}_1$, $\hat{\beta}_2$, ..., $\hat{\beta}_p$ and a correction coefficient γ.

[Formula 30]

$$\hat{H}_\gamma(k) = \left( \frac{1}{2\pi} \frac{1}{\left|1 + \sum_{n=1}^{p} \hat{\beta}_n \gamma^n \exp(-j2\pi kn/N)\right|^2} \right)^{1/\eta} \quad (A3)$$

Here, the correction coefficient γ is a predetermined constant smaller than 1 and is a coefficient which reduces amplitude unevenness of the unsmoothed amplitude spectral envelope sequence ˆH(0), ˆH(1), ..., ˆH(N−1), in other words, a coefficient which smoothes the unsmoothed amplitude spectral envelope sequence ˆH(0), ˆH(1), ..., ˆH(N−1).

Though ˆHγ(k) [k=0, 1, ..., N−1] defined by the formula (14) is used in the first and second embodiments, ˆHγ(k) [k=0, 1, ..., N−1] defined by the formula (A3) is used in the third embodiment.

<Envelope Normalizing Portion 25>

The MDCT coefficient sequence X(0), X(1), ..., X(N−1) obtained by the frequency domain transforming portion 21 and the smoothed amplitude spectral envelope sequence ˆHγ(0), ˆHγ(1), ..., ˆHγ(N−1) generated by the smoothed amplitude spectral envelope sequence generating portion 24 are inputted to the envelope normalizing portion 25.

The envelope normalizing portion 25 generates a normalized MDCT coefficient sequence $X_N(0)$, $X_N(1)$, ..., $X_N(N-1)$ by normalizing each coefficient of the MDCT coefficient sequence X(0), X(1), ..., X(N−1) by a corresponding value of the smoothed amplitude spectral envelope sequence ˆHγ(0), ˆHγ(1), ..., ˆHγ(N−1) (step A5).

The generated normalized MDCT coefficient sequence is outputted to the encoding portion 26.

The envelope normalizing portion 25 generates each coefficient $X_N(k)$ of the normalized MDCT coefficient sequence $X_N(0)$, $X_N(1)$, ..., $X_N(N-1)$ by dividing each coefficient X(k) of the MDCT coefficient sequence X(0), X(1), ..., X(N−1) by the smoothed amplitude spectral envelope sequence ˆHγ(0), ˆHγ(1), ..., ˆHγ(N−1), for example, on the assumption of k=0, 1, ..., N−1. That is, $X_N(k)=X(k)/\hat{H}_\gamma(k)$ is satisfied on the assumption of k=0, 1, ..., N−1.

<Encoding Portion 26>

The normalized MDCT coefficient sequence $X_N(0)$, $X_N(1)$, ..., $X_N(N-1)$ generated by the envelope normalizing portion 25, the unsmoothed amplitude spectral envelope sequence ˆH(0), ˆH(1), ..., ˆH(N−1) generated by the unsmoothed amplitude spectral envelope sequence generating portion 23, the smoothed amplitude spectral envelope sequence ˆHγ(0), ˆHγ(1), ..., ˆHγ(N−1) generated by the smoothed amplitude spectral envelope sequence generating portion 24 and average residual energy $\sigma^2$ calculated by the linear prediction analyzing portion 22 are inputted to the encoding portion 26.

Figure 13:
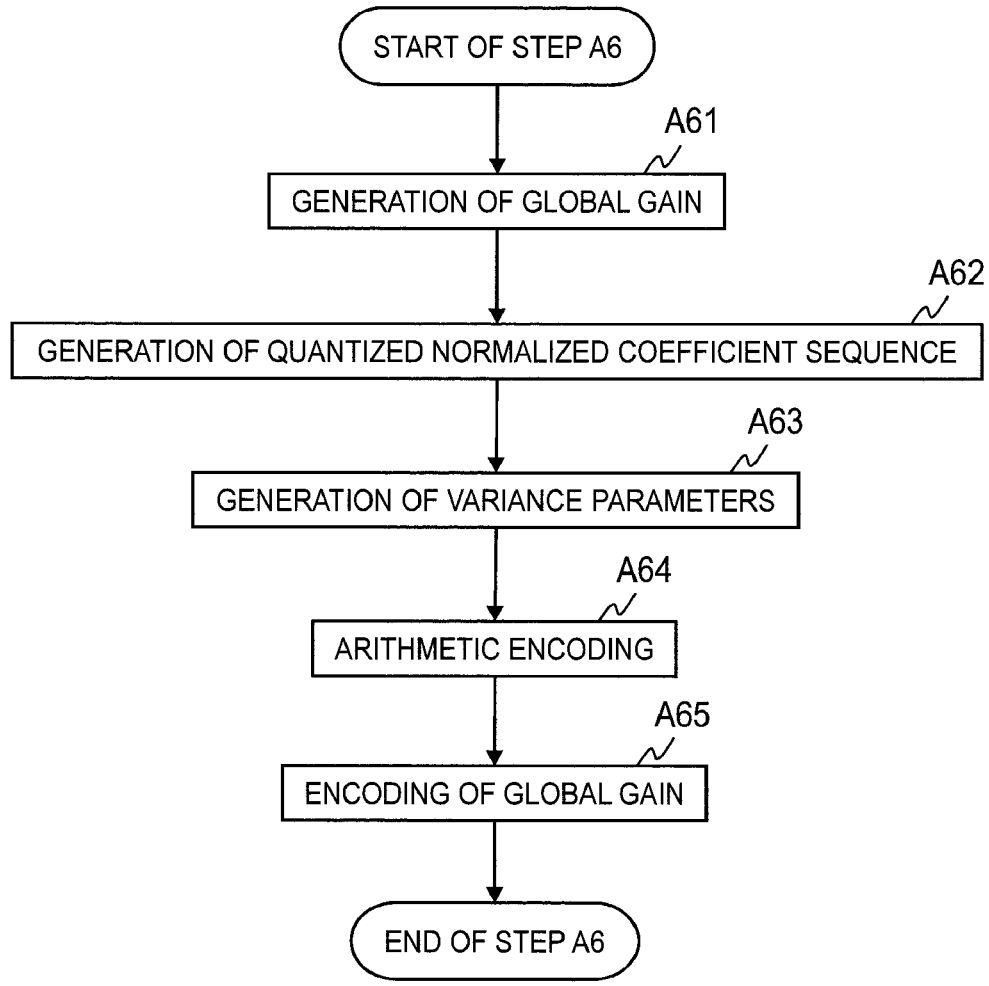
FIG. 13 is a flowchart for illustrating an example of the encoding method of the present invention.

The encoding portion 26 performs encoding, for example, by performing processes of steps A61 to A65 shown in FIG. 13 (step A6).

The encoding portion 26 determines a global gain g corresponding to the normalized MDCT coefficient sequence $X_N(0)$, $X_N(1)$, ..., $X_N(N-1)$ (step A61), determines a quantized normalized coefficient sequence $X_Q(0)$, $X_Q(1)$, ..., $X_Q(N-1)$, which is a sequence of integer values obtained by quantizing a result of dividing each coefficient of the normalized MDCT coefficient sequence $X_N(0)$, $X_N(1)$, ..., $X_N(N-1)$ by the global gain g (step A62), determines variance parameters φ(0), φ(1), ..., φ(N−1) corresponding to coefficients of the quantized normalized coefficient sequence $X_Q(0)$, $X_Q(1)$, ..., $X_Q(N-1)$, respectively, from the global gain g, the unsmoothed amplitude spectral envelope sequence ˆH(0), ˆH(1), ..., ˆH(N−1), the smoothed amplitude spectral envelope sequence ˆHγ(0), ˆHγ(1), ..., ˆHγ(N−1) and the average residual energy $\sigma^2$ by the above formula (A1) (step A63), performs arithmetic encoding of the quantized normalized coefficient sequence $X_Q(0)$, $X_Q(1)$, ..., $X_Q(N-1)$ using the variance parameters φ(0), φ(1), ..., φ(N−1) to obtain an integer signal codes (step A64) and obtains a gain code corresponding to the global gain g (step A65).

[Formula 31]

$$\phi(k) = \eta^{1/\eta} B(\eta) \hat{H}_N(k) \frac{\sigma^{2/\eta}}{g} \quad (A1)$$

Here, the normalized amplitude spectral envelope sequence $\hat{H}_N(0), \hat{H}_N(1), \ldots, \hat{H}_N(N-1)$ in the above formula (A1) is what is obtained by dividing each value of the unsmoothed amplitude spectral envelope sequence $\hat{H}(0), \hat{H}(1), \ldots, \hat{H}(N-1)$ by a corresponding value of the smoothed amplitude spectral envelope sequence $\hat{H}\gamma(0), \hat{H}\gamma(1), \ldots, \hat{H}\gamma(N-1)$, that is, what is determined by the following formula (A8).

[Formula 32]

$$\hat{H}_N(k) = \frac{\hat{H}(k)}{\hat{H}_\gamma(k)}, k = 0, 1, \ldots, N-1 \quad (A8)$$

The generated integer signal codes and the gain code are outputted to the decoding apparatus as codes corresponding to the normalized MDCT coefficient sequence.

The encoding portion 26 realizes a function of deciding such a global gain g that the number of bits of the integer signal codes is equal to or smaller than the number of allocated bits B, which is the number of bits allocated in advance, and is as large as possible and generating a gain code corresponding to the decided global gain g and integer signal codes corresponding to the decided global gain by the above steps A61 to A65.

Among steps A61 to A65 performed by the encoding portion 26, it is step A63 that a characteristic process is comprised. As for the encoding process itself which is for obtaining codes corresponding to the normalized MDCT coefficient sequence by encoding each of the global gain g and the quantized normalized coefficient sequence $X_Q(0), X_Q(1), \ldots, X_Q(N-1)$, various publicly-known techniques comprising the technique described in Non-patent literature 1 exist. Two specific examples of the encoding process performed by the encoding portion 26 will be described below.

[Specific Example 1 of Encoding Process Performed by Encoding Portion 26]

As a specific example 1 of the encoding process performed by the encoding portion 26, an example which does not include a loop process will be described.

Figure 14:
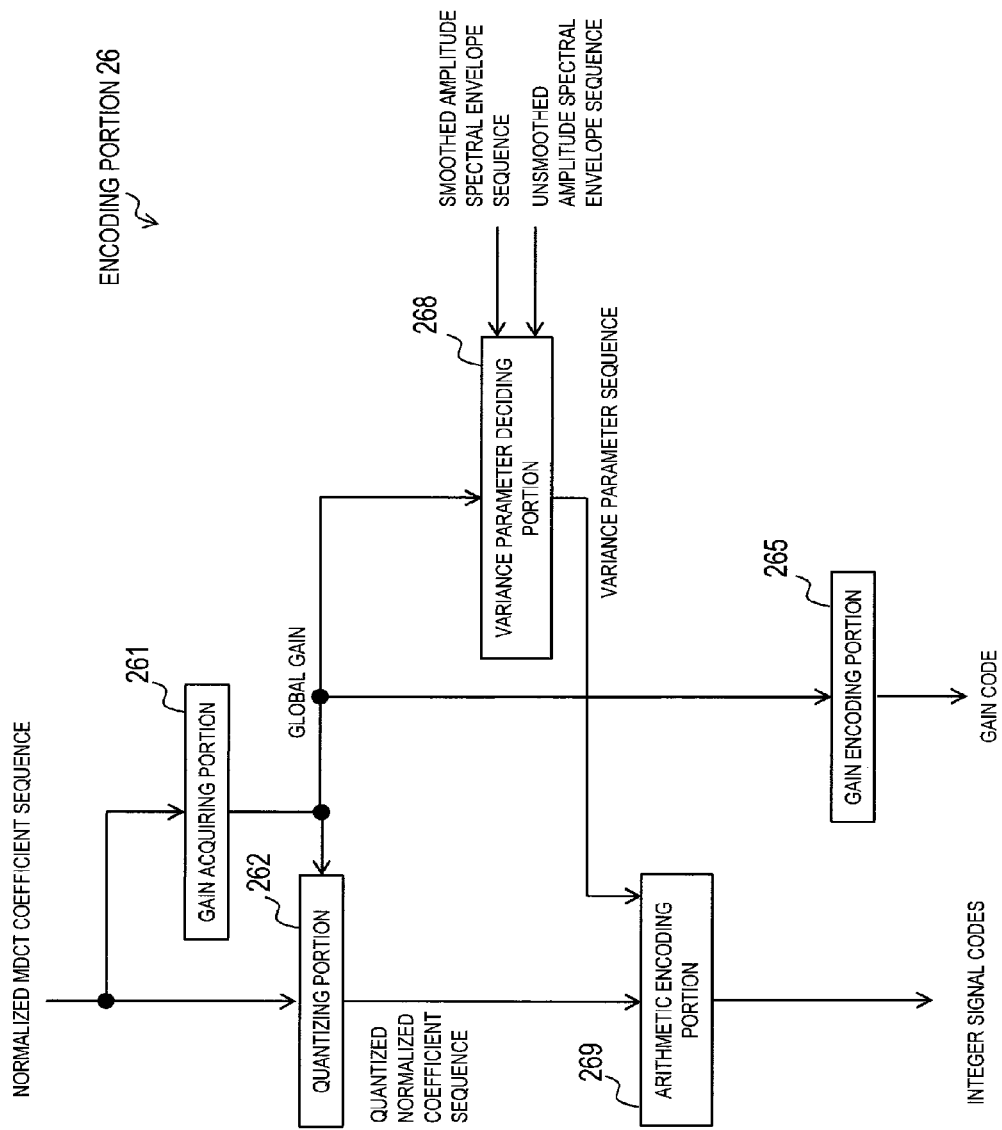
FIG. 14 is a block diagram for illustrating an example of the encoding portion of the present invention.

FIG. 14 shows a configuration example of the encoding portion 26 of the specific example 1. As shown in FIG. 14, the encoding portion 26 of the specific example 1 is, for example, provided with a gain acquiring portion 261, a quantizing portion 262, a variance parameter deciding portion 268, an arithmetic encoding portion 269 and a gain encoding portion 265. Each portion in FIG. 14 will be described below.

<Gain Acquiring Portion 261>

A normalized MDCT coefficient sequence $X_N(0), X_N(1), \ldots, X_N(N-1)$ generated by the envelope normalizing portion 25 is inputted to the gain acquiring portion 261.

The gain acquiring portion 261 decides such a global gain g that the number of bits of integer signal codes is equal to or smaller than the number of allocated bits B, which is the number of bits allocated in advance, and is as large as possible from the normalized MDCT coefficient sequence $X_N(0), X_N(1), \ldots, X_N(N-1)$ and outputs the global gain g (step S261). For example, the gain acquiring portion 261 acquires and outputs a multiplication value of a square root of the total of energy of the normalized MDCT coefficient sequence $X_N(0), X_N(1), \ldots, X_N(N-1)$ and a constant which is in negative correlation with the number of allocated bits B as the global gain g. Otherwise, the gain acquiring portion 261 may tabulate a relationship among the total of energy of the normalized MDCT coefficient sequence $X_N(0), X_N(1), \ldots, X_N(N-1)$, the number of allocated bits B and the global gain g in advance, and obtain and output a global gain g by referring to the table.

In this way, the gain acquiring portion 261 obtains a gain for performing division of all samples of a normalized frequency domain sample sequence which is, for example, a normalized MDCT coefficient sequence.

The obtained global gain g is outputted to the quantizing portion 262 and the variance parameter deciding portion 268.

<Quantizing Portion 262>

A normalized MDCT coefficient sequence $X_N(0), X_N(1), \ldots, X_N(N-1)$ generated by the envelope normalizing portion 25 and the global gain g obtained by the gain acquiring portion 261 are inputted to the quantizing portion 262.

The quantizing portion 262 obtains and outputs a quantized normalized coefficient sequence $X_Q(0), X_Q(1), \ldots, X_Q(N-1)$ as a sequence of the integer part of a result of dividing each coefficient of the normalized MDCT coefficient sequence $X_N(0), X_N(1), \ldots, X_N(N-1)$ by the global gain g (step S262).

In this way, the quantizing portion 262 determines a quantized normalized coefficient sequence by dividing each sample of a normalized frequency domain sample sequence which is, for example, a normalized MDCT coefficient sequence by a gain and quantizing the result.

The obtained quantized normalized coefficient sequence $X_Q(0), X_Q(1), \ldots, X_Q(N-1)$ is outputted to the arithmetic encoding portion 269.

<Variance Parameter Deciding Portion 268>

The global gain g obtained by the gain acquiring portion 261, the unsmoothed amplitude spectral envelope sequence $\hat{H}(0), \hat{H}(1), \ldots, \hat{H}(N-1)$ generated by the unsmoothed amplitude spectral envelope sequence generating portion 23, the smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 24, and predictive residual energy $\sigma^2$ obtained by the linear prediction analyzing portion 22 are inputted to the variance parameter deciding portion 268.

The variance parameter deciding portion 268 obtains and outputs each variance parameter of a variance parameter sequence $\phi(0), \phi(1), \ldots, \phi(N-1)$ from the global gain g, the unsmoothed amplitude spectral envelope sequence $\hat{H}(0), \hat{H}(1), \ldots, \hat{H}(N-1)$, the smoothed amplitude spectral envelope sequence $\hat{H}\gamma(0), \hat{H}\gamma(1), \ldots, \hat{H}\gamma(N-1)$ and the predictive residual energy & by the above formulas (A1) and (A8) (step S268).

The obtained variance parameter sequence $\phi(0), \phi(1), \ldots, \phi(N-1)$ is outputted to the arithmetic encoding portion 269.

<Arithmetic Encoding Portion 269>

The quantized normalized coefficient sequence $X_Q(0), X_Q(1), \ldots, X_Q(N-1)$ obtained by the quantizing portion 262 and the variance parameter sequence $\phi(0), \phi(1), \ldots, \phi(N-1)$ obtained by the variance parameter deciding portion 268 are inputted to the arithmetic encoding portion 269.

The arithmetic encoding portion 269 performs arithmetic encoding of the quantized normalized coefficient sequence $X_Q(0), X_Q(1), \ldots, X_Q(N-1)$ using each variance parameter of the variance parameter sequence $\phi(0), \phi(1), \ldots, \phi(N-1)$ as a variance parameter corresponding to each coefficient of the quantized normalized coefficient sequence $X_Q(0), X_Q(1), \ldots, X_Q(N-1)$ to obtain and output integer signal codes (step S269).

At the time of performing arithmetic encoding, the arithmetic encoding portion 269 configures such arithmetic codes that each coefficient of the quantized normalized coefficient sequence $X_Q(0), X_Q(1), \ldots, X_Q(N-1)$ becomes optimal when being in accordance with generalized Gaussian distribution $f_{GG}(X|\phi(k),\eta)$ and performs encoding with arithmetic codes based on this configuration. As a result, an expected value of bit allocation to each coefficient of the quantized normalized coefficient sequence $X_Q(0), X_Q(1), \ldots, X_Q(N-1)$ is decided with the variance parameter sequence $\phi(0), \phi(1), \ldots, \phi(N-1)$.

The obtained integer signal codes are outputted to the decoding apparatus.

Arithmetic encoding may be performed over a plurality of coefficients in the quantized normalized coefficient sequence $X_Q(0), X_Q(1), \ldots, X_Q(N-1)$. In this case, since each variance parameter of the variance parameter sequence $\phi(0), \phi(1), \ldots, \phi(N-1)$ is based on the unsmoothed amplitude spectral envelope sequence $\hat{H}(0), \hat{H}(1), \ldots, \hat{H}(N-1)$ as seen from the formulas (A1) and (A8), it can be said that the arithmetic encoding portion 269 performs such encoding that bit allocation substantially changes based on an estimated spectral envelope (an unsmoothed amplitude spectral envelope).

<Gain Encoding Portion 265>

The global gain g obtained by the gain acquiring portion 261 is inputted to the gain encoding portion 265.

The gain encoding portion 265 encodes the global gain g to obtain and output a gain code (step S265).

The generated integer signal codes and the gain code are outputted to the decoding apparatus as codes corresponding to the normalized MDCT coefficient sequence.

Steps S261, S262, S268, S269 and S265 of the present specific example 1 correspond to the above steps A61, A62, A63, A64 and A65, respectively.

[Specific Example 2 of Encoding Process Performed by Encoding Portion 26]

As a specific example 2 of the encoding process performed by the encoding portion 26, an example which comprises a loop process will be described.

Figure 15:
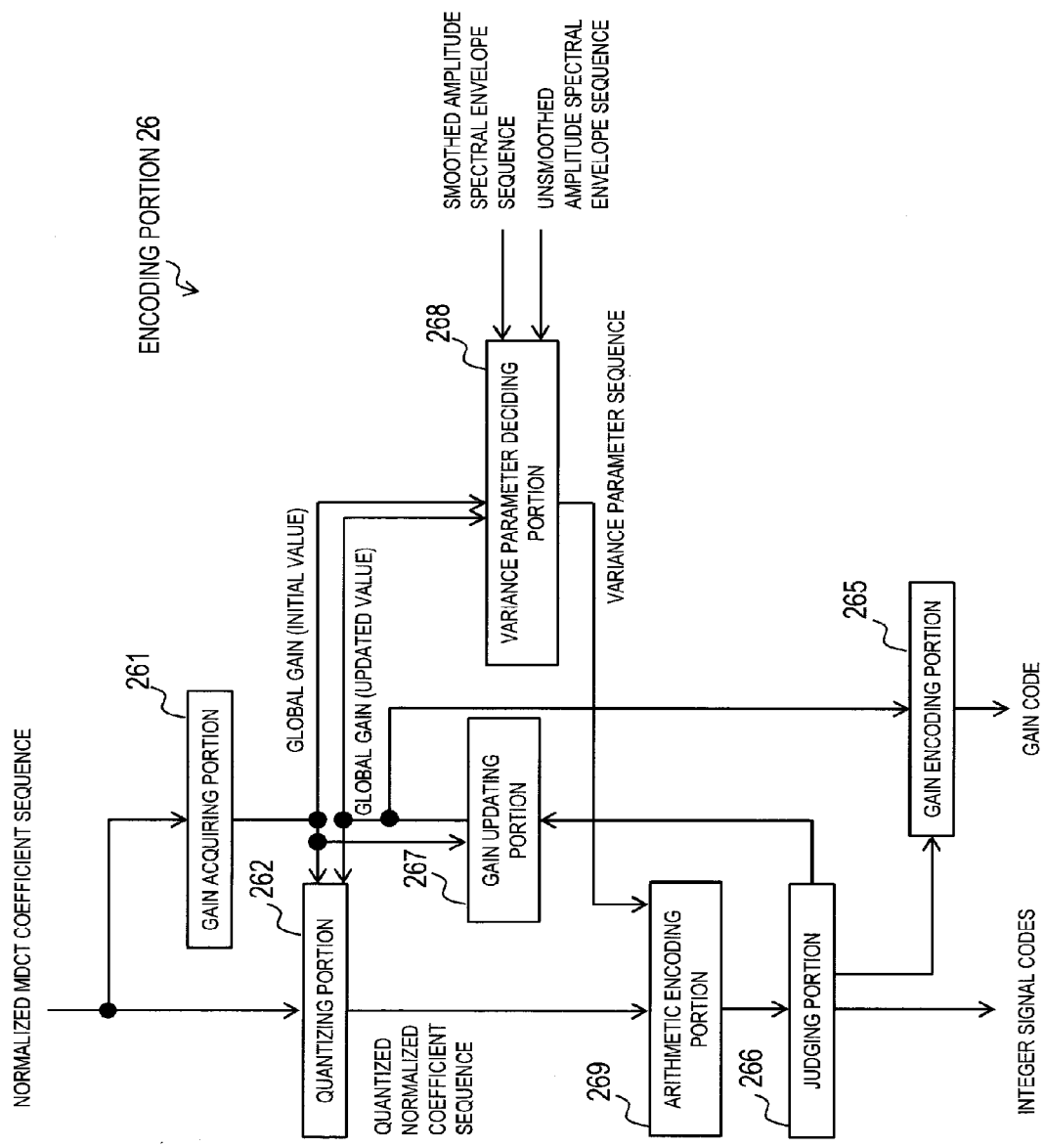
FIG. 15 is a block diagram for illustrating an example of the encoding portion of the present invention.

FIG. 15 shows a configuration example of the encoding portion 26 of the specific example 2. As shown in FIG. 15, the encoding portion 26 of the specific example 2 is, for example, provided with a gain acquiring portion 261, a quantizing portion 262, a variance parameter deciding portion 268, an arithmetic encoding portion 269, a gain encoding portion 265, a judging portion 266 and a gain updating portion 267. Each portion in FIG. 15 will be described below.

<Gain Acquiring Portion 261>

A normalized MDCT coefficient sequence $X_N(0), X_N(1), \ldots, X_N(N-1)$ generated by the envelope normalizing portion 25 is inputted to the gain acquiring portion 261.

The gain acquiring portion 261 decides such a global gain g that the number of bits of integer signal codes is equal to or smaller than the number of allocated bits B, which is the number of bits allocated in advance, and is as large as possible from the normalized MDCT coefficient sequence $X_N(0), X_N(1), \ldots, X_N(N-1)$ and outputs the global gain g (step S261). For example, the gain acquiring portion 261 acquires and outputs a multiplication value of a square root of the total of energy of the normalized MDCT coefficient sequence $X_N(0), X_N(1), \ldots, X_N(N-1)$ and a constant which is in negative correlation with the number of allocated bits B as the global gain g.

The obtained global gain g is outputted to the quantizing portion 262 and the variance parameter deciding portion 268.

The global gain g obtained by the gain acquiring portion 261 becomes an initial value of a global gain used by the quantizing portion 262 and the variance parameter deciding portion 268.

<Quantizing Portion 262>

A normalized MDCT coefficient sequence $X_N(0), X_N(1), \ldots, X_N(N-1)$ generated by the envelope normalizing portion 25 and the global gain g obtained by the gain acquiring portion 261 or the gain updating portion 267 are inputted to the quantizing portion 262.

The quantizing portion 262 obtains and outputs a quantized normalized coefficient sequence $X_Q(0), X_Q(1), \ldots, X_Q(N-1)$ as a sequence of the integer part of a result of dividing each coefficient of the normalized MDCT coefficient sequence $X_N(0), X_N(1), \ldots, X_N(N-1)$ by the global gain g (step S262).

Here, a global gain g used when the quantizing portion 262 is executed for the first time is the global gain g obtained by the gain acquiring portion 261, that is, the initial value of the global gain. Further, a global gain g used when the quantizing portion 262 is executed at and after the second time is the global gain g obtained by the gain updating portion 267, that is, an updated value of the global gain.

The obtained quantized normalized coefficient sequence $X_Q(0), X_Q(1), \ldots, X_Q(N-1)$ is outputted to the arithmetic encoding portion 269.

<Variance Parameter Deciding Portion 268>

The global gain g obtained by the gain acquiring portion 261 or the gain updating portion 267, the unsmoothed amplitude spectral envelope sequence $\hat{H}(0), \hat{H}(1), \ldots, \hat{H}(N-1)$ generated by the unsmoothed amplitude spectral envelope sequence generating portion 23, the smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 24, and predictive residual energy $\sigma^2$ obtained by the linear prediction analyzing portion 22 are inputted to the variance parameter deciding portion 268.

The variance parameter deciding portion 268 obtains and outputs each variance parameter of a variance parameter sequence $\phi(0), \phi(1), \ldots, \phi(N-1)$ from the global gain g, the unsmoothed amplitude spectral envelope sequence $\hat{H}(0), \hat{H}(1), \ldots, \hat{H}(N-1)$, the smoothed amplitude spectral envelope sequence $\hat{H}\gamma(0), \hat{H}\gamma(1), \ldots, \hat{H}\gamma(N-1)$ and the predictive residual energy $\sigma^2$ by the above formulas (A1) and (A8) (step S268).

Here, a global gain g used when the variance parameter deciding portion 268 is executed for the first time is the global gain g obtained by the gain acquiring portion 261, that is, the initial value of the global gain. Further, a global gain g used when the variance parameter deciding portion 268 is executed at and after the second time is the global gain g obtained by the gain updating portion 267, that is, an updated value of the global gain.

The obtained variance parameter sequence $\phi(0), \phi(1), \ldots, \phi(N-1)$ is outputted to the arithmetic encoding portion 269.

<Arithmetic Encoding Portion 269>

The quantized normalized coefficient sequence $X_Q(0), X_Q(1), \ldots, X_Q(N-1)$ obtained by the quantizing portion 262 and the variance parameter sequence $\phi(0), \phi(1), \ldots, \phi(N-1)$ obtained by the variance parameter deciding portion 268 are inputted to the arithmetic encoding portion 269.

The arithmetic encoding portion 269 performs arithmetic encoding of the quantized normalized coefficient sequence $X_Q(0), X_Q(1), \ldots, X_Q(N-1)$ using each variance parameter of the variance parameter sequence $\phi(0), \phi(1), \ldots, \phi(N-1)$ as a variance parameter corresponding to each coefficient of the quantized normalized coefficient sequence $X_Q(0), X_Q(1), \ldots, X_Q(N-1)$ to obtain and output integer signal codes and the number of consumed bits C, which is the number of bits of the integer signal codes (step S269).

At the time of performing arithmetic encoding, the arithmetic encoding portion 269 performs such bit allocation that that each coefficient of the quantized normalized coefficient sequence $X_Q(0), X_Q(1), \ldots, X_Q(N-1)$ becomes optimal when being in accordance with the generalized Gaussian distribution $f_{GG}(X|\phi(k),\eta)$ by performing arithmetic encoding and performs encoding with arithmetic codes based on the performed bit allocation.

The obtained integer signal codes and the number of consumed bits C are outputted to the judging portion 266.

Arithmetic encoding may be performed over a plurality of coefficients in the quantized normalized coefficient sequence $X_Q(0), X_Q(1), \ldots, X_Q(N-1)$. In this case, since each variance parameter of the variance parameter sequence $\phi(0), \phi(1), \ldots, \phi(N-1)$ is based on the unsmoothed amplitude spectral envelope sequence $\hat{H}(0), \hat{H}(1), \ldots, \hat{H}(N-1)$ as seen from the formulas (A1) and (A8), it can be said that the arithmetic encoding portion 269 performs such encoding that bit allocation substantially changes based on an estimated spectral envelope (an unsmoothed amplitude spectral envelope).

<Judging Portion 266>

The integer signal codes obtained by the arithmetic encoding portion 269 are inputted to the judging portion 266.

When the number of times of updating the gain is a predetermined number of times, the judging portion 266 outputs the integer signal codes as well as outputting an instruction signal to encode the global gain g obtained by the gain updating portion 267 to the gain encoding portion 265, and, when the number of times of updating the gain is smaller than the predetermined number of times, the judging portion 266 outputs the number of consumed bits C measured by the arithmetic coding portion 269 to the gain updating portion 267 (step S266).

<Gain Updating Portion 267>

The number of consumed bits C measured by the arithmetic coding portion 269 is inputted to the gain updating portion 267.

When the number of consumed bits C is larger than the number of allocated bits B, the gain updating portion 267 updates the value of the global gain g to a larger value and outputs the value. When the number of consumed bits C is smaller than the number of allocated bits B, the gain updating portion 267 updates the value of the global gain g to a smaller value and outputs the updated value of the global gain g (step S267).

The updated global gain g obtained by the gain updating portion 267 is outputted to the quantizing portion 262 and the gain encoding portion 265.

<Gain Encoding Portion 265>

An output instruction from the judging portion 266 and the global gain g obtained by the gain updating portion 267 are inputted to the gain encoding portion 265.

The gain encoding portion 265 encodes the global gain g to obtain and output a gain code in accordance with an instruction signal (step S265).

The integer signal codes outputted by the judging portion 266 and the gain code outputted by the gain encoding portion 265 are outputted to the decoding apparatus as codes corresponding to the normalized MDCT coefficient sequence.

That is, in the present specific example 2, step S267 performed last corresponds to the above step A61, and steps S262, S263, S264 and S265 correspond to the above steps A62, A63, A64, and A65, respectively.

The specific example 2 of the encoding process performed by the encoding portion 26 is described in more detail in International Publication No. WO2014/054556 and the like.

[Modification of Encoding Portion 26]

The encoding portion 26 may perform such encoding that bit allocation is changed based on an estimated spectral envelope (an unsmoothed amplitude spectral envelope), for example, by performing the following process.

The encoding portion 26 determines a global gain g corresponding to a normalized MDCT coefficient sequence $X_N(0), X_N(1), \ldots, X_N(N-1)$ first, and determines a quantized normalized coefficient sequence $X_Q(0), X_Q(1), \ldots, X_Q(N-1)$, which is a sequence of integer values obtained by quantizing results of dividing coefficients of the normalized MDCT coefficient sequence $X_N(0), X_N(1), \ldots, X_N(N-1)$ by the global gain g.

As for quantized bits corresponding to each coefficient of this quantized normalized coefficient sequence $X_Q(0), X_Q(1), \ldots, X_Q(N-1)$, distribution of $X_Q(k)$ is assumed to be uniform in a certain range, and the range can be decided based on estimated values of an envelope. Though it is also possible to encode estimated values of an envelope for each of a plurality of samples, the encoding portion 26 can decide the range of $X_Q(k)$ using values $\hat{H}_N(k)$ of a normalized amplitude spectral envelope sequence based on linear prediction, for example, like the following formula (A9).

[Formula 33]

$$\phi(k) = \frac{\hat{H}(k)}{\hat{H}_\gamma(k)} = \hat{H}_N(k), (k = 0, \ldots, N-1) \quad (A9)$$

In order to minimize a square error of $X_Q(k)$ at the time of quantizing $X_Q(k)$ for a certain k, it is possible to set the number of bits b(k) to be allocated under the restriction of the following formula:

[Formula 34]

$$B = \sum_{j=0}^{j=N-1} \phi(j)$$

The number of bits b(k) to be allocated can be represented by the following formula (A10):

[Formula 35]

$$b(k) = \frac{B}{N} + \frac{1}{2}\log_2(\phi(k)^2) - \frac{1}{2}\sum_{j=0}^{j=N-1}\log_2(\phi(j)^2), (k = 0, \ldots, N-1) \quad (A10)$$

Here, B is a positive integer specified in advance. At this time, the encoding portion 26 may perform a process for readjusting b(k) by performing rounding off so that b(k) becomes an integer, setting b(k)=0 when b(k) is smaller than 0, or the like.

Further, the encoding portion 26 may decide the number of allocated bits not for each sample but for a plurality of collected samples and may perform not scalar quantization for each sample but quantization for each vector of a plurality of collected samples.

When the number of quantized bits b(k) of $X_Q(k)$ of a sample k is given as described above, and encoding is performed for each sample, $X_Q(k)$ can take $2^{b(k)}$ kinds of integers from $-2^{b(k)-1}$ to $2^{b(k)-1}$. The encoding portion 26 encodes each sample with b(k) bits to obtain an integer signal code.

The generated integer signal codes are outputted to the decoding apparatus. For example, the generated b(k)-bit integer signal codes corresponding to $X_Q(k)$ are sequentially outputted to the decoding apparatus, with k=0 first.

If $X_Q(k)$ exceeds the range from $-2^{b(k)-1}$ to $2^{b(k)-1}$ described above, it is replaced with a maximum value or a minimum value.

When g is too small, quantization distortion is generated by the replacement. When g is too large, a quantization error is increased, and it is not possible to effectively utilize information because the range $X_Q(k)$ can take is too small in comparison with b(k). Therefore, optimization of g may be performed.

The encoding portion 26 encodes the global gain g to obtain and output a gain code.

The encoding portion 26 may perform encoding other than arithmetic encoding as done in this modification of the encoding portion 26.

(Decoding of Third Embodiment)

Figure 16:
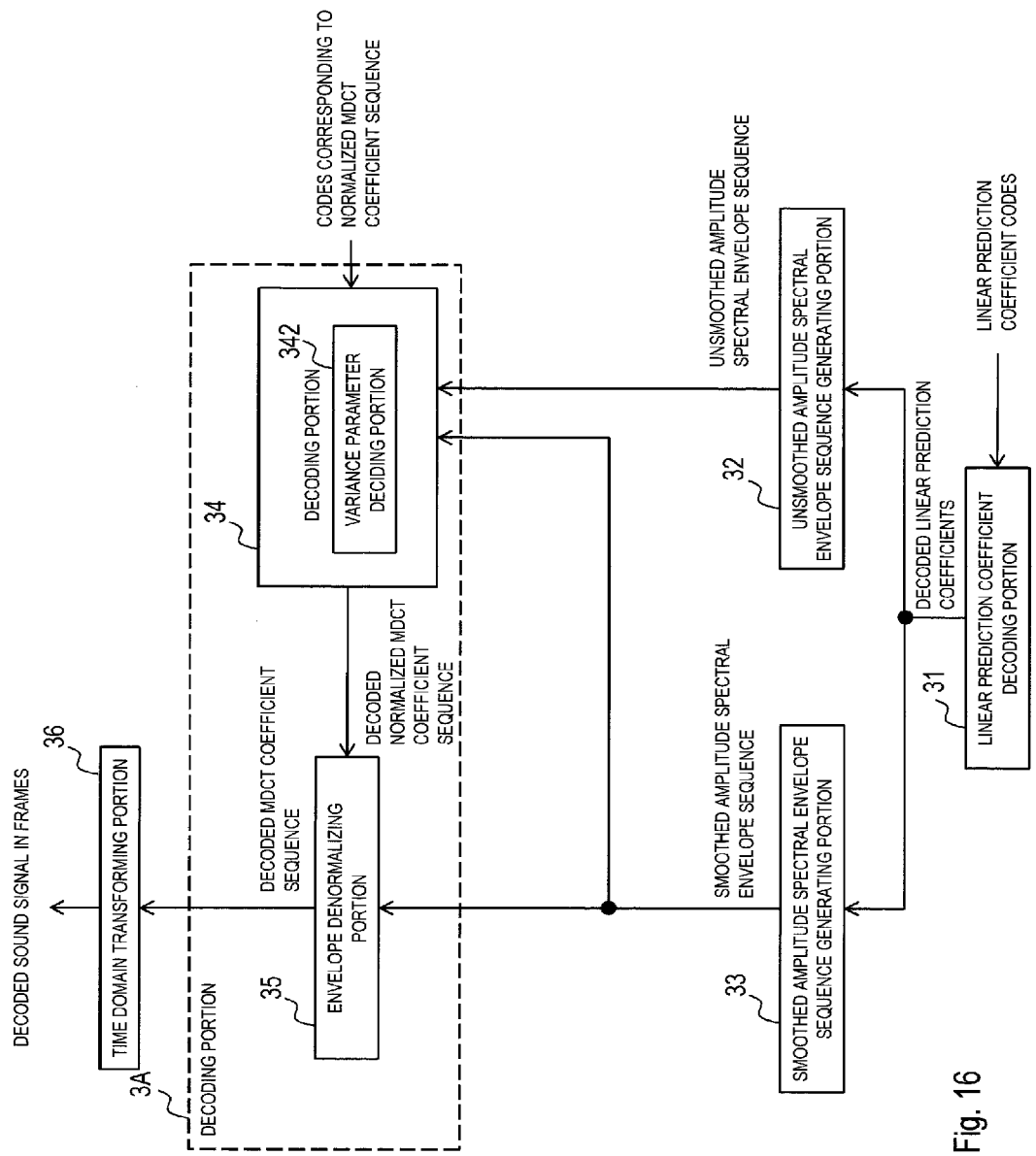
FIG. 16 is a block diagram for illustrating an example of the decoding apparatus of the present invention.

FIG. 16 shows a configuration example of the decoding apparatus corresponding to the encoding apparatus of the third embodiment. As shown in FIG. 16, the decoding apparatus of the third embodiment is, for example, provided with a linear prediction coefficient decoding portion 31, an unsmoothed amplitude spectral envelope sequence generating portion 32, a smoothed amplitude spectral envelope sequence generating portion 33, a decoding portion 34, an envelope denormalizing portion 35, and a time domain transforming portion 36. FIG. 10 shows an example of each process of a decoding method of the third embodiment realized by this decoding apparatus.

At least codes corresponding to a normalized MDCT coefficient sequence and linear prediction coefficient codes outputted by the encoding apparatus are inputted to the decoding apparatus.

Each portion in FIG. 16 will be described below.

<Linear Prediction Coefficient Decoding Portion 31>

The linear prediction coefficient codes outputted by the encoding apparatus are inputted to the linear prediction coefficient decoding portion 31.

For each frame, the linear prediction coefficient decoding portion 31 decodes the inputted linear prediction coefficient codes, for example, by a conventional decoding technique to obtain decoded linear prediction coefficients $\hat{\beta}_1, \hat{\beta}_2, \ldots, \hat{\beta}_p$ (step B1).

The obtained decoded linear prediction coefficients $\hat{\beta}_1, \hat{\beta}_2, \ldots, \hat{\beta}_p$ are outputted to the unsmoothed amplitude spectral envelope sequence generating portion 32 and the unsmoothed amplitude spectral envelope sequence generating portion 33.

Here, the conventional decoding technique is, for example, a technique in which, when the linear prediction coefficient codes are codes corresponding to quantized linear prediction coefficients, the linear prediction coefficient codes are decoded to obtain decoded linear prediction coefficients which are the same as the quantized linear prediction coefficients, a technique in which, when the linear prediction coefficient codes are codes corresponding to quantized LSP parameters, the linear prediction coefficient codes are decoded to obtain decoded LSP parameters which are the same as the quantized LS parameters, or the like. Further, the linear prediction coefficients and the LSP parameters are mutually transformable, and it is well known that a transformation process can be performed between the decoded linear prediction coefficients and the decoded LSP parameters according to inputted linear prediction coefficient codes and information required for subsequent processes. From the above, it can be said that what comprises the above linear prediction coefficient code decoding process and the above transformation process performed as necessary is "decoding by the conventional decoding technique".

In this way, the linear prediction coefficient decoding portion 31 generates coefficients transformable to linear prediction coefficients corresponding to a pseudo correlation function signal sequence obtained by performing inverse Fourier transform regarding absolute values of a frequency domain sample sequence corresponding to a time-series signal raised to the power of η as a power spectrum, by decoding inputted linear prediction codes.

<Unsmoothed Amplitude Spectral Envelope Sequence Generating Portion 32>

The decoded linear prediction coefficients $\hat{\beta}_1, \hat{\beta}_2, \ldots, \hat{\beta}_p$ obtained by the linear prediction coefficient decoding portion 31 are inputted to the unsmoothed amplitude spectral envelope sequence generating portion 32.

The unsmoothed amplitude spectral envelope sequence generating portion 32 generates an unsmoothed amplitude spectral envelope sequence $\hat{H}(0), \hat{H}(1), \ldots, \hat{H}(N-1)$, which is an amplitude spectral envelope sequence corresponding to the decoded linear prediction coefficients $\hat{\beta}_1, \hat{\beta}_2, \ldots, \hat{\beta}_p$ by the above formula (A2) (step B2).

The generated unsmoothed amplitude spectral envelope sequence $\hat{H}(0), \hat{H}(1), \ldots, \hat{H}(N-1)$ is outputted to the decoding portion 34.

In this way, on the assumption that η is a predetermined positive number other than 2, the unsmoothed amplitude spectral envelope sequence generating portion 32 obtains an unsmoothed spectral envelope sequence, which is a sequence obtained by raising a sequence of an amplitude spectral envelope corresponding to coefficients transformable to linear prediction coefficients generated by the linear prediction coefficient decoding portion 31 to the power of 1/η. Here, η used by the unsmoothed amplitude spectral envelope sequence generating portion 32 is specified in advance and is the same as η specified in advance in the corresponding encoding apparatus.

<Smoothed Amplitude Spectral Envelope Sequence Generating Portion 33>

The decoded linear prediction coefficients $\hat{\beta}_1, \hat{\beta}_2, \ldots, \hat{\beta}_p$ obtained by the linear prediction coefficient decoding portion 31 are inputted to the smoothed amplitude spectral envelope sequence generating portion 33.

The smoothed amplitude spectral envelope sequence generating portion 33 generates a smoothed amplitude spectral envelope sequence $\hat{H}\gamma(0), \hat{H}\gamma(1), \ldots, \hat{H}\gamma(N-1)$, which is a sequence obtained by reducing amplitude unevenness of a sequence of an amplitude spectral envelope corresponding to the decoded linear prediction coefficients $\hat{\beta}_1, \hat{\beta}_2, \ldots, \hat{\beta}_p$ by the above formula A(3) (step B3).

The generated smoothed amplitude spectral envelope sequence $\hat{H}\gamma(0), \hat{H}\gamma(1), \ldots, \hat{H}\gamma(N-1)$ is outputted to the decoding portion 34 and the envelope denormalizing portion 35.

<Decoding Portion 34>

Codes corresponding to the normalized MDCT coefficient sequence outputted by the encoding apparatus, the unsmoothed amplitude spectral envelope sequence $\hat{H}(0), \hat{H}(1), \ldots, \hat{H}(N-1)$ generated by the unsmoothed amplitude spectral envelope sequence generating portion 32 and the smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 33 are inputted to the decoding portion 34.

The decoding portion 34 is provided with a variance parameter deciding portion 342.

Figure 17:
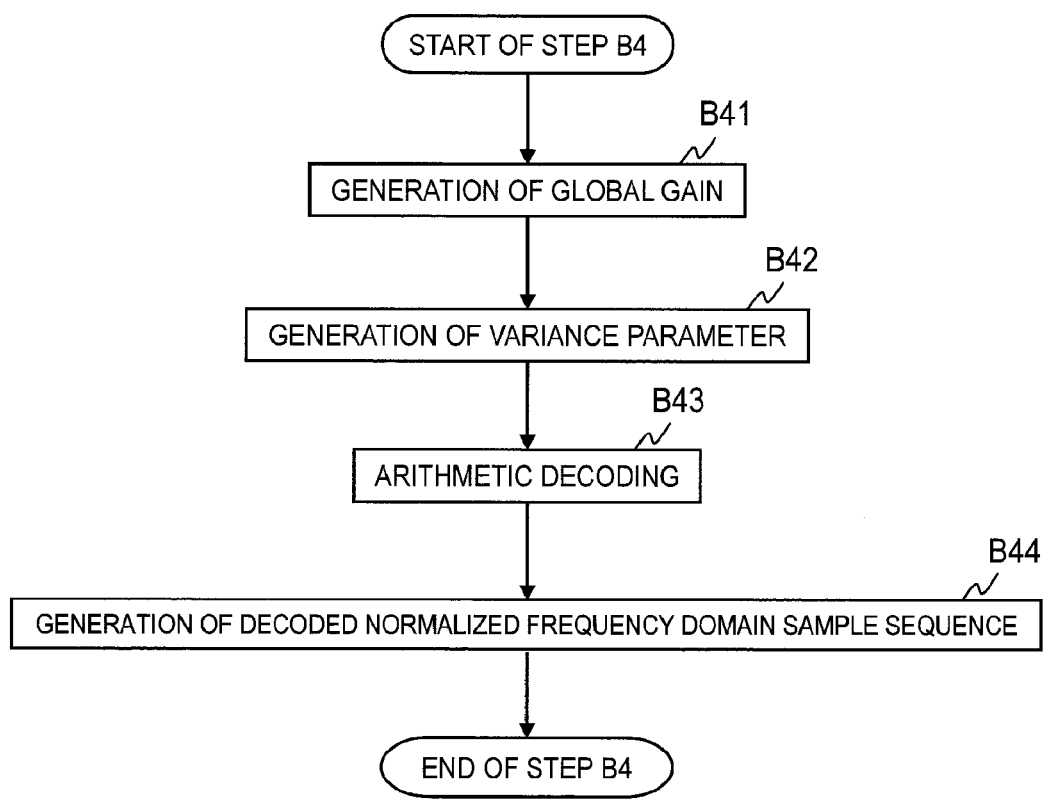
FIG. 17 is a flowchart for illustrating an example of the process of the decoding portion of the present invention.

The decoding portion 34 performs decoding, for example, by performing processes of steps B41 to B44 shown in FIG. 17 (step B4). That is, for each frame, the decoding portion 34 decodes a gain code comprised in the codes corresponding to the inputted normalized MDCT coefficient sequence to obtain a global gain g (step B41). The variance parameter deciding portion 342 of the decoding portion 34 determines each variance parameter of a variance parameter sequence $\phi(0), \phi(1), \ldots, \phi(N-1)$ from the global gain g, the unsmoothed amplitude spectral envelope sequence $\hat{H}(0), \hat{H}(1), \ldots, \hat{H}(N-1)$ and the smoothed amplitude spectral envelope sequence $\hat{H}\gamma(0), \hat{H}\gamma(1), \ldots, \hat{H}\gamma(N-1)$ by the above formula (A1) (step B42). The decoding portion 34 obtains a decoded normalized coefficient sequence $\hat{X}_Q(0), \hat{X}_Q(1), \ldots, \hat{X}_Q(N-1)$ by performing arithmetic decoding of integer signal codes comprised in the codes corresponding to the normalized MDCT coefficient sequence in accordance with an arithmetic decoding configuration corresponding to the variance parameters of the variance parameter sequence $\phi(0), \phi(1), \ldots, \phi(N-1)$ (step B43) and generates a decoded normalized MDCT coefficient sequence $\hat{X}_N(0), \hat{H}_N(1), \ldots, \hat{H}_N(N-1)$ by multiplying each coefficient of the decoded normalized coefficient sequence $\hat{X}_Q(0), \hat{X}_Q(1), \ldots, \hat{X}_Q(N-1)$ by the global gain g (step B44). Thus, the decoding portion 34 may decode inputted integer signal codes in accordance with bit allocation which substantially changes based on an unsmoothed spectral envelope sequence.

When encoding is performed by the process described in [Modification of encoding portion 26], the decoding portion 34 performs, for example, the following process. For each frame, the decoding portion 34 decodes a gain code comprised in the codes corresponding to an inputted normalized MDCT coefficient sequence to obtain a global gain g. The variance parameter deciding portion 342 of the decoding portion 34 determines each variance parameter of a variance parameter sequence $\phi(0), \phi(1), \ldots, \phi(N-1)$ from an unsmoothed amplitude spectral envelope sequence $\hat{H}(0), \hat{H}(1), \ldots, \hat{H}(N-1)$ and a smoothed amplitude spectral envelope sequence $\hat{H}\gamma(0), \hat{H}\gamma(1), \ldots, \hat{H}\gamma(N-1)$ by the above formula (A9). The decoding portion 34 can determine b(k) by the formula (A10), based on each variance parameter $\phi(k)$ of the variance parameter sequence $\phi(0), \phi(1), \ldots, \phi(N-1)$. The decoding portion 34 obtains a decoded normalized coefficient sequence $\hat{X}_Q(0), \hat{X}_Q(1), \ldots, \hat{X}_Q(N-1)$ by sequentially decoding values of $X_Q(k)$ with the number of bits b(k), and generates a decoded normalized MDCT coefficient sequence $\hat{X}_N(0), \hat{X}_N(1), \ldots, \hat{X}_N(N-1)$ by multiplying each coefficient of the decoded normalized coefficient sequence $\hat{X}_Q(0), \hat{X}_Q(1), \ldots, \hat{X}_Q(N-1)$ by the global gain g. Thus, the decoding portion 34 may decode inputted integer signal codes in accordance with bit allocation which changes based on an unsmoothed spectral envelope sequence.

The decoded normalized MDCT coefficient sequence $\hat{X}_N(0), \hat{X}_N(1), \ldots, \hat{X}_N(N-1)$ which has been generated is outputted to the envelope denormalizing portion 35.

<Envelope Denormalizing Portion 35>

The smoothed amplitude spectral envelope sequence $\hat{H}\gamma(0), \hat{H}\gamma(1), \ldots, \hat{H}\gamma(N-1)$ generated by the smoothed amplitude spectral envelope sequence generating portion 33 and the decoded normalized MDCT coefficient sequence $\hat{X}_N(0), \hat{X}_N(1), \ldots, \hat{X}_N(N-1)$ generated by the decoding portion 34 are inputted to the envelope denormalizing portion 35.

The envelope denormalizing portion 35 generates a decoded MDCT coefficient sequence $\hat{X}(0), \hat{X}(1), \ldots, \hat{X}(N-1)$ by denormalizing the decoded normalized MDCT coefficient sequence $\hat{X}_N(0), \hat{X}_N(1), \ldots, \hat{X}_N(N-1)$ using the smoothed amplitude spectral envelope sequence $\hat{H}\gamma(0), \hat{H}\gamma(1), \ldots, \hat{H}\gamma(N-1)$ (step B5).

The generated decoded MDCT coefficient sequence $\hat{X}(0), \hat{X}(1), \ldots, \hat{X}(N-1)$ is outputted to the time domain transforming portion 36.

For example, the envelope denormalizing portion 35 generates the decoded MDCT coefficient sequence $\hat{X}(0), \hat{X}(1), \ldots, \hat{X}(N-1)$ by multiplying each coefficient $\hat{X}_N(k)$ of the decoded normalized MDCT coefficient sequence $\hat{X}_N(0), \hat{X}_N(1), \ldots, \hat{X}_N(N-1)$ by each envelope value $\hat{H}\gamma(k)$ of the smoothed amplitude spectral envelope sequence $\hat{H}\gamma(0), \hat{H}\gamma(1), \ldots, \hat{H}\gamma(N-1)$ on the assumption of $k=0, 1, \ldots, N-1$. That is, $\hat{X}(k)=\hat{X}_N(k)\times\hat{H}\gamma(k)$ is satisfied on the assumption of $k=0, 1, \ldots, N-1$.

<Time Domain Transforming Portion 36>

The decoded MDCT coefficient sequence $\hat{X}(0), \hat{X}(1), \ldots, \hat{X}(N-1)$ generated by the envelope denormalizing portion 35 is inputted to the time domain transforming portion 36.

For each frame, the time domain transforming portion 36 transforms the decoded MDCT coefficient sequence $\hat{X}(0), \hat{X}(1), \ldots, \hat{X}(N-1)$ obtained by the envelope denormalizing portion 35 to a time domain and obtains a sound signal (a decoded sound signal) for each frame (step B6).

In this way, the decoding apparatus obtains a time-series signal by decoding in the frequency domain.

[Modifications and the Like]

When the linear prediction analyzing portion 22 and the unsmoothed amplitude spectral envelope sequence generating portion 23 are grasped as one spectral envelope estimating portion 2A, it can be said that this spectral envelope estimating portion 2A performs estimation of a spectral envelope (an unsmoothed amplitude spectral envelope sequence) regarding absolute values of a frequency domain sample sequence, which is, for example, an MDCT coefficient sequence, corresponding to a time-series signal raised to the power of η as a power spectrum, on the assumption that η is a predetermined positive number other than 2. For example, it can be said that a process in a case where η is 1 is performed in the first embodiment. It can be said that a process in a case where η is 2 is performed in the second embodiment. Further, it can be said that a process in a case where η is a predetermined positive number other than 2 is performed in the third embodiment. Here, "regarding . . . as a power spectrum" means that a spectrum raised to the power of η is used where a power spectrum is usually used.

In this case, it can be said that, on the assumption that η is a predetermined integer other than 2, the linear prediction analyzing portion 22 of the spectral envelope estimating portion 2A performs linear prediction analysis using a pseudo correlation function signal sequence obtained by performing inverse Fourier transform regarding absolute values of a frequency domain sample sequence, which is, for example, an MDCT coefficient sequence, raised to the power of η as a power spectrum, and generates coefficients transformable to linear prediction coefficients. Further, it can be said that, on the assumption that η is a predetermined integer other than 2, the unsmoothed amplitude spectral envelope sequence generating portion 23 of the spectral envelope estimating portion 2A performs estimation of a spectral envelope by obtaining an unsmoothed spectral envelope sequence, which is a sequence obtained by raising a sequence of an amplitude spectral envelope corresponding to coefficients transformable to linear prediction coefficients obtained by the linear prediction analyzing portion 22 to the power of 1/η.

Further, when the smoothed amplitude spectral envelope sequence generating portion 24, the envelope normalizing portion 25 and the encoding portion 26 are grasped as one encoding portion 2B, it can be said that this encoding portion 2B performs such encoding that changes bit allocation or that bit allocation substantially changes based on a spectral envelope (an unsmoothed amplitude spectral envelope sequence) estimated by the spectral envelope estimating portion 2A, for each coefficient of a frequency domain sample sequence, which is, for example, an MDCT coefficient sequence, corresponding to a time-series signal.

The process of the spectral envelope estimating portion 2A (that is, the processes of the linear prediction analyzing portion 22 and the unsmoothed amplitude spectral envelope sequence generating portion 23) and the process of the encoding portion 2B (that is, the processes of the smoothed amplitude spectral envelope sequence generating portion 24, the envelope normalizing portion 25 and the encoding portion 26) described in the first to third embodiments are mere examples. The spectral envelope estimating portion 2A may perform a process for estimating a spectral envelope (an unsmoothed amplitude spectral envelope sequence) regarding absolute values of a frequency domain sample sequence which is, for example, an MDCT coefficient sequence, corresponding to a time-series signal raised to the power of η as a power spectrum, other than the processes described in the first to third embodiments. Further, the encoding portion 2B may perform a process for performing such encoding that changes bit allocation or that bit allocation substantially changes based on a spectral envelope (an unsmoothed amplitude spectral envelope sequence) estimated by the spectral envelope estimating portion 2A, for each coefficient of a frequency domain sample sequence, which is, for example, an MDCT coefficient sequence, corresponding to a time-series signal, other than the processes described in the first to third embodiments.

For example, the encoding portion 2B may not be provided with the smoothed amplitude spectral envelope sequence generating portion 24. In this case, the MDCT coefficient sequence normalization process by the envelope normalizing portion 25 is not performed, but the encoding portion 26 performs an encoding process similar to the above process for an MDCT coefficient sequence instead of a normalized MDCT coefficient sequence. Further, in this case, the variance parameter deciding portion 268 of the encoding portion 26 decides variance parameters based on the following formula (A11) instead of the formula (A1).

[Formula 36]

$$\phi(k) = \eta^{1/\eta} B(\eta) \hat{H}(k) \frac{\sigma^{2/\eta}}{g} \quad (A11)$$

Further, in this case, the decoding apparatus may not be provided with the smoothed amplitude spectral envelope sequence generating portion 33. In this case, the decoded normalized MDCT coefficient sequence denormalization process by the envelope denormalizing portion 35 is not performed, but a decoded MDCT coefficient sequence is obtained by decoding by the decoding portion 34. Further, in this case, the variance parameter deciding portion 342 of the decoding portion 34 decides variance parameters based on the above formula (A11) instead of the formula (A1). Furthermore, in this case, the time domain transforming portion 36 performs time domain transformation similar to the time domain transformation described above for the decoded MDCT coefficient sequence instead of a decoded normalized MDCT coefficient sequence.

Further, for example, the encoding portion 2B may not be provided with the envelope normalizing portion 25. In this case, the encoding portion 26 performs an encoding process similar to the encoding process described above for an MDCT coefficient sequence instead of a normalized MDCT coefficient sequence. Further, in this case, the decoding apparatus may not be provided with the envelope denormalizing portion 35. In this case, a decoded MDCT coefficient sequence is obtained by decoding by the decoding portion 34, and the time domain transforming portion 36 performs time domain transformation similar to the time domain transformation described above for the decoded MDCT coefficient sequence instead of a decoded normalized MDCT coefficient sequence.

When the decoding portion 34 and the envelope denormalizing portion 35 are grasped as one decoding portion 3A, it can be said that this decoding portion 3A obtains a frequency domain sample sequence corresponding to a time-series sequence signal by performing decoding of inputted integer signal codes in accordance with such bit allocation that changes or substantially changes based on an unsmoothed spectral envelope sequence.

The processes described above are not only executed in order of description but also may be executed in a time-series in parallel or individually according to processing capacity of an apparatus to execute the processes or as necessary.

Further, the process of each portion in each apparatus may be realized by a computer. In that case, process content of each apparatus is written by a program. Then, by executing the program on the computer, the process of each portion in each apparatus is realized on the computer.

The program in which the process content is written can be recorded in a computer-readable recording medium. As the computer readable recording medium, any recording medium, such as a magnetic recording apparatus, an optical disk, a magneto-optical medium and a semiconductor memory, is possible.

Further, distribution of this program is performed, for example, by sales, transfer, lending and the like of a portable recording medium such as a DVD and a CD-ROM in which the program is recorded. Furthermore, the program may be distributed by storing the program in a storage apparatus such as a server computer and transferring the program from the server computer to another computer via a network.

For example, a computer which executes such a program stores the program stored in the portable recording medium or transferred from the server computer into its storage portion once. Then, at the time of executing a process, the computer reads the program stored in its storage portion and executes a process in accordance with the read program. Further, as another embodiment of this program, the computer may directly read the program from the portable recording medium and execute a process in accordance with the program. Furthermore, it is also possible for the computer to, each time the program is transferred from the server computer to the computer, execute a process in accordance with the received program one by one. Further, a configuration is also possible in which transfer of the program from the server computer to the computer is not performed, but the processes described above are executed by a so-called ASP (Application Service Provider) type service for realizing a processing function only by an instruction to execute the program and acquisition of a result. It is assumed that the program comprises information provided for processing by an electronic calculator and equivalent to a program (such as data which is not a direct instruction to a computer but has properties defining processing of the computer).

Further, though it is assumed that each apparatus is configured by executing a predetermined program on a computer, at least a part of process content of the apparatus may be realized by hardware.

What is claimed is:

1. An encoding apparatus for encoding a time-series signal in a frequency domain, the encoding apparatus comprising:
a spectral envelope estimating portion estimating a spectral envelope, regarding absolute values of a frequency domain sample sequence corresponding to the time-series signal raised to the power of as a power spectrum, on the assumption that $\eta$ is a predetermined positive number other than 2; and
an encoding portion performing such encoding that changes bit allocation or that bit allocation substantially changes, for each coefficient of the frequency domain sample sequence corresponding to the time-series signal, based on the estimated spectral envelope.

2. The encoding apparatus according to claim 1, wherein the spectral envelope estimating portion comprises a linear prediction analyzing portion performing linear prediction analysis using a pseudo correlation function signal sequence obtained by performing inverse Fourier transform regarding the absolute values of the frequency domain sample sequence raised to the power of $\eta$ as the power spectrum to obtain coefficients transformable to linear prediction coefficients, and an unsmoothed spectral envelope sequence generating portion performing estimation of the spectral envelope by obtaining an unsmoothed spectral envelope sequence which is a sequence obtained by raising a sequence of an amplitude spectral envelope corresponding to the coefficients transformable to the linear prediction coefficients to $1/\eta$.

3. A decoding apparatus for obtaining a frequency domain sample sequence corresponding to a time-series signal by decoding in a frequency domain, the decoding apparatus comprising:
a linear prediction coefficient decoding portion decoding inputted linear prediction coefficient codes to obtain coefficients transformable linear prediction coefficients;
an unsmoothed spectral envelope sequence generating portion obtaining an unsmoothed spectral envelope sequence which is a sequence obtained by raising a sequence of an amplitude spectral envelope corresponding to the coefficients transformable to the linear prediction coefficients to the power of $1/\eta$, on the assumption that $\eta$ is a predetermined positive number other than 2; and
a decoding portion obtaining a frequency domain sample sequence corresponding to the time-series signal by decoding inputted integer signal codes in accordance with such bit allocation that changes or substantially changes based on the unsmoothed spectral envelope sequence.

4. An encoding method for encoding a time-series signal in a frequency domain, the encoding method comprising:
a spectral envelope estimating step of estimating a spectral envelope, regarding absolute values of a frequency domain sample sequence corresponding to the time-series signal raised to the power of $\eta$ as a power spectrum, on the assumption that $\eta$ is a predetermined positive number other than 2; and
an encoding step of performing such encoding that changes bit allocation or that bit allocation substantially changes, for each coefficient of the frequency domain sample sequence corresponding to the time-series signal, based on the estimated spectral envelope.

5. The encoding method according to claim 4, wherein the spectral envelope estimating step comprises a linear prediction analyzing step of performing linear prediction analysis using a pseudo correlation function signal sequence obtained by performing inverse Fourier transform regarding the absolute values of the frequency domain sample sequence raised to the power of $\eta$ as the power spectrum to obtain coefficients transformable to linear prediction coefficients, and an unsmoothed spectral envelope sequence generation step of performing estimation of the spectral envelope by obtaining an unsmoothed spectral envelope sequence which is a sequence obtained by raising a sequence of an amplitude spectral envelope corresponding to the coefficients transformable to the linear prediction coefficients to $1/\eta$.

6. A decoding method for obtaining a frequency domain sample sequence corresponding to a time-series signal by decoding in a frequency domain, the decoding method comprising:
a linear prediction coefficient decoding step of decoding inputted linear prediction coefficient codes to obtain coefficients transformable linear prediction coefficients;
an unsmoothed spectral envelope sequence generating step of obtaining an unsmoothed spectral envelope sequence which is a sequence obtained by raising a sequence of an amplitude spectral envelope corresponding to the coefficients transformable to the linear prediction coefficients to the power of $1/\eta$, on the assumption that $\eta$ is a predetermined positive number other than 2; and
a decoding step of obtaining a frequency domain sample sequence corresponding to the time-series signal by decoding inputted integer signal codes in accordance with such bit allocation that changes or substantially changes based on the unsmoothed spectral envelope sequence.

7. A non-transitory recording medium which stores therein a program for causing a computer to function as each portion of the encoding apparatus according to any of claims 1 and 2 or the decoding apparatus according to claim 3.

* * * * *